(12) United States Patent
Traversat et al.

(10) Patent No.: US 8,176,189 B2
(45) Date of Patent: *May 8, 2012

(54) PEER-TO-PEER NETWORK COMPUTING PLATFORM

(75) Inventors: Bernard A. Traversat, San Francisco, CA (US); Gregory L. Slaughter, Palo Alto, CA (US); Thomas E. Saulpaugh, San Jose, CA (US); Mohamed M. Abdelaziz, Santa Clara, CA (US); Michael J. Duigou, Fremont, CA (US); Eric Pouyoul, San Francisco, CA (US); Jean-Christophe Hugly, Palo Alto, CA (US); Li Gong, Los Altos, CA (US); William J. Yeager, Menlo Park, CA (US); William N. Joy, Aspen, CO (US); Michael J. Clary, Monte Sereno, CA (US)

(73) Assignee: Oracle America, Inc., Redwood City, CA (US)

( * ) Notice: Subject to any disclaimer, the term of this patent is extended or adjusted under 35 U.S.C. 154(b) by 3340 days.

This patent is subject to a terminal disclaimer.

(21) Appl. No.: 10/055,645

(22) Filed: Jan. 22, 2002

(65) Prior Publication Data

US 2002/0184311 A1 Dec. 5, 2002

Related U.S. Application Data

(60) Provisional application No. 60/263,573, filed on Jan. 22, 2001, provisional application No. 60/268,893, filed on Feb. 14, 2001, provisional application No. 60/286,225, filed on Apr. 24, 2001, provisional application No. 60/308,932, filed on Jul. 31, 2001.

(51) Int. Cl.
*G06F 15/16* (2006.01)

(52) U.S. Cl. .................................. 709/230; 709/225

(58) Field of Classification Search .................. 709/204, 709/205, 226, 230, 238, 223, 220, 235; 710/302; 711/162; 370/389
See application file for complete search history.

(56) References Cited

U.S. PATENT DOCUMENTS

| | | | |
|---|---|---|---|
| 5,109,483 | A | 4/1992 | Baratz et al. |
| 5,224,205 | A | 6/1993 | Dinkin et al. |
| 5,442,637 | A | 8/1995 | Nguyen |
| 5,479,514 | A | 12/1995 | Klonowski |

(Continued)

FOREIGN PATENT DOCUMENTS

EP 993 163 4/2000

(Continued)

OTHER PUBLICATIONS

Ratnasamy, et al., "A Scalable Content-Addressable Network," SIGCOMM'01, San Diego, CA, Aug. 27-31, 2001, pp. 161-172.

(Continued)

*Primary Examiner* — Le Luu

(74) *Attorney, Agent, or Firm* — Robert C. Kowert; Meyertons, Hood, Kivlin, Kowert & Goetzel, P.C.

(57) ABSTRACT

A peer-to-peer platform that may provide mechanisms through which peers may discover each other, communicate with each other, and cooperate with each other to form peer groups is described. The peer-to-peer platform may comprise several layers including a peer-to-peer platform layer, a peer-to-peer services layer, and a peer-to-peer applications layer. At the highest abstraction level, the peer-to-peer platform may be viewed as a set of protocols. Each protocol may be defined by one or more messages exchanged among participants of the protocol. In one embodiment, the peer-to-peer platform may include, but is not limited to, one or more of a peer discovery protocol, a peer resolver protocol, a peer information protocol, a peer membership protocol, a pipe binding protocol, and an endpoint routing protocol. To underpin this set of protocols, the peer-to-peer platform may define a number of concepts including peer, peer group, advertisement, message, pipe, and endpoint.

40 Claims, 31 Drawing Sheets

U.S. PATENT DOCUMENTS

| | | | |
|---|---|---|---|
| 5,517,622 | A | 5/1996 | Ivanoff et al. |
| 5,619,657 | A | 4/1997 | Sudama et al. |
| 5,675,629 | A | 10/1997 | Raffel et al. |
| 5,675,782 | A | 10/1997 | Montague et al. |
| 5,719,861 | A | 2/1998 | Okanoue |
| 5,729,682 | A | 3/1998 | Marquis |
| 5,758,087 | A | 5/1998 | Aaker et al. |
| 5,768,527 | A | 6/1998 | Zhu et al. |
| 5,805,820 | A | 9/1998 | Bellovin et al. |
| 5,896,503 | A * | 4/1999 | Badovinatz et al. .......... 709/201 |
| 5,931,916 | A | 8/1999 | Barker et al. |
| 5,941,988 | A | 8/1999 | Bhagwat et al. |
| 5,964,837 | A | 10/1999 | Chao et al. |
| 5,999,530 | A | 12/1999 | LeMaire et al. |
| 6,032,175 | A | 2/2000 | Fletcher et al. |
| 6,061,734 | A | 5/2000 | London |
| 6,105,027 | A | 8/2000 | Schneider et al. |
| 6,105,064 | A | 8/2000 | Davis et al. |
| 6,182,136 | B1 * | 1/2001 | Ramanathan et al. ........ 709/224 |
| 6,212,558 | B1 | 4/2001 | Antur et al. |
| 6,233,601 | B1 | 5/2001 | Walsh |
| 6,269,099 | B1 * | 7/2001 | Borella et al. ................ 370/389 |
| 6,324,580 | B1 | 11/2001 | Jindal et al. |
| 6,408,341 | B1 | 6/2002 | Feeney et al. |
| 6,446,113 | B1 | 9/2002 | Ozzie et al. |
| 6,456,600 | B1 | 9/2002 | Rochberger et al. |
| 6,477,590 | B1 | 11/2002 | Habusha et al. |
| 6,560,217 | B1 | 5/2003 | Peirce, Jr. et al. |
| 6,591,310 | B1 | 7/2003 | Johnson |
| 6,611,872 | B1 * | 8/2003 | McCanne ..................... 709/238 |
| 6,633,761 | B1 | 10/2003 | Singhal et al. |
| 6,651,105 | B1 | 11/2003 | Bhagwat et al. |
| 6,657,116 | B1 | 12/2003 | Gunnerson |
| 6,658,540 | B1 * | 12/2003 | Sicola et al. .................. 711/162 |
| 6,671,746 | B1 * | 12/2003 | Northrup ...................... 719/331 |
| 6,681,282 | B1 * | 1/2004 | Golden et al. ................ 710/302 |
| 6,697,944 | B1 | 2/2004 | Jones et al. |
| 6,721,286 | B1 | 4/2004 | Williams et al. |
| 6,732,180 | B1 | 5/2004 | Hale et al. |
| 6,742,023 | B1 | 5/2004 | Fanning et al. |
| 6,778,491 | B1 | 8/2004 | Fourcand et al. |
| 6,782,527 | B1 | 8/2004 | Kouznetsov et al. |
| 6,795,917 | B1 | 9/2004 | Yionen |
| 6,810,259 | B1 | 10/2004 | Zhang |
| 6,816,461 | B1 | 11/2004 | Scrandis et al. |
| 6,826,763 | B1 | 11/2004 | Wange et al. |
| 6,845,091 | B2 | 1/2005 | Ogier et al. |
| 6,854,016 | B1 | 2/2005 | Kraenzel et al. |
| 6,865,600 | B1 | 3/2005 | Brydon et al. |
| 6,892,230 | B1 * | 5/2005 | Gu et al. ....................... 709/220 |
| 7,016,306 | B2 | 3/2006 | Alapuranen et al. |
| 7,039,701 | B2 | 5/2006 | Wesley |
| 7,043,522 | B2 | 5/2006 | Olson et al. |
| 7,046,995 | B2 | 5/2006 | Rygaard |
| 7,050,861 | B1 | 5/2006 | Lauzon et al. |
| 2001/0029526 | A1 | 10/2001 | Yokoyama et al. |
| 2002/0052885 | A1 | 5/2002 | Levy |
| 2002/0062375 | A1 * | 5/2002 | Teodosiu et al. ............. 709/226 |
| 2002/0073075 | A1 * | 6/2002 | Dutta et al. ....................... 707/3 |
| 2002/0073204 | A1 | 6/2002 | Dutta et al. |
| 2002/0083145 | A1 | 6/2002 | Perinpanathan |
| 2002/0107935 | A1 | 8/2002 | Lowery et al. |
| 2002/0138471 | A1 | 9/2002 | Dutta et al. |
| 2002/0161821 | A1 | 10/2002 | Narayan et al. |
| 2003/0009570 | A1 | 1/2003 | Moskowitz et al. |
| 2003/0028585 | A1 | 2/2003 | Yeager et al. |
| 2003/0037097 | A1 | 2/2003 | Meyer et al. |
| 2003/0055894 | A1 | 3/2003 | Yeager et al. |
| 2003/0055898 | A1 | 3/2003 | Yeager et al. |
| 2003/0056093 | A1 | 3/2003 | Huitema et al. |
| 2003/0067912 | A1 | 4/2003 | Mead et al. |
| 2003/0070070 | A1 | 4/2003 | Yeager et al. |
| 2003/0115251 | A1 | 6/2003 | Fredrickson et al. |
| 2003/0130947 | A1 | 7/2003 | Benantar |
| 2003/0163697 | A1 | 8/2003 | Pabla et al. |
| 2003/0217140 | A1 | 11/2003 | Burbeck et al. |
| 2004/0068477 | A1 | 4/2004 | Gilmour et al. |
| 2004/0071099 | A1 | 4/2004 | Costa-Requena et al. |
| 2004/0088347 | A1 | 5/2004 | Yeager et al. |
| 2004/0088348 | A1 | 5/2004 | Yeager et al. |
| 2004/0088369 | A1 | 5/2004 | Yeager et al. |
| 2004/0088646 | A1 | 5/2004 | Yeager et al. |
| 2004/0133640 | A1 | 7/2004 | Yeager |
| 2004/0205772 | A1 | 10/2004 | Uszok et al. |
| 2005/0053093 | A1 | 3/2005 | Fukushima et al. |
| 2005/0086300 | A1 | 4/2005 | Yeager et al. |

FOREIGN PATENT DOCUMENTS

| | | |
|---|---|---|
| EP | 022 876 | 7/2000 |
| EP | 1229442 | 8/2002 |

OTHER PUBLICATIONS

Kalt, C., "RFC 2812 Internet Relay Chat: Client Protocol," Request for Comments, Apr. 2000, pp. 1-63, XP002242624.

Marmor, M.S., "Make the P2P Leap with Toadnode," Web Technologies, Miller Freeman, US, vol. 5, No. 12, Dec. 2000, pp. 44-49, XP008000376, ISSN: 1086-556X, *Section "How the Gnutella Protocol Works," on pp. 46-46*.

Krikorian, R., "Hello JXTA," The O'Reilly Network, Online!, Apr. 25, 2001, pp. 1-9, XP002249288.

DRSCHOLL@USERS.SOURCEFORGE.NET: "Napster Messages," Open Source Napster Server, 'Online!, Apr. 7, 2000, pp. 1-25, XP002249287.

International Search Report for PCT/US 02/01362, mailed Aug. 20, 2002.

International Search Report for US/PTO 02/01362, mailed Nov. 20, 2002, 9 pages.

Abdul-Rahman et al., "A Distributed Trust Model," 1997 New Security Paradigms Workshop, ACM 1998, (pp. 48-59).

Zacharia et al., "Trust Management Through Reputation Mechanisms," Applied Artificial Intelligence, 2000, 14:881-907.

"Frequently Asked Questions about PGPi," http://web.archive.org/web/20020207220715/http://stale.schumacher.no/email.shtml, Mar. 2, 2001, (9 pages).

Bill Yeager, "Self Constructing P2P Networks Using the Project JXTA P2P Protocols," http://netseminar.stanford.edu/sessions/2002-03-14.html, Mar. 14, 2002, (2 pages).

Cameron Ross Dunne, "Using Mobile Agents for Network Resource Discovery in Peer-to-Peer Networks," http://www.acm.org/sigs/sigecom/exchanges/volume_2_(01)/2.3-index.html, 2001, (11 pages).

Fung et al., "Part-Time MSC Project 1 Mid-Term Review report," Peer-to-Peer Networks & Mobile Agents, Oct. 31, 2001, (12 pages).

Sniffen, "Trust Economies in the Free Haven Project," May 22, 2000, pp. 1-38.

Oram, "Peer-to-Peer: Harnessing the Benefits of a Disruptive Technology," Mar. 2001, O'Reilly & Associates, First Edition, Chapters 16 and 18.

Alan Beecraft, "Peer-to-Peer: From JMS to Project JXTA Part 1: Shall we Chat?," http://java.sun.com/developer/technical/articles/peer/, Nov. 2001, 5 pages.

"LICQ Info," http://web.archive.org/web/20010808110229/www.licq.org/info.html, Aug. 8, 2001, 4 pages.

Oshima et al., "Aglets Specification 1.1 Draft," Sun Microsystems, Sep. 8, 1998, (40 pages).

"Project JXTA: An Open, Innovative Collaboration," Sun Microsystems, Inc., Apr. 25, 2001, (7 pages).

"JXTA v1.0 Protocols Specification," Sun Microsystems, Inc., 2002, (86 pages).

Traversat et al., "Project JXTA Virtual Network," Sun Microsystems, Inc., Feb. 5, 2002, (10 pages).

Lange et al., "Mobile Agents with Java: The Aglet API," World Wide Web, vol. 1, Issue 3, 1998, (pp. 111-121).

Karl Aberer, et al., "Managing Trust in a Peer-2-Peer Information System," 2001 ACM, pp. 310-317.

Rita Chen, et al., "Poblano: A Distributed Trust Model for Peer-to-Peer Networks," Sun Microsystems, Inc., 2001, 26 pages.

Stoica, et al., "Chord: A Scalable Peer-to-Peer Lookup Service for Internet Applications," SIGCOMM'01, San Diego, CA, Aug. 27-31, 2001, pp. 1-12.

Cederqvist, et al., "What is CVS?", 1993, 6 pages.

* cited by examiner

| 128 bit UUID of Peer Group | Length of Remainder | Unique name within the group (A byte array) |

FIG. 5

| Element Name (A String) | Element Value Type |
|---|---|
| Name | <String> |
| Keywords | <String> |
| Properties | <Properties> |
| Service | <Service Advertisement[]> (an array) |
| Endpoint | <Endpoint Advertisement[]> (an array) |

FIG. 6

| Element Name (A String) | Element Value Type |
|---|---|
| Name | <String> |
| Keywords | <String> |
| GroupID | <ID> |
| PeerID | <ID> |
| Service | <Service Advertisement[]> (an array) |

FIG. 7

| Element Name (A String) | Element Value Type |
|---|---|
| Name | <String> |
| Identifier | <ID> |
| Type | <String> |

*FIG. 8*

| Element Name (A String) | Element Value Type |
|---|---|
| Name | <String> |
| Keywords | <String> |
| Identifier | <ID> |
| Version | <String> |
| Pipe | <PipeAdvertisement> |
| Params | <String> |
| URI | <String> |
| Provider | <String> |
| Access Method | <Method[]> (an array) |

*FIG. 9*

| Element Name (A String) | Element Value Type |
|---|---|
| Mime-Type (Optional) | <String> |
| Size | Long |
| Encoding | <String> |
| ContentID | <ID> |
| RefID (Optional) | <ID> |
| Document | <Document> |

FIG. 10

| Element Name (A String) | Element Value Type |
|---|---|
| Name | <String> |
| Keywords | <String> |
| Address | <String> |
| Transport | <Transport Advertisement> |

FIG. 11

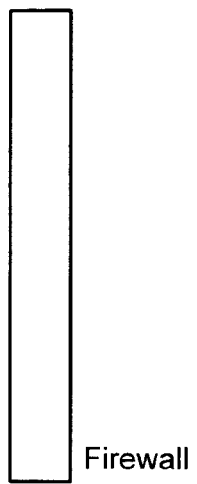
Firewall  *FIG. 20A*
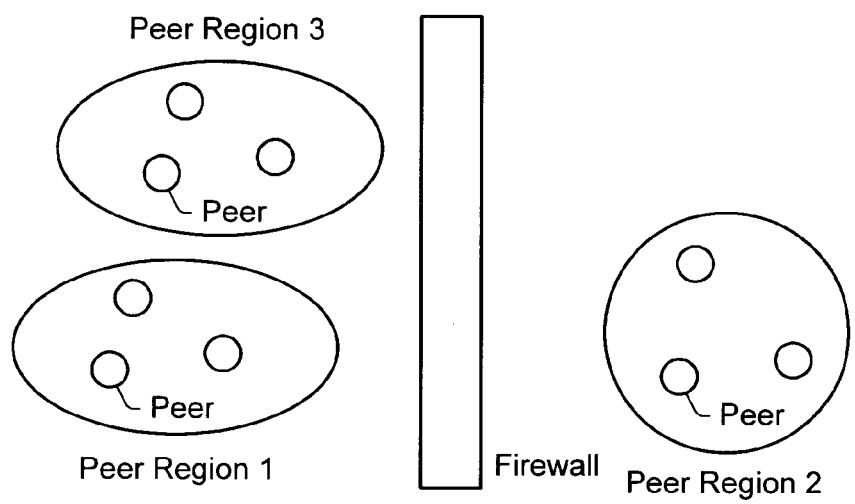
*FIG. 20B*
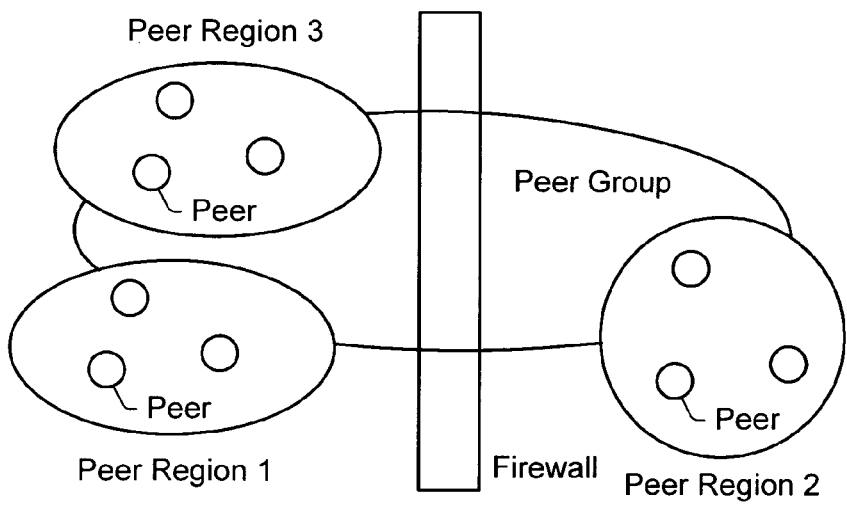
*FIG. 20C*

PEER-TO-PEER NETWORK COMPUTING PLATFORM

PRIORITY INFORMATION

This application claims benefit of priority to the following provisional applications, each of which is hereby incorporated by reference in its entirety:

Ser. No. 60/263,573 filed Jan. 22, 2001 titled Peer-to-Peer Network Computing Platform;

Ser. No. 60/268,893 filed Feb. 14, 2001 titled Peer-to-Peer Network Computing Platform;

Ser. No. 60/286,225 filed Apr. 24, 2001 titled Peer-to-Peer Network Computing Platform; and Ser. No. 60/308,932 filed Jul. 31, 2001 titled Trust Mechanism For A Peer-To-Peer Network Computing Platform.

BACKGROUND OF THE INVENTION

1. Field of the Invention

This invention relates to peer-to-peer networking, and more particularly to a peer-to-peer network computing platform.

2. Description of the Related Art

The Internet has three valuable fundamental assets—information, bandwidth, and computing resources—all of which are vastly under utilized, partly due to the traditional client-server computing model. No single search engine or portal can locate and catalog the ever-increasing amount of information on the Web in a timely way. Moreover, a huge amount of information is transient and not subject to capture by techniques such as Web crawling. For example, research has estimated that the world produces two exabytes or about $2 \times 10^{18}$ bytes of information every year, but only publishes about 300 terabytes or about $3 \times 10^{12}$ bytes. In other words, for every megabyte of information produced, only one byte gets published. Moreover, Google claims that it searches about only $1.3 \times 10^8$ web pages. Thus, finding useful information in real time is increasingly difficult.

Although miles of new fiber have been installed, the new bandwidth gets little use if everyone goes to one site for content and to another site for auctions. Instead, hot spots just get hotter while cold pipes remain cold. This is partly why most people still feel the congestion over the Internet while a single fiber's bandwidth has increased by a factor of $10^6$ since 1975, doubling every 16 months.

Finally, new processors and storage devices continue to break records in speed and capacity, supporting more powerful end devices throughout the network. However, computation continues to accumulate around data centers, which have to increase their workloads at a crippling pace, thus putting immense pressure on space and power consumption.

The term peer-to-peer networking may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems.

Many peer-to-peer systems are built for delivering a single type of service. For example, Napster provides music file sharing, Gnutella provides generic file sharing, and AIM provides instant messaging. Given the diverse characteristics of these services and the lack of a common underlying P2P infrastructure, each P2P software vendor tends to create incompatible systems—none of them able to interoperate with one another. This means each vendor creates its own P2P user community, duplicating efforts in creating software and system primitives commonly used by all P2P systems. Moreover, for a peer to participate in multiple communities organized by different P2P implementations, the peer must support multiple implementations, each for a distinct P2P system or community, and serve as the aggregation point.

Many P2P systems today offer their features or services through a set of APIs that are delivered on a particular operating system using a specific networking protocol. For example, one system might offer a set of C++ APIs, with the system initially running only on Windows, over TCP/IP, while another system offers a combination and C and Java APIs, running on a variety of UNIX systems, over TCP/IP but also requiring HTTP. A P2P developer is then forced to choose which set of APIs to program to, and consequently, which set of P2P customers to target. Because there is little hope that the two systems will interoperate, if the developer wants to offer the same service to both communities, they have to develop the same service twice for two P2P platforms or develop a bridge system between them. Both approaches are inefficient and impractical considering the dozens of P2P platforms in existence.

Many P2P systems, especially those being offered by upstart companies, tend to choose one operating system as their target deployment platform. The cited reason for this choice is to target the largest installed base and the fastest path to profit. The inevitable result is that many dependencies on platform-specific features are designed into (or just creep into) the system. This is often not the consequence of technical desire but of engineering reality with its tight schedules and limited resources.

This approach is clearly shortsighted. Even though the earliest demonstration of P2P capabilities are on platforms in the middle of the computing hardware spectrum, it is very likely that the greatest proliferation of P2P technology will occur at the two ends of the spectrum—large systems in the enterprise and consumer-oriented small systems. In fact, betting on any particular segment of the hardware or software system is not future proof.

Prior art peer-to-peer systems are generally built for delivering a single type of service, for example a music file sharing service, a generic file sharing service, or an instant messaging service. Given the diverse characteristics of these services and given the lack of a common underlying peer-to-peer infrastructure, each vendor tends to form various peer-to-peer "silos". In other words, the prior art peer-to-peer systems typically do not interoperate with each other. This means each vendor has to create its own peer-to-peer user community, duplicating efforts in creating primitives commonly used by peer-to-peer systems such as peer discovery and peer communication.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

SUMMARY OF THE INVENTION

A peer-to-peer platform that may provide mechanisms through which peers may discover each other, communicate with each other, and cooperate with each other to form peer groups is described. The peer-to-peer platform is a network programming and computing platform that is designed to solve a number of problems in modem distributed computing, especially in the area broadly referred to as peer-to-peer computing, or peer-to-peer networking, or simply P2P.

The peer-to-peer platform may comprise several layers. The peer-to-peer platform layers may include a peer-to-peer platform layer. This layer encapsulates minimal primitives that are common to peer-to-peer networking, including peers, peer groups, peer discovery, peer communication, peer monitoring, and associated security primitives. All peer-to-peer devices preferably share this layer so that interoperability becomes possible. The peer-to-peer platform layer may also be referred to as the core layer.

The peer-to-peer platform layers may also include a peer-to-peer services layer. This layer includes capabilities that may not be absolutely necessary for a peer-to-peer network to operate but that may be desirable to provided added functionality beyond the core layer in the peer-to-peer environment. Peers may cooperate and communicate with each other to locate and access services. Some services may be well known and may be referred to as peer-to-peer platform core services. Core services may include, but are not limited to, discovery and membership services. Other services may be user-defined and provide application dependent services such as content searching and indexing.

The peer-to-peer platform layers may also include a peer-to-peer applications layer. This layer may include peer-to-peer instant messaging, entertainment content management and delivery, peer-to-peer email systems, distributed auction systems, and many others. The boundary between services and applications is not rigid. An application to one customer can be viewed as a service to another customer.

At the highest abstraction level, the peer-to-peer platform may be viewed as a set of protocols. Each protocol may be defined by one or more messages exchanged among participants of the protocol. Each message may have a predefined format, and may include various data fields. The peer-to-peer platform enables peer nodes to discover and connect with each other to form peer groups and share content. The peer-to-peer platform is preferably platform-independent by virtue of being a set of protocols. The peer-to-peer platform is preferably transport independent and can utilize TCP/IP as well as other transport standards.

In one embodiment, the peer-to-peer platform may include, but is not limited to, one or more of a peer discovery protocol, a peer resolver protocol, a peer information protocol, a peer membership protocol, a pipe binding protocol, and an endpoint routing protocol. The peer discovery protocol is a protocol that a peer uses to perform discovery. The peer discovery protocol may be used to discover peers, peer groups, pipes, endpoints, services, content and any other advertised resource in a peer-to-peer network. The peer resolver protocol enables a peer to send and receive generic queries to or from other peers. The peer information protocol may allow a peer to learn about other peers' capabilities and status. The peer membership protocol may allow a peer to obtain group membership requirements, to apply for membership and receive a membership credential along with a full group advertisement, to update an existing membership or application credential, and finally, to cancel a membership or an application credential. The pipe binding protocol may allow a peer to bind a pipe advertisement to a pipe endpoint, thus indicating where messages actually go over the pipe. The peer endpoint routing protocol may allow a peer to ask a peer router for available routes for sending a message to a destination peer.

To underpin this set of protocols, the peer-to-peer platform may define a number of concepts including peer, peer group, advertisement, message, pipe, endpoint and more. A peer may be defined as any entity that can speak the protocols required of a peer. As such, a peer may manifest in the form of a processor, a process, a machine, or a user. In one embodiment, a peer does not need to understand all of the protocols of the peer-to-peer platform. A peer group may be defined as a virtual entity that speaks the set of peer group protocols. Typically, a peer group is a collection of cooperating peers that may provide a common set of services. Peer-to-peer platform messages are preferably useable on top of asynchronous, unreliable, and unidirectional transport. Therefore, in one embodiment, a message may be a Datagram that may include an envelope and a stack of protocol headers with bodies. Pipes may be defined as virtual communication channels for sending and receiving messages between peers in the peer-to-peer environment. An advertisement may be defined as a structured document that names, describes, and publishes the existence of a peer-to-peer platform resource, such as a peer, a peer group, a pipe, or a service. In one embodiment, the peer-to-peer platform may define a basic set of advertisements.

BRIEF DESCRIPTION OF THE DRAWINGS

FIG. 5 illustrates an exemplary content identifier according to one embodiment;

FIG. 6 illustrates the content of a peer advertisement according to one embodiment;

FIG. 7 illustrates the content of a peer group advertisement according to one embodiment.

FIG. 8 illustrates the content of a pipe advertisement according to one embodiment;

FIG. 9 illustrates the content of a service advertisement according to one embodiment;

FIG. 10 illustrates the content of a content advertisement according to one embodiment;

FIG. 11 illustrates the content of an endpoint advertisement according to one embodiment;

FIGS. 20A through 20D illustrate a method of using a proxy service for peer group registration according to one embodiment;

Figure 1A:
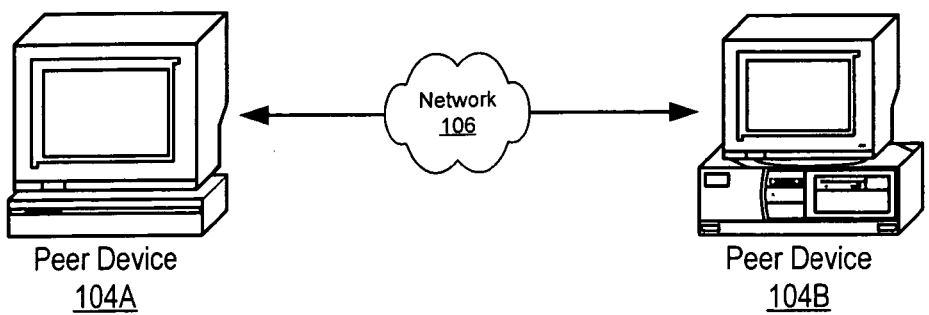
FIG. 1A illustrates a prior art example of two devices that are currently connected as peers.
Figure 1B:
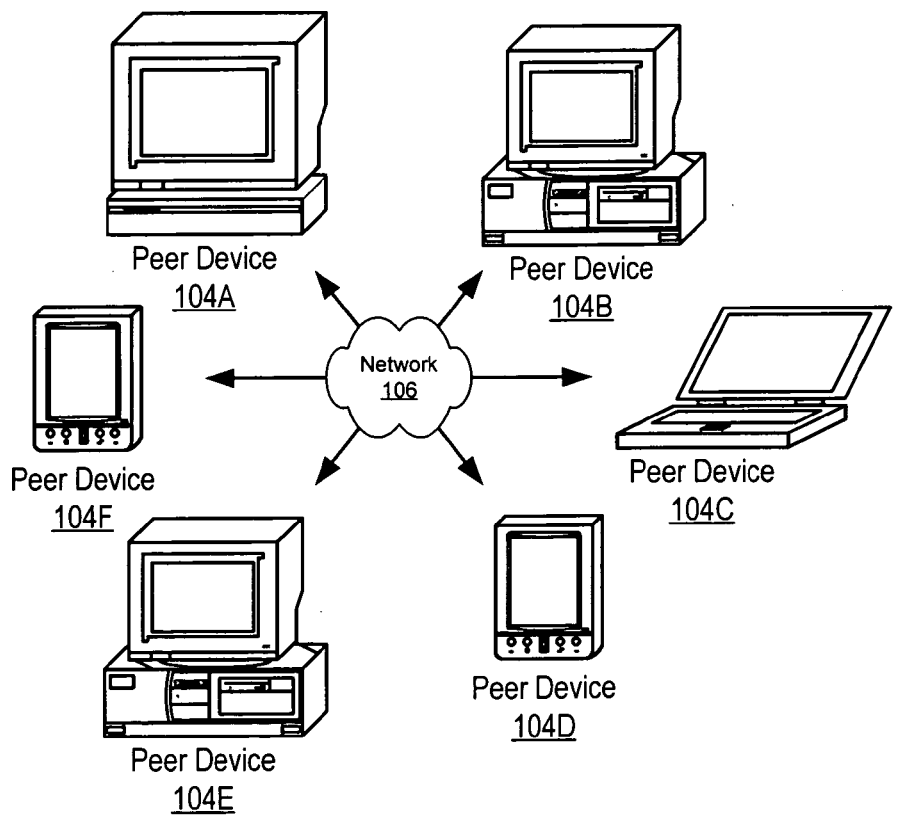
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

An open network computing platform designed for peer-to-peer computing is described. The network computing platform may be referred to as a peer-to-peer platform. The peer-to-peer platform may provide mechanisms through which peers may discover each other, communicate with each other, and cooperate with each other to form peer groups. The peer-to-peer platform may enable software developers to deploy interoperable services and contents, further spring-boarding the peer-to-peer revolution on the Internet. The peer-to-peer platform is described herein addresses the problems of prior art peer-to-peer systems by providing a generic and service-agnostic peer-to-peer platform that may be:

preferably defined by a small number of protocols. Each protocol is preferably easy to implement and easy to be adopted into peer-to-peer services and applications. Thus, service offerings from one vendor may be used, perhaps transparently, by the user community of another vendor's system.

preferably defined to be independent of programming languages, so that it can be implemented in C/C++, Java, Perl, and numerous other languages. This means heterogeneous devices with completely different software stacks may interoperate through the peer-to-peer platform protocols.

preferably designed to be independent of transport protocols. It may be implemented on top of TCP/IP, HTTP, Bluetooth, HomePNA, and other protocols. Thus, a system built on top of the peer-to-peer platform preferably functions in the same or similar fashion when the system is expanded to a new networking environment or to a new class of devices, as long as there is a correct transport protocol handler for the new networking protocol.

In one embodiment, the peer-to-peer platform architecture may include, but is not limited to, protocols, advertisements, and core services. Network protocol bindings may be used to preferably ensure interoperability with existing content transfer protocols, network transports, routers, and firewalls. The peer-to-peer platform may be used to combine network nodes (peers) into a simple and coherent peer-to-peer network computing platform. The platform is preferably completely decentralized, and with the addition of each new network peer, preferably becomes more robust as it expands. The platform is preferably directed at providing several benefits including, but not limited to:

No single point of failure

Asynchronous messaging

The ability for peers to adapt to their network environment

Moving content towards its consumers

Some benefits of the peer-to-peer platform may be illustrated with a few application or usage scenarios. For example, assume there is a peer-to-peer community offering a search capability for its members, where one member can post a query and other members can hear and respond to the query. One member is a Napster user and has cleverly implemented a feature so that, whenever a query contains a question for a MP3 file, this member will look up the Napster directory and then respond to the query with information returned by the Napster system. Here, a member without any knowledge of Napster may benefit from it because another member implemented a bridge to connect their peer-to-peer system to Napster. This type of bridging is very useful, but when the number of services is large, pair-wise bridging becomes more difficult and undesirable. The peer-to-peer platform may be a platform bridge that may be used to connect various peer-to-peer systems together.

In another example, one engineering group requires a sizable storage capability, but also with redundancy to protect data from sudden loss. A common solution is to purchase a storage system with a large capacity and mirrored disks. Another engineering group later decides to purchase the same system. Both groups end up with a lot of extra capacity, and have to pay higher prices for the mirroring feature. With the peer-to-peer platform, each group may buy a simple storage system without the mirroring feature, where the disks can then discover each other automatically, form a storage peer group, and offer mirroring facilities using their spare capacity.

As yet another example, many devices such as cell phones, pagers, wireless email devices, PDAs, and PCs may carry directory and calendar information. Currently, synchronization among the directory and calendar information on these devices is very tedious, if not impossible. Often, a PC becomes the central synchronization point, where every other device has to figure out a way to connect to the PC (using serial port, parallel port, IRDA, or other method) and the PC must have the device driver for every device that wishes to connect. With the peer-to-peer platform, these devices may be able to interact with each other, without extra networking interfaces except those needed by the devices themselves, using the peer-to-peer platform as the common layer of communication and data exchange.

The peer-to-peer platform may comprise several layers. Preferably, the peer-to-peer platform comprises three layers, including:

peer-to-peer platform layer. This layer encapsulates minimal primitives that are common to peer-to-peer networking, including peers, peer groups, peer discovery, peer communication, peer monitoring, and associated security primitives. This layer is preferably shared by all peer-to-peer devices so that interoperability becomes possible. The peer-to-peer platform layer may also be referred to as the core layer.

peer-to-peer services layer. This layer includes capabilities that may not be absolutely necessary for a peer-to-peer network to operate but that may be desirable to provided added functionality beyond the core layer in the peer-to-peer environment. Examples include, but are not limited to, search and indexing, directory, storage systems, file sharing, distributed file systems, resource aggregation and renting, protocol translation, authentication and PKI (public key infrastructure) systems.

peer-to-peer applications layer. This layer includes peer-to-peer instant messaging, entertainment content management and delivery, peer-to-peer email systems, distributed auction systems, and many others. The boundary between services and applications is not rigid. An application to one customer can be viewed as a service to another customer.

The peer-to-peer platform is a network programming and computing platform that is designed to solve a number of problems in modern distributed computing, especially in the area broadly referred to as peer-to-peer computing, or peer-to-peer networking, or simply P2P.

One objective of the peer-to-peer platform as described herein is interoperability. Embodiments of the peer-to-peer platform may enable interconnected peers to easily locate each other, communicate with each other, participate in community-based activities, and offer services to each other seamlessly across different P2P systems and different communities.

Another objective of the peer-to-peer platform as described herein is platform independence. Embodiments of the peer-to-peer platform may be independent of programming languages (such as the C or Java), system platforms (such as the Microsoft Windows and UNIX® operating systems), and networking platforms (such as TCP/IP or Bluetooth). The peer-to-peer platform is designed to be embraced by all developers, independent of preferred programming languages, development environments, or deployment platforms.

Yet another objective of the peer-to-peer platform as described herein is ubiquity. Embodiments of the peer-to-peer platform may be implementable on every device with a digital heartbeat, including, but not limited to, sensors, consumer electronics, PDAs, appliances, network routers, desktop computers, data-center servers, and storage systems. Embodiments of the peer-to-peer platform may enable peers, independent of software and hardware platform, to benefit and profit from being connected to millions of other peers.

Figure 29:
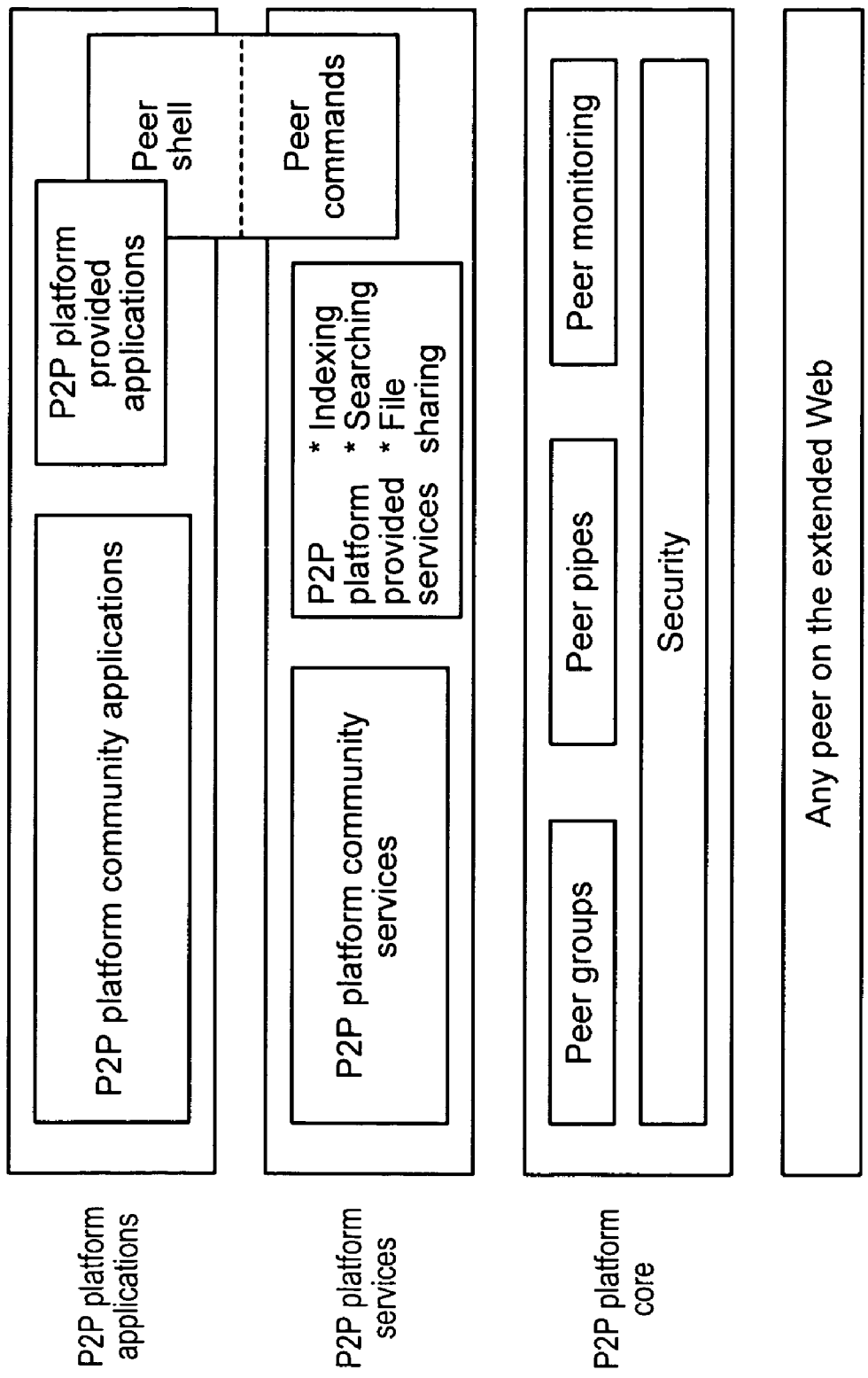
FIG. 29 illustrates one embodiment of peer-to-peer platform software architecture at the conceptual level.

FIG. 29 illustrates one embodiment of peer-to-peer platform software architecture at the conceptual level. The software stack may be represented in three layers. At the bottom is the core layer that deals with peer establishment, communication management such as routing, and other low-level "plumbing". In the middle is a service layer that deals with higher-level concepts, such as indexing, searching, and file sharing. These services, which make heavy use of the plumbing features provided by the core, are useful by themselves but also are commonly included as components in an overall P2P system. At the top is the layer of applications, such as emailing, auctioning, and storage systems. Some features, such as security, manifest in all three layers and throughout a P2P system, albeit in different forms according to the location in the software architecture. In one embodiment, the peer-to-peer platform may provide a layer on top of which services and applications are built. This layer is preferably thin and small, but preferably provides interesting and powerful primitives for use by the services and applications.

At the highest abstraction level, the peer-to-peer platform may be viewed as a set of protocols. Each protocol may be defined by one or more messages exchanged among participants of the protocol. Each message may have a predefined format, and may include various data fields. The peer-to-peer platform connects peer nodes with each other. The peer-to-peer platform is preferably platform-independent by virtue of being a set of protocols. The peer-to-peer platform is preferably transport independent and can utilize TCP/IP as well as other transport standards.

In one embodiment, the peer-to-peer platform may include, but is not limited to, the following protocols:

peer discovery protocol peer resolver protocol peer information protocol peer membership protocol (also referred to as a peer group protocol)

pipe binding protocol endpoint routing protocol

The peer discovery protocol is the protocol a peer uses to perform discovery. The peer discovery protocol may be used to discover peers, peer groups, and any other advertisements. The first word, peer, is the subject, and not necessarily the object, of discovery.

To underpin this set of protocols, the peer-to-peer platform may define a number of concepts including peer, peer group, advertisement, message, pipe, and more.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may preferably focus on mechanisms instead of policy, so that application developers can have the maximum freedom to innovate and offer competitive solutions.

In one embodiment, the peer-to-peer platform may use a universal unique identifier (UUID), a 128-bit datum to refer to an entity (a peer, an advertisement, a service, etc.). This preferably may be used to guarantee that each entity has a unique UUID within a local runtime environment, but because a global state is not assumed, it may not be possible to provide a guarantee of uniqueness across an entire community that may consist of millions of peers. This may not be a problem because a UUID may be used within the peer-to-peer platform as an internal identifier. This may becomes significant only after the UUID is securely bound to other information such as a name and a network address. In one embodiment, the peer-to-peer platform may support and/or provide sophisticated naming and binding services.

An advertisement may be defined as a structured document that names, describes, and publishes the existence of a peer-to-peer platform resource, such as a peer, a peer group, a pipe, or a service. In one embodiment, the advertisement may be an XML document. In one embodiment, the peer-to-peer platform may define a basic set of advertisements. In one embodiment, more advertisement subtypes may be formed from these basic types using schema (e.g. XML schema).

A peer may be defined as any entity that can speak the protocols required of a peer. As such, a peer may manifest in the form of a processor, a process, a machine, or a user. In one embodiment, a peer does not need to understand all of the protocols of the peer-to-peer platform. The peer can still perform at a reduced level if it does not support one or more of the protocols.

Peer-to-peer platform messages are preferably useable on top of asynchronous, unreliable, and unidirectional transport. Therefore, in one embodiment, a message may be a Datagram that may include an envelope and a stack of protocol headers with bodies. The envelope may include a header, a message digest, (optionally) the source endpoint, and the destination endpoint. An endpoint may be defined as a logical destination, in one embodiment given in the form of a URI, on any networking transport capable of sending and receiving Datagram-style messages. Endpoints are typically mapped to physical addresses by a messaging layer. Such a message format preferably supports multiple transport standards. Each protocol body may include a variable number of bytes, and one or more credentials used to identify the sender to the receiver. In one embodiment, the exact format and content of the credentials are not specified by the peer-to-peer platform. For example, a credential may be a signature that provides proof of message integrity and/or origin. As another example, a message body may be encrypted, with the credential providing further information on how to decrypt the content.

A peer group may be defined as a virtual entity that speaks the set of peer group protocols. Typically, a peer group is a collection of cooperating peers that may provide a common set of services. In one embodiment, the peer-to-peer platform does not dictate when, where, or why to create a peer group, or the type of the group, or the membership of the group. In one embodiment, the peer-to-peer platform does not define how to create a peer group. In one embodiment, the peer-to-peer platform is not concerned with what sequence of events a peer or a group comes into existence. Moreover, in one embodiment, the peer-to-peer platform does not limit how many groups a peer can belong to. In one embodiment if nested groups can be formed. The peer-to-peer platform may define how to discover peer groups, e.g. using the peer discovery protocol. In one embodiment, there may be a special group, called the World Peer Group, that may include all peer-to-peer platform peers. Peers inside the world peer group may not be able to discover or communicate with each other—e.g., they may be separated by a network partition. In one embodiment, participation in the World Peer Group is by default.

Pipes may be defined as communication channels for sending and receiving messages, and are preferably asynchronous. Pipes are preferably unidirectional, so in one embodiment there are input pipes and output pipes. In one embodiment, pipes may also be virtual, in that a pipe's endpoint may be bound to one or more peer endpoints. In one embodiment, a pipe may be dynamically bound to a peer at runtime via the pipe binding protocol. In one embodiment, a pipe may be moved around and bound to different peers at different times. This is useful, for example, when a collection of peers together provide a high level of fault tolerance, where a crashed peer may be replaced by a new peer at a different location, with the latter taking over the existing pipe to keep the communication going.

In one embodiment, a point-to-point pipe connects exactly two peer endpoints together. The pipe is an output pipe to the sender and input pipe to the receiver, with traffic going in one direction only—from the sender to the receiver. In one embodiment, a propagate pipe may connect two or more peer endpoints together, from one output pipe to one or more input pipes. The result is that any message sent into the output pipe is sent to all input pipes.

The peer-to-peer platform preferably does not define how the internals of a pipe works. Any number of unicast and multicast protocols and algorithms, and their combinations, may be used. In one embodiment, one pipe can be chained together where each section of the chain uses an entirely different transport protocol.

Pipes in the peer-to-peer platform are preferably asynchronous, unidirectional, and unreliable, because this is the foundation of all forms of transport and carries with it the lowest overhead. In one embodiment, enhanced pipes with additional properties such as reliability, security, quality of service may be supported. In embodiments where the peer-to-peer platform runs on top of transports that have such properties, an implementation may optimize and utilize the transports. For example, when two peers communicate with each other and both have TCP/IP support, then an implementation may create bi-directional pipes.

In one embodiment, the peer-to-peer platform may be implemented in Java. In one embodiment, the peer-to-peer platform may run on any of various operating systems (with the appropriate level of Java runtime support, if required) including, but not limited to, Windows95, 98, 2000, ME, and NT, Solaris and Linux.

The peer-to-peer platform preferably does not mandate exactly how discovery is done. Discovery may be completely decentralized, completely centralized, or a hybrid of the two. Embodiments of the peer-to-peer platform may support one or more of the following discovery mechanisms. Other discovery mechanisms may be supported as well:

LAN-based discovery. This is done via a local broadcast over the subset.

Discovery through invitation. If a peer receives an invitation (either in-band or out-of-band), the peer information contained in the invitation may be used to discover a (perhaps remote) peer.

Cascaded discovery. If a peer discovers a second peer, the first peer may, with the permission of the second peer, view the horizon of the second peer, discovering new peers, groups, and services.

Discovery via rendezvous points. A rendezvous point is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

The peer-to-peer platform preferably does not mandate how messages are propagated. For example, when a peer sends out a peer discovery message, the peer discovery protocol preferably does not dictate if the message should be confined to the local area network only, or if it must be propagated to every corner of the world.

In one embodiment, the peer-to-peer platform may use the concept of a peer group as an implicit scope of all messages originated from within the group. In one embodiment, a scope may be realized with the formation of a corresponding peer group. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message can propagate the message based on the scope indicator. Using this approach, it is preferable that a sending peer is bootstrapped with some well-defined scopes and also can discover additional scopes.

The peer-to-peer platform may be used as a foundation for peer-to-peer systems. Objectives of the peer-to-peer platform include, but are not limited to:

Interoperability—preferably, any P2P systems built with the peer-to-peer platform can talk to each other Platform independence—the peer-to-peer platform preferably may be implemented with any programming language and may preferably run on any software and hardware platform, and Ubiquity—the peer-to-peer platform may be deployed on any device with a "digital heartbeat"

In one embodiment, the peer-to-peer platform may be defined as a set protocols, which use messages such as XML messages. As such, it stays away from APIs and remains independent of programming languages, so that it can be implemented in C/C++, Java, Perl, or other languages. This means heterogeneous devices with completely different software stacks can preferably interoperate through peer-to-peer platform protocols.

The peer-to-peer platform is preferably also independent of transport protocols. It may be implemented on top of TCP/IP, HTTP, Bluetooth, HomePNA, and many other protocols. This means that a system built on top of the peer-to-peer platform may function in the same fashion when the system is expanded to a new networking environment or to a new class of devices, as long as there is a correct transport protocol handler for the new networking protocol.

In one embodiment, a peer-to-peer platform may include implementations in multiple languages such as Java, C/C++ and KVM to support various devices as peers. In one embodiment, a peer-to-peer platform may be implemented in C/C++ on some devices, for example, to support devices without Java support. In one embodiment, a peer-to-peer platform may be implemented in KVM on some devices, so that all KVM capable devices such as PDAs and cell phones can be peer-to-peer platform peers.

Peer-to-Peer Platform Protocols

In one embodiment, a common thread among peer-to-peer platform peers is protocols, not APIs or software implementations. The peer-to-peer platform protocols preferably guarantee interoperability between compliant software components executing on potentially heterogeneous peer runtimes.

Thus the peer-to-peer platform is preferably agnostic to programming languages. The term compliant may refer to a single protocol only. That is some peers may not implement all the core protocols. Furthermore, some peers may only use a portion (client-side or server-side only) of a protocol.

The protocols defined in this document may be realized over networks including, but not limited to, the Internet, a corporate Internet, a dynamic proximity network, in a home networking environment, LANs, and WANs. The protocols defined in this document may also be realized within a single computer. Thus, the peer-to-peer platform is preferably transport protocol independent. The size and complexity of the network peers that may support these protocols preferably includes a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

One embodiment of the peer-to-peer platform may include a peer discovery protocol. This protocol enables a peer to find advertisements on other peers, and can be used to find any of the peer, peer group, or advertisements. In one embodiment, the peer discovery protocol is the default discovery protocol for all peer groups, including the World Peer Group. The peer-to-peer protocol may be used as a default discovery protocol that allows all peer-to-peer platform peers to understand each other at the very basic level. In one embodiment, peer discovery may be done with or without specifying a name for either the peer to be located or the group to which peers belong. When no name is specified, all advertisements (of the requested type) may be returned.

One embodiment of the peer-to-peer platform may include a peer resolver protocol. This protocol enables a peer to send and receive generic queries to find or search for peers, peer groups, pipes, and other information. In one embodiment, this protocol is typically implemented only by those peers that have access to data repositories and offer advanced search capabilities.

One embodiment of the peer-to-peer platform may include a peer information protocol. This protocol allows a peer to learn about other peers' capabilities and status. For example, a peer can send a ping message to see if another peer is alive. A peer may also query another peer's properties where each property has a name and a value string.

One embodiment of the peer-to-peer platform may include a peer membership protocol. This protocol may allow a peer to obtain group membership requirements (such as an understanding of the necessary credential for a successful application to join the group), to apply for membership and receive a membership credential along with a full group advertisement, to update an existing membership or application credential, and finally, to cancel a membership or an application credential. In one embodiment, authenticators and/or security credentials may be used to provide the desired level of protection.

One embodiment of the peer-to-peer platform may include a pipe binding protocol. This protocol may allow a peer to bind a pipe advertisement to a pipe endpoint, thus indicating where messages actually go over the pipe. A pipe may be viewed as an abstract, named message queue that supports a number of abstract operations such as create, open, close, delete, send, and receive. In one embodiment, bind occurs during the open operation, whereas unbind occurs during the close operation.

One embodiment of the peer-to-peer platform may include a peer endpoint protocol. This protocol may allow a peer to ask a peer router for available routes for sending a message to a destination peer. Two communicating peers may not be directly connected to each other. One example of this might include two peers that are not using the same network transport protocol, or peers separated by firewalls or a NAT (Network Address Translation). Peer routers may respond to queries with available route information, which is a list of gateways along the route. In one embodiment, any peer may decide to become a peer router by implementing the peer endpoint protocol.

Bindings

Figure 2:
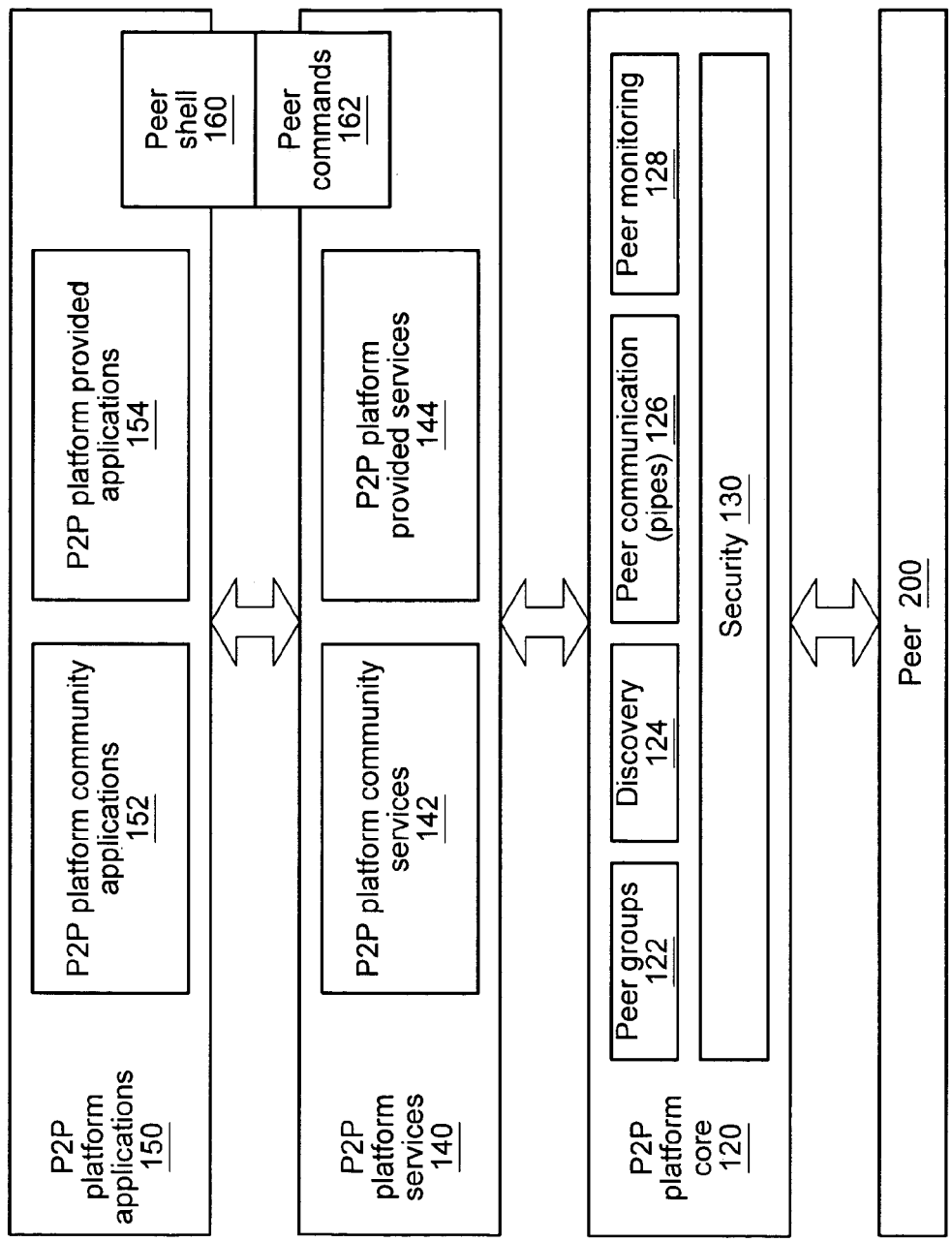
FIG. 2 illustrates protocols and bindings in a peer-to-peer platform according to one embodiment.

When the peer-to-peer platform protocols are implemented using a particular programming language and over a particular transport protocol, the implementation is an instance of a peer-to-peer platform binding, where the peer-to-peer platform protocols are bound to the language and the transport layer. In one embodiment, protocol and peer software implementation issues may be defined in documents specific to the binding. A binding document describes how the protocols are bound to an underlying network transport (like TCP/IP or UDP/IP) or to a software platform such as UNIX or Java. FIG. 2 illustrates protocols and bindings in a peer-to-peer platform according to one embodiment.

Services

Peers may cooperate and communicate with each other to locate and access services. Some services may be well known and may be referred to as peer-to-peer platform core services. Core services may include, but are not limited to, discovery and membership services. Other services may be user-defined and provide application dependent services such as content searching and indexing.

The peer-to-peer platform core protocols are preferably 100% decentralized and thus may enable pure peer-to-peer network computing. However, user defined services may be implemented that may offer the ability to mix-in centralization as a means of increasing performance. Examples of user defined services may include, but are not limited to:

Efficient long-distance peer lookup and rendezvous using a peer naming and discovery service.
Simple, low-cost information search and indexing using a content sharing service.
Interoperability with existing centralized networking infrastructure and security authorities in corporate, public, private, or university networks using administration services.

A service denotes a set of functions that a provider offers. In one embodiment, a peer-to-peer platform peer can offer a service by itself or in cooperation with other peers. In one embodiment, a service provider peer may publicize the service by publishing a service advertisement. Other peers can then discover this service and make use of it. In one embodiment, each service has a unique ID and name that consists of a canonical name string and a series of descriptive keywords that uniquely identifies the service.

A service may be well defined and widely available such that a peer can just use it. For other services, special code may be needed in order to actually access the service. For example, the way to interface with the service provider may be encoded in a piece of software. In this case, it is preferable if a peer can locate an implementation that is suitable for the peer's specific runtime environment. In one embodiment, if multiple implementations of the same service are available, then peers hosted on Java runtimes can use Java programming language implementations while native peers to use native code implementations. In one embodiment, service implementations may be pre-installed into a peer node or loaded from the network. In one embodiment, once a service is installed and activated, pipes may be used to communicate with the service.

A peer service that executes only on a single peer may be referred to as a peer service. A service that is composed of a collection of cooperating instances of the service running on multiple peers may be referred to as a peer group service. A peer group service can employ fault tolerance algorithms to provide the service at a higher level of availability than that a peer service can offer.

In one embodiment, although the concept of a service is orthogonal to that of a peer and a peer group, a group formed using the peer-to-peer platform may require a minimum set of services needed to support the operation of the group.

In one embodiment, the peer-to-peer platform may include a set of default peer group services such as peer discovery, as well as a set of configurable services such as routing. In one embodiment, a peer-to-peer platform peer may not be required to have one or all of these services. For example, a cell phone peer may be pre-configured with enough information to contact a fixed server provided by the telecom operator. This may be enough to bootstrap the cell phone peer without requiring it to independently carry with it additional services.

Advertisements

Information exchanged between peers may include advertisement documents. The peer-to-peer platform preferably includes advertisement documents to represent all of the peer-to-peer platform resources managed by the core platform, such as peers, peer groups, pipes or services. In one embodiment, all advertisement documents may be defined in a markup language. In one embodiment, all advertisement documents may be defined in XML and are therefore software platform neutral. In one embodiment, each document may be converted to and from a platform specific representation such as a Java objects.

Peers

Network nodes (peers) of various kinds may join the platform by implementing one or more of the platform's protocols. Each peer operates independently and asynchronouslly of any other peer, providing a degree of reliability and scalability not typically found in current distributed systems. Peers discover each other on the network in order to form transient relationships.

Peer Protocols

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Peer Groups

Peer groups may be used in a peer-to-peer network to:
Define a domain of trust
Define a set of common services (protocols)
Define a scope of peer interaction
Define an administration and monitoring domain
In the peer-to-peer platform, a peer group may:
have a common membership definition
be a collection of member peers support a set of services as agreed upon by the member peers.

In one embodiment, each member peer in the peer group may support the set of services.

Peer group services in the peer-to-peer platform may include, but are not limited to:
Core Services
  Minimal services to form a peer group
  Protocols defined by the peer-to-peer platform
  In one embodiment, the peer-to-peer platform core services may provide a reference implementation for user-defined services
User Defined Services
  May provide additional API(s)
Peer-to-peer platform core peer group services may include, but are not limited to:
Membership services (e.g. authentication, credential, and access control)
Discovery services (members, and groups)
Pipe services (member communication channel)
Monitoring services (peer info, and statistics)
In one embodiment, the peer-to-peer protocol may support core protocols including, but not limited to:
Membership
  Peer Membership Protocol
Discovery
  Peer Discovery Protocol
  Peer Resolver Protocol
Pipe
  Pipe Binding Protocol
  Peer Endpoint Protocol
Monitoring
  Peer Information Protocol
In one embodiment, discovery in the peer-to-peer platform may provide:
Spontaneous configuration
Adaptive connectivity
A dynamic (i.e. no fixed) network topology
No required centralized naming (e.g. no DNS)
The ability to reach the "edge of the Internet" (firewall, and NAT)
In one embodiment, a peer-to-peer platform discovery service may:
Leverage surrounding peers and peer groups
Provide meetings points for far away peers and groups
Preferably require no centralized naming
Use an asynchronous protocol
Provide pre-defined meeting points (bootstrapping)
Provide reverse discovery
Provide the ability for a peer to learn about other peer's abilities
In one embodiment, the peer-to-peer platform discovery service may support:
Propagate Discovery
  Unicast to predefined rendezvous
  Leverage transport dependent multicast (e.g. IP)
Unicast Discovery
  Unicast to known rendezvous for forward propagation
  May be used for reverse Discovery
The peer-to-peer platform discovery service is preferably adaptive. The peer-to-peer platform discovery service is preferably extensible. The peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Figure 28:
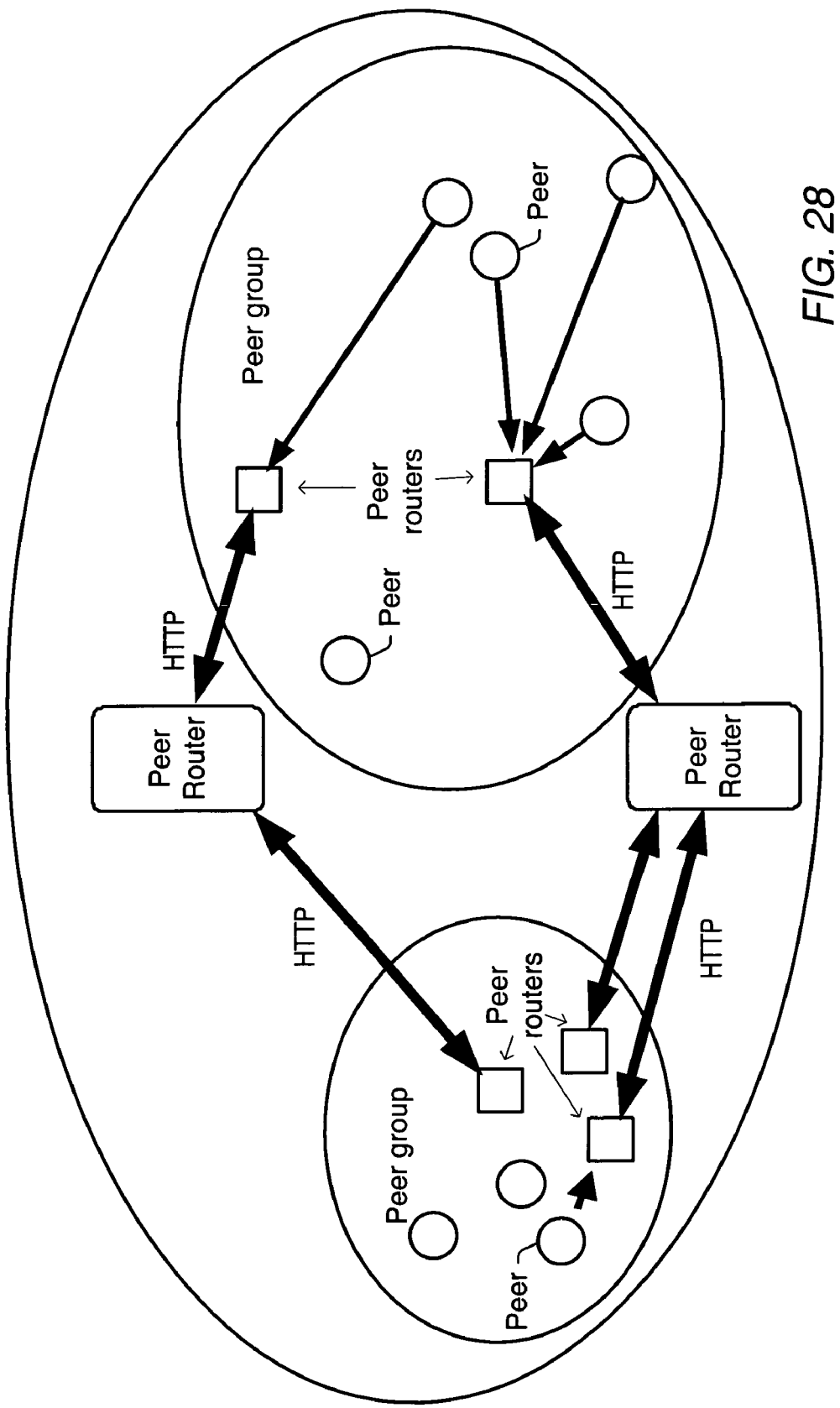
FIG. 28 illustrates one embodiment of message routing in a peer-to-peer network that uses the peer-to-peer platform.

FIG. 28 illustrates one embodiment of message routing in a peer-to-peer network that uses the peer-to-peer platform. Networks may be partitioned by firewalls, NAT (Network Address Translation) routers, etc. Message routing may allow messages to be delivered in partitioned networks. In one embodiment, message routing may route messages to "unreachable" peers, i.e. may allow messages sent from a peer to reach peers that are otherwise unreachable. Message routing preferably provides optimized message delivery, for example by optimizing routes between peers. Message routing preferably allows for an adaptive peer-to-peer network (e.g. peers may move to remote locations and still receive messages). Message routing preferably provides load-balancing. In one embodiment, any peer may be a router peer.

One embodiment may provide for HTTP routing servers. In one embodiment, HTTP routers may provide for message routes that traverse firewalls. In one embodiment, HTTP routers may provide NAT support. In one embodiment, HTTP routers may act as message gateways (TTL). TTL stands for Time To Live (how long the request lives in the system).

Advertisements
In one embodiment, advertisements may be used as the peer-to-peer platform's language neutral metadata structures. In one embodiment, each software platform binding may describe how advertisements are converted to and from native data structures such as Java objects or 'C' structures. Each protocol specification may describe one or more request and response message pairs. In one embodiment, advertisements may be the most common document exchanged in messages. In one embodiment, the peer-to-peer platform defines core advertisement types including, but not limited to:
  Peer Advertisement.
  Peer Group Advertisement
  Pipe Advertisement.
  Service Advertisement.
  Content Advertisement.
  Endpoint Advertisement.

In one embodiment, user defined advertisement subtypes (for example, using XML schemas) may be formed from these basic types. The peer-to-peer platform protocols and core software services however, preferably operate only on the core objects.

Messages
In one embodiment, the peer-to-peer platform may use asynchronous messages as a basis for providing Internet-scalable peer-to-peer communication. In one embodiment, the messages may be in a markup language. In one embodiment, the markup language is XML. Each peer's messaging layer may deliver an ordered sequence of bytes from the peer to another peer. The messaging layer may send information as a sequence of bytes in one atomic message unit. In one embodiment, messages may be sent between peer endpoints. In one embodiment, an endpoint may be defined as a logical destination (e.g. embodied as a URI) on any networking transport capable of sending and receiving Datagram-style messages. Endpoints may be mapped into physical addresses by the messaging layer at runtime. The peer-to-peer platform preferably does not assume that the networking transport is IP-based.

The messaging layer may use the transport specified by the URI to send and receive messages. In one embodiment, both reliable connection-based transports such as TCP/IP and unreliable connection less transports like UDP/IP may be supported. Other current or future message transports such as IRDA and Bluetooth may also be supported by using the endpoint addressing scheme.

In one embodiment, the peer-to-peer platform messages are datagrams that may include an envelope and a stack of protocol headers with bodies. The envelope may include a header, a message digest, a source endpoint (optional), and a destination endpoint. Each protocol header may include a <tag> naming the protocol in use and a body length. Each protocol body may be a variable length amount of bytes that is protocol <tag> dependent. Each protocol body may include one or more credentials used to identify the sender to the receiver.

When an unreliable networking transport is used, each message may be delivered more than once to the same destination or may not arrive at the destination. Two or more messages may arrive in a different order than sent. In one embodiment, high-level communication services layered upon the core protocols may perform message re-ordering, duplicate message removal, and processing acknowledgement messages that indicate some previously sent message actually arrived at a peer. Regardless of transport, messages may be unicasted (point to point) between two peers or may be propagated (like a multicast) to a peer group. Preferably, no multicast support in the underlying transport is required.

Message Credentials

A credential is a key that, when presented in a message body, may be used to identify a sender and to verify that sender's right to send the message to the specified endpoint. The credential may be an opaque token that is preferably presented each time a message is sent. In one embodiment, the sending address placed in the message envelope may be cross-checked with the sender's identity in the credential. Credentials may be stored in the message body on a per-protocol <tag> basis. In one embodiment, each credential's implementation may be specified as a plug-in configuration, which preferably allows multiple authentication configurations to coexist on the same network.

Figure 3:
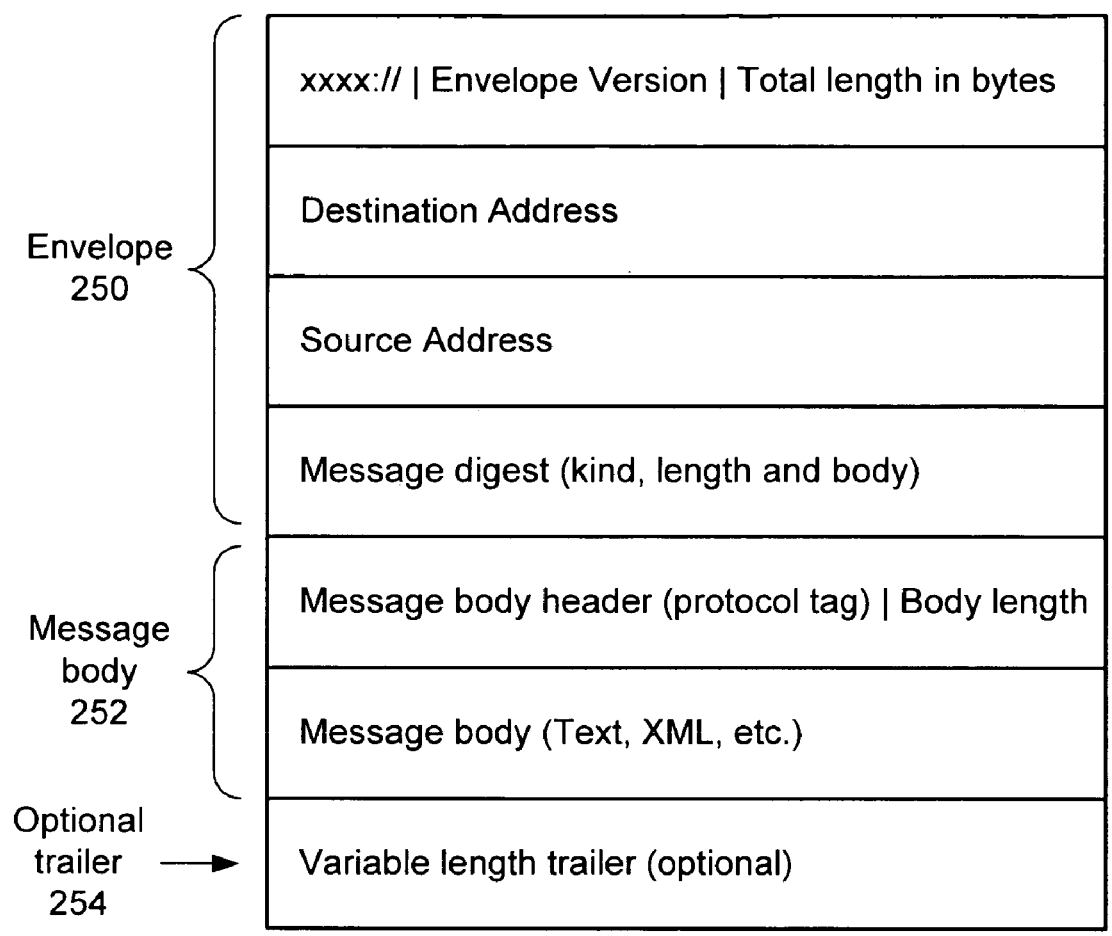
FIG. 3 illustrates a peer-to-peer platform message format according to one embodiment.

The peer-to-peer platform messages 252 are preferably defined with the envelope 250 as illustrated in FIG. 3. In one embodiment, the messages are defined in a markup language. In one embodiment, the markup language is XML. The following is an exemplary message in XML:

```
<?xml version="1.0" encoding="ISO-8859-1"?>
    <SampleMessage>
        <SampleMessageVersion> version number "1.0"</SampleMessageVersion>
        <SampleMessageDest> destination peer id </SampleMessageDest>
        <SampleMessageSrc> source peer id </SampleMessageSrc>
        <SampleMessageDigest> digest </SampleMessageDigest>
        <SampleMessageTagName> tag </SampleMessageTagName>
        <SampleMessageTagData> body </SampleMessageTagData>
                ..............
        <SampleMessageTagName> tag </SampleMessageTagName>
        <SampleMessageTagData> body </SampleMessageTagData>
    </SampleMessage>
```

Pipes

Pipes are virtual communication channels used to send and receive messages between services or applications over peer endpoints. In one embodiment, pipes are unidirectional, asynchronous, and stateless. Pipes connect one or more peer endpoints. In one embodiment, at each endpoint, software to send, or receive, as well as to manage associated pipe message queues is assumed, but not mandated. The pipe endpoints are referred to as input pipe and output pipes. Pipe endpoints are dynamically bounded to a peer at runtime via a pipe binding protocol in one embodiment. Pipes may provide the illusion of a virtual in and out mailbox that is independent of any single peer location. Services and applications may communicate through pipes without knowing on which physical peer a pipe endpoint is bound. When a message is sent into a pipe, the message is sent to all peer endpoints currently connected (listening) to the pipe. The set of currently connected pipe endpoints (input pipes) may be obtained using the pipe binding protocol.

A pipe may offer several modes of communication including, but not limited to:

Point to Point pipe—A point to point pipe connects exactly two pipe endpoints together, an input pipe that receives messages sent from the output pipe. In one embodiment, no reply operation is supported. In one embodiment, additional information in the message payload (for example, a unique ID) may be required to thread message sequences.

Propagate pipe—A propagate pipe may connect two or more input and output pipe endpoints together. Messages flow into the input pipes from an output pipe (propagation source). A propagate message may be sent to all listening input pipes. This process may create multiple copies of the message to be sent. In one embodiment, where peer groups map to underlying physical subnets in a one-to-one fashion, transport multicast be may used as an implementation optimization for propagate.

Figure 4:
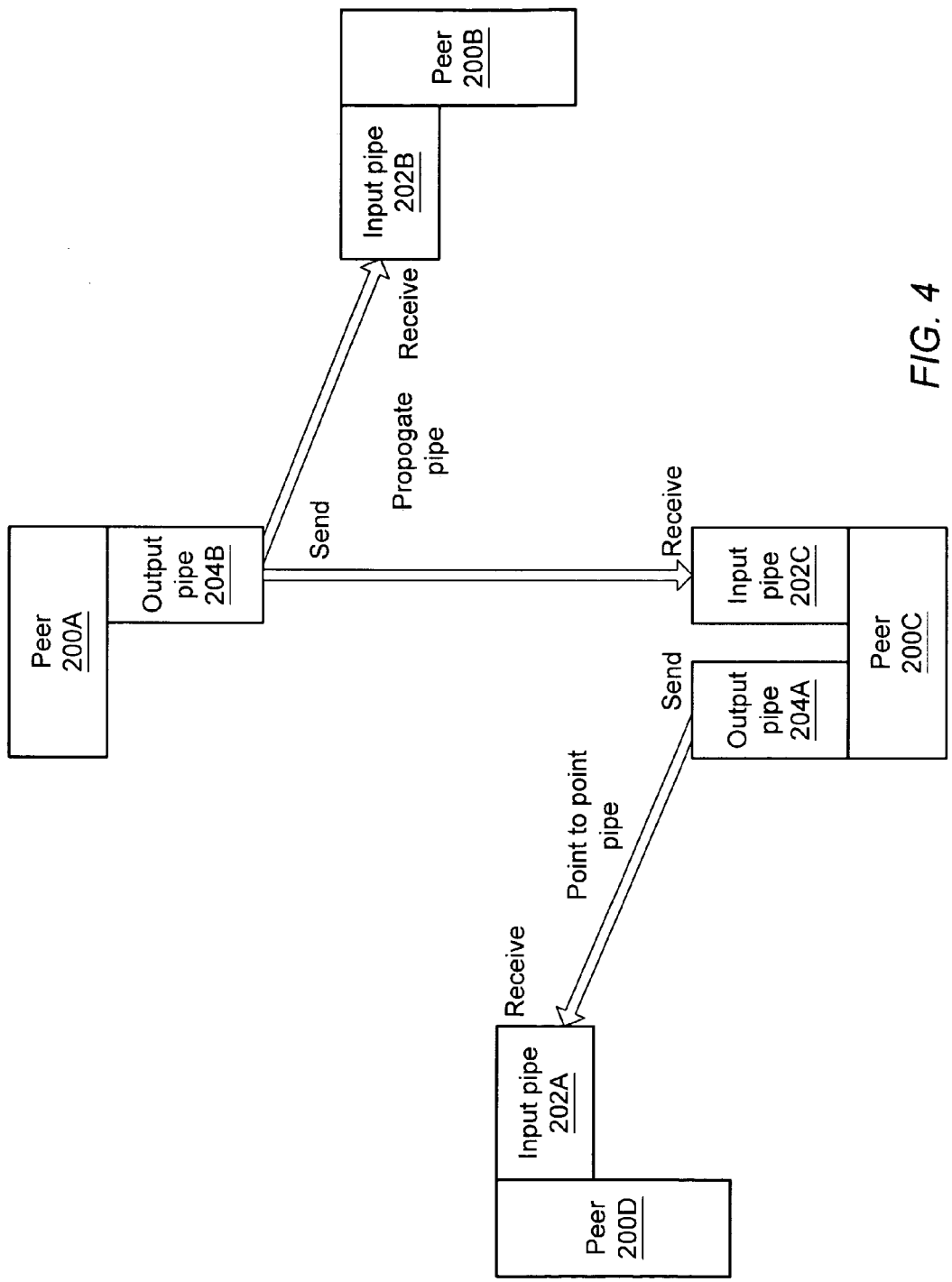
FIG. 4 illustrates a point-to-point pipe connection between peers according to one embodiment.

FIG. 4 illustrates a point-to-point pipe connection between peers 200C and 200D. FIG. 4 also illustrates a propagate pipe with peer 200A as a propagation source and peers 200B and 200C with listening input pipes.

Services

Peer-to-peer platform peers may cooperate and communicate to publish and access services. In one embodiment, each service may have a unique identifier and a name that may include a canonical name string and a series of descriptive keywords that uniquely identifies the service. In one embodiment, in order to access a service, a peer may locate an implementation suitable for the peer's runtime environment. For example, multiple implementations of the same service may allow Java peers to use Java code implementations, and native peers to use native code implementations.

In one embodiment, the peer-to-peer platform may recognize two levels of services, peer services and peer group services. A peer service may execute on a single peer network only. If that peer fails, the service also fails. This level of service reliability may be acceptable for an embedded device, for example, providing a calendar and email client to a single user. A peer group service may be composed of a collection of cooperating instances of the service running on multiple peers. If any one of the peer services fails, the collective peer group service may not be affected, because at least one of the other peer services may still be available.

One embodiment of the peer-to-peer platform may define a set of core peer group services that may be used to build peer groups. The core peer group services may provide the minimum services required to form a peer group (e.g. membership and discovery services). Other peer group services may be defined by users for delivering specific services. For example, a resolver service may be implemented to find active (running on some peer) and inactive (not yet running) service instances.

In one embodiment, services may either be pre-installed into a peer or loaded from the network. The process of finding, downloading and installing a service from the network may include performing a search on the network for the service, retrieving the service, and then installing the service. Once a service is installed and activated, pipes may be used to communicate with the service.

Service Advertisements

In one embodiment, a service may have a name that also indicates the type or purpose of the service and optional information (e.g. a set of keywords) that further describes the service. The name and keyword elements may be stored within a service advertisement. The advertisement may also include other information needed to configure and instantiate a service.

Peer Groups

A peer group is a collection of cooperating peers providing a common set of services. The peer-to-peer platform preferably does not dictate when, where, or why to create a peer group. Preferably, the peer-to-peer platform only describes how to create and discover peer groups. In one embodiment, peers wishing to join a peer group may first locate a current member, and then request to join the peer group. The application to join may be rejected or accepted by the collective set of current members. In one embodiment, a peer group core membership service may be used to enforce a vote among one or more group members. Alternatively, one or more group representative member peers may be elected or appointed to accept or reject new membership applications.

The peer-to-peer platform may recognize several motivations for creating or joining peer groups including, but not limited to, the following:

- To create a secure cooperative environment. Secure services may be provided to peers within a secured peer group. Peer groups may form virtual secure regions. Their boundaries may or may not reflect any underlying physical network boundaries such as those imposed by routers and firewalls. The concept of a region may virtualize the notion of routers and firewalls, subdividing the network in a self-organizing fashion without respect to actual physical network boundaries.
- To create a limited scope environment to ensure scalability. Peer groups may be formed primarily based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.
- To create a controlled and self-administered environment. Peer groups may provide a self-organized structure that is self-managed and can be locally managed.

Peer groups preferably provide several capabilities including, but not limited to:

- The ability to find nearby peers
- The ability to find named peers anywhere on the peer-to-peer platform
- The ability to find named peer groups anywhere on the peer-to-peer platform
- The ability to join and resign from a peer group
- The ability to establish pipes between peer group members
- The ability to find and exchange shared content Peer Group Core Services In one embodiment, the peer-to-peer platform may define core services that enable the creation of peer groups including, but not limited to, the following core services. In one embodiment, it is not required that all core services be implemented by every peer group:

- Discovery service—a discovery service may be used to search for peers, and peer groups. The search criteria may include a peer or peer group name (string).
- Access Service—a access service may be used to validate, distribute, and authenticate a group member's credentials. The access service may define the type of credential used in the message-based protocols used within the peer group.
- Membership service—a membership service may be used by the current members to reject or accept a new group membership application. The membership service may be used by current members during the login process.
- Pipe service—a pipe service may be used to manage and create pipe connections between the different peer group members.
- Resolver service—a resolver service may be used to send query string to peers to find information about a peer, a peer group, a service or a pipe.

Security

The security requirements of a P2P system are very similar to any other computer system. The three dominant requirements are confidentiality, integrity, and availability. These translate into specific functionality requirements that include authentication, access control, audit, encryption, secure communication, and non-repudiation. Such requirements are usually satisfied with a suitable security model or architecture, which is commonly expressed in terms of subjects, objects, and actions that subjects can perform on objects. For example, UNIX has a simple security model. Users are subjects. Files are objects. Whether a subject can read, write, or execute an object depends on whether the subject has permission as expressed by the permissions mode specified for the object. However, at lower levels within the system, the security model is expressed with integers, in terms of uid, gid, and the permission mode. Here, the low-level system mechanisms do not (need to) understand the concept of a user and do not (need to) be involved in how a user is authenticated and what uid and gid they are assigned.

Given that the peer-to-peer platform is defined around the concepts of peers and peer groups, one embodiment may include a security architecture in which peer IDs and group IDs are treated as low-level subjects (just like uid and gid), codats 1 are treated as objects (just like files), and actions are those operations on peers, peer groups, and codats. In this embodiment, given that codats may have arbitrary forms and properties, it may not be clear what sets of actions should be defined for them. In one embodiment, the codats may carry or include definitions of how they should be accessed. Such codats are analogous to objects, which define for themselves access methods others can invoke.

The security requirements for the peer-to-peer platform may be further affected by one or more of several other characteristics of the peer-to-peer platform. In one embodiment, the peer-to-peer platform may be focused on mechanisms and not policy. For example, UUIDs are used throughout, but they by themselves have no external meaning.

Without additional naming and binding services, UUIDs are just numbers that do not correspond to anything like a user or a principal. Therefore, the peer-to-peer platform preferably does not define a high-level security model such as information flow, Bell-LaPadula, or Chinese Wall. In one embodiment, when UUIDs are bound to external names or entities to form security principals, authenticity of the binding may be ensured by placing in the data field security attributes, for example, digital signatures that testify to the trustworthiness of the binding. Once this binding is established, authentication of the principal, access control based on the principal as well as the prevailing security policy, and other functions such as resource usage accounting may be performed.

The peer-to-peer platform is preferably neutral to cryptographic schemes and security algorithms. As such, the peer-to-peer platform preferably does not mandate any specific security solution. In such cases, a framework may be provided where different security solutions can be plugged in. In one embodiment, hooks and placeholders may be provided so that different security solutions may be implemented. For example, every message may have a designated credential field that may be used to place security-related information. In one embodiment, exactly how to interpret such information is not defined in the peer-to-peer platform, and may be left to services and applications.

In one embodiment, the peer-to-peer platform may sometimes satisfy security requirements at different levels of the system. To allow maximum flexibility and avoid redundancy, the peer-to-peer platform preferably does not force a particular implementation on developers. Instead, preferably, enhanced platforms based on the peer-to-peer platform may provide the appropriate security solutions to their targeted deployment environment. To illustrate the last point, two security concerns (communications security and anonymity) are examined.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

Anonymity does not mean the absence of identity. Indeed, sometimes a certain degree of identification is unavoidable. For example, a cell phone number or a SIM card identification number cannot be kept anonymous, because it is needed by the phone company to authorize and set up calls. As another example, the IP number of a computer cannot be hidden from its nearest gateway or router if the computer wants to send and receive network traffic. In general, anonymity can be built on top of identity, but not vice versa. There may be multiple ways to ensure anonymity. In the examples above, it is difficult to link a prepaid SIM card sold over the retail counter for cash to the actual cell phone user. Likewise, a cooperative gateway or router may help hide the computer's true IP address from the outside world by using message relays or NAT (Network Address Translation).

In one embodiment, a peer-to-peer platform-based naming service may bind a peer to a human user. The user's anonymity may be ensured through the naming service, or the authentication service, or a proxy service, or any combination of these. The peer-to-peer platform is preferably independent of the solution chosen by a particular application.

At many places, the peer-to-peer platform is preferably independent of specific security approaches. In one embodiment, the peer-to-peer platform may provide a comprehensive set of security primitives to support the security solutions used by various peer-to-peer platform services and applications. Embodiments of the peer-to-peer platform may provide one or more security primitives including, but not limited to:

- A simple crypto library supporting hash functions (e.g., MD5), symmetric encryption algorithms (e.g., RC4), and asymmetric crypto algorithms (e.g., Diffie-Hellman and RSA).
- An authentication framework that is modeled after PAM (Pluggable Authentication Module, first defined for the UNIX platform and later adopted by the Java security architecture).
- A simple password-based login scheme that, like other authentication modules, can be plugged into the PAM framework.
- A simple access control mechanism based on peer groups, where a member of a group is automatically granted access to all data offered by another member for sharing, whereas non-members cannot access such data.
- A transport security mechanism that is modeled after SSL/TLS, with the exception that it is impossible to perform a handshake, a crypto strength negotiation, or a two-way authentication on a single pipe, as a pipe is uni-directional.
- The demonstration services called InstantP2P and CMS (content management service) also make use of additional security features provided by the underlying Java platform.

In one embodiment, peers, configurations, peer groups, and pipes form the backbone of the peer-to-peer platform. In one embodiment, security in the peer-to-peer platform may use:

- Credentials—opaque tokens that provide an identity and a set of associated capabilities
- Authenticators—code (e.g. computer-executable instructions) that may be used to receive messages that either request a new credential or request that an existing credential be validated.

Preferably, all messages include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RCA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

Peer Group Content Sharing

Peers may be grouped into peer groups to share content. An item of shared content may be a text file, a structured document (e.g. a PDF or XML file), or even an active content like a network service. In one embodiment, content may be shared among group members, but not between groups. In this embodiment, no single item of content may belong to more than one group.

In one embodiment, each item of content may have a unique identifier also known as its canonical name. The unique identifier may include a peer group universal unique identifier (UUID), and also may include another name that may be computed, parsed, and maintained by peer group members. In one embodiment, the content's name implementation within the peer group is not mandated by the peer-to-peer platform. The name may be a hash code, a URI, or a name generated by any suitable means of uniquely identifying content within a peer group. The entire canonical content name may be referred to as a content identifier or content ID. FIG. 5 illustrates an exemplary content identifier according to one embodiment. In one embodiment, a content item may be advertised to make the item's existence known and available to group members through the use of content advertisements.

Content

An instance of content may be defined as a copy of an item of content. Each content copy may reside on a different peer in the peer group. The copies may differ in their encoding type. HTML, XML and WML are examples of encoding types. These copies may have the same content identifier, and may even exist on the same peer. An encoding metadata element may be used to differentiate the two copies. Each copy may have the same content identifier as well as a similar set of elements and attributes. Making copies of content on different peers may help any single item of content be more available. For example, if an item has two instances residing on two different peers, only one of the peers needs to be alive and respond to the content request. In one embodiment, whether to copy an item of content may be a policy decision that may be encapsulated in higher-level applications and services.

Network Services (Active Content)

Items of content that represent a network service may be referred to as active content. These items may have additional core elements above and beyond the basic elements used for identification and advertisement. Active content items may be recognized by Multi-Purpose Internet Mail Extensions (MIME) content type and subtype. In one embodiment, all peer-to-peer platform active contents may have the same type. In one embodiment, the subtype of an active content may be defined by network service providers and may be used to imply the additional core elements belonging to active content documents. In one embodiment, the peer-to-peer platform may give latitude to service providers in this regard, yielding many service implementation possibilities.

Peer-to-Peer Platform Advertisements

In one embodiment, an advertisement is a markup language (e.g. XML) structured document that names, describes, and publishes the existence of a peer-to-peer platform resource. In one embodiment, the peer-to-peer platform may define core advertisement types including, but not limited to, peer advertisements, peer group advertisements, pipe advertisements, service advertisements, content advertisements, and endpoint advertisements. In one embodiment, user defined advertisement subtypes (e.g. using XML schemas) may be formed from these basic types. The peer-to-peer platform protocols, configurations, and core software services however, preferably operate only on the core advertisements. In one embodiment, subtypes of the core advertisements may be used to add an unlimited amount of extra, richer metadata to a peer-to-peer network.

XML

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

In one embodiment, peer-to-peer platform advertisements may be represented in the Extensible Markup Language (XML). XML provides a powerful means of representing data and metadata throughout a distributed system. XML provides universal (software-platform neutral) data because XML is language agnostic, self-describing, strongly-typed and ensures correct syntax. In one embodiment, advertisements may be strongly typed and validated using XML schemas. In one embodiment, only valid XML documents that descend from the base XML advertisement types may be accepted by peers supporting the various protocols requiring that advertisements be exchanged in messages. Another powerful feature of XML is its ability to be translated into other encodings such as HTML and WML. In one embodiment, this feature of XML may be used to enable peers that do not support XML to access advertised resources.

Advertisement Document Structure

Advertisements represented in XML, like any XML document, may be composed of a series of hierarchically arranged elements. Each element may include its data and additional elements. An element may also have attributes. Attributes are name-value string pairs. An attribute may be used to store metadata, which may be used to describe the data within the element.

Peer Advertisements

In one embodiment, a peer advertisement may be used to describe a peer. One use of a peer advertisement is to hold specific information about the peer, such as its name, peer identifier, registered services and available endpoints. FIG. 6 illustrates the content of a peer advertisement according to one embodiment. The following is an example of one embodiment of a peer advertisement in XML, and is not intended to be limiting:

```
<?xml version="1.0" encoding="ISO-8859-1"?>
<PeerAdvertisement>
    <Name> name of the peer</Name>
    <Keywords>search keywords </Keywords>
    <Pid> Peer Id </Pid>
    <Properties> peer properties </Properties>
    <Service> service advertisement</Service>
    ...........
    <Service> Service advertisement</Service>
    <Endpoint> endpoint Advertisement </Endpoint>
    ...........
    <Endpoint> endpoint Advertisement </Endpoint>
</PeerAdvertisement>
```

Peer Group Advertisements

In one embodiment, a peer group advertisement may be used to describe, for a peer group, the group specific information (name, peer group identifier, etc.), the membership process, and the provided peer group services. Once a peer joins a group, that peer may receive (depending again upon membership configuration) a full membership-level advertisement. The full membership advertisement, for example, might include the configuration (required of all members) to vote for new member approval. FIG. 7 illustrates the content of a peer group advertisement according to one embodiment. The following is an example of one embodiment of a peer group advertisement in XML, and is not intended to be limiting:

```
<?xml version="1.0" encoding="ISO-8859-1"?>
<PeerGroupAdvertisement>
    <Name> name of the peer group</Name>
    <Keywords>search keywords </Keywords>
    <Pid> Peer Id </Pid>
    <Gid> Peer group Id </Gid
    <Service> service advertisement</Service>
    ...........
    <Service> Service advertisement</Service>
</PeerGroupAdvertisement>
```

Pipe Advertisements

A pipe advertisement may be used to describe an instance of a pipe communication channel. In one embodiment, a pipe advertisement document may be published and obtained using either the core discovery service or by embedding it within other advertisements such as the peer or peer group advertisement. Each pipe advertisement may include an optional symbolic name that names the pipe and a pipe type to indicate the type of the pipe (point-to-point, propagate, secure, etc). FIG. 8 illustrates the content of a pipe advertisement according to one embodiment. The following is an example of one embodiment of a pipe advertisement in XML, and is not intended to be limiting:

```
<?xml version="1.0"encoding="ISO-8859-1"?>
<PipeAdvertisement>
    <Name> name of the pipe</ Name>
    <Id> Pipe Id </Id>
    <Type> Pipe Type </Type>
</PipeAdvertisement>
```

Service Advertisements

In one embodiment, a service advertisement may be used to describes an instance of a service running on a peer. All the built-in core services, for example, may be made available to the peer-to-peer platform by publishing a service advertisement. The service advertisement document may be published and obtained using the peer information protocol for peer services, or alternatively using the peer group discovery protocol for peer group services. Service advertisements preferably describe how to activate and/or use the service. In one embodiment, the core peer group services that each peer group preferably implements in order to respond to the messages described for the peer group protocols advertise their existence in this manner. In one embodiment, the access method for services is a schema of valid XML messages accepted by the service. FIG. 9 illustrates the content of a service advertisement according to one embodiment. The following is an example of one embodiment of a service advertisement in XML, and is not intended to be limiting:

```
<?xml version="1.0" encoding="ISO-8859-1"?>
<ServiceAdvertisement>
    <Name> name of the Service</Name>
    <Version> Version Id </Version>
    <Keywords>search keywords </Keywords>
    <Id> Service Id </Id>
    <Pipe> Pipe endpoint to access the service </Pipe>
    <Params> service configuration params </Params>
    <URI> service provider location</URI>
    <Provider> Service Provider</Provider>
    <AccessMethod> method </AccessMethod>
    .........
    <AcessMethod> method </AccessMethod>
</ServiceAdvertisement>
```

Content Advertisements

In one embodiment, a content advertisement may be used to describe a content document stored somewhere in a peer group. In one embodiment, each item of content may have a unique identifier also known as its canonical name. The unique identifier may include a peer group universal unique identifier (UUID), and also may include another name that may be computed, parsed, and maintained by peer group members. In one embodiment, the content's name implementation within the peer group is not mandated by the peer-topeer platform. The name may be a hash code, a URI, or a name generated by any suitable means of uniquely identifying content within a peer group. The entire canonical content name may be referred to as a content identifier or content ID. FIG. 5 illustrates an exemplary content identifier according to one embodiment.

FIG. 10 illustrates the content of a content advertisement according to one embodiment. A size element is preferably provided for all content items and gives the total size of the content. In one embodiment, the size is in bytes. In one embodiment, the size is a long (unsigned 64-bits). A service advertisement may also include a MIME (Multi-Purpose Internet Mail Extensions) type which describes the MIME type (encoding may be deduced from the type) of the in-line or referenced data. A service advertisement may also include an aboutID element. If the advertised content is another advertisement (based upon its type), the aboutID is the content ID of the referenced content. If the advertised content is not another advertisement, the AboutID element may be omitted.

The following is an example of one embodiment of a content advertisement in XML, and is not intended to be limiting:

```
<?xml version="1.0" encoding="ISO-8859-1"?>
<ContentAdvertisement>
    <Mime-type> name of the pipe</Mime-type>
    <Size> Pipe Id </Size>
    <Encoding> Pipe Type </Encoding>
    <Id> Content Id</Id>
    <About> Content Id about </About>
    <Document> document </Document>
</ContentAdvertisement>
```

Endpoint Advertisements

In one embodiment, an endpoint advertisement may be used to describe peer network interfaces and/or supported protocols on a peer. A peer may have one or more network interfaces that may be used as peer endpoints. Typically, there will be one peer endpoint for each configured network interface or protocol (e.g. IP, HTTP). An endpoint advertisement may be included as a tag field in a peer advertisement to describe the endpoints available on the member peer. In one embodiment, an endpoint advertisement document may be published and obtained using either the core discovery service or by embedding it within other advertisements such as the peer advertisement. Each endpoint advertisement may include transport binding information about each network interface or transport protocol. Endpoints may be represented with a virtual endpoint address that may include all necessary information to create a physical communication channel on the specific endpoint transport. For example, "tcp://123.124.20.20:1002" or "http://134.125.23.10:6002" are string representing endpoint addresses. FIG. 11 illustrates the content of an endpoint advertisement according to one embodiment. The following is an example of one embodiment of an endpoint advertisement in XML, and is not intended to be limiting:

```
<?xml version="1.0" encoding="ISO-8859-1"?>
<EndpointAdvertisement>
    <Name> name of the endpoint</Name>
    <Keywords> serach string </Keywords>
    <Address> endpoint logical address </Address>
    <Transport> Transport </Transport>
</EndpointAdvertisement>
```

Peer-to-Peer Platform Core Protocols

In one embodiment, the peer-to-peer platform may include networking protocols including, but not limited to, the following. Preferably, a peer is not required to implement all of the networking protocols. A peer preferably needs to implement only the protocol that it requires:

In one embodiment, the peer-to-peer platform may include a peer discovery protocol that may allow a peer to discover other peers and peer group advertisements. This protocol may be used to find members of any kind of peer group, presumably to request membership.

In one embodiment, the peer-to-peer platform may include a peer resolver protocol that may allow a peer to send simple search queries to another peer group member.

In one embodiment, the peer-to-peer platform may include a peer information protocol that may allow a peer to learn about other peers' capabilities and status.

In one embodiment, the peer-to-peer platform may include a peer membership protocol that may allow a peer to join or leave peer groups, and to manage membership configurations, rights and responsibilities.

In one embodiment, the peer-to-peer platform may include a pipe binding protocol that may allow a peer to find the physical location of a pipe endpoint and bind a pipe endpoint to a physical peer.

In one embodiment, the peer-to-peer platform may include a peer endpoint protocol (also referred to as an endpoint routing protocol) that may allow a peer to ask for peer routing information to reach another peer.

A peer group may be viewed as an abstract region of the network, and may act as a virtual subnet. The concept of a region virtualizes the notion of routers and firewalls, subdividing the network in a self-organizing fashion without respect to actual physical network boundaries. The term region may be used to refer to a peer group. In one embodiment, peer groups implicitly define a region scope that may limit peer propagation requests. In one embodiment, by default, every peer is part of a world peer group. The world peer group may include all peers on the peer-to-peer platform. The world peer group preferably provides the minimum seed for every peer to potentially find each other and form new groups. In one embodiment, the world peer group does not have a membership.

The term rendezvous peer may be used to designate a peer that designates itself to be a rendezvous point for discovering information about other peers, peer groups, services and pipes. Rendezvous peers preferably cache information that may be useful to peers including new peers. In one embodiment, any or even all members of a peer group may become rendezvous peers in a peer group. In one embodiment, each peer group may have different policies to authorize a peer to become a peer rendezvous. Rendezvous peers may provide an efficient mechanism for peers that are far away to find (e.g. discover) each other. Rendezvous peers may make peer discovery more practical and efficient. Preferably, a peer group is not required to have a rendezvous peer.

The term peer router may be used to describe a peer that crosses one or more regions and that designates itself to be a router between the regions. In one embodiment, any or all peer members may become routers. In one embodiment, peer groups may have different policies to authorize a peer to become a peer router for other peers. Peer routers may be used to route messages between different network protocols (e.g. TCP/IP, Irda) or to peers that are behind firewalls.

Discovery

In one embodiment, a peer may go through a proximity network, which also may be referred to as a subnet or region, to try to find (discover) surrounding peers. The Internet includes the concept of subnets which are physically defined by physical routers which define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers which are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and also a format for a response message. A propagate may ask who's there (what peers are in the subnet). One or more peers may decide to respond. Other peers on the subnet may choose not to respond if they don't want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message which is configured to discover peer groups. Peers in the proximity network (region) which are aware of a peer group or peer groups may respond to the peer group discovery message, and may return information on the peer group(s) (e.g. peer group advertisements) of which they are aware. The new peer may use this information to determine a peer group or peer groups which it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. They are more or less at the same level in the p2p platform. Peer discovery uses a message that indicates the discovery is looking for peers, and peer group discovery may use a similar message but that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so long, to discover peers and/or peer groups that are "distant" on the network from the requesting peer.

In one embodiment, the peer rendezvous capabilities may be embedded in the core discovery protocol of the peer-to-peer platform. Rendezvous peers are protocol-based, and may broker more information than name servers that just broker names of entities. In one embodiment, a rendezvous peer may maintain indexes for entities in the peer-to-peer platform including peers, peer groups, and advertisements. These indexes are dynamic which are created as the peer group community grows and more peers join. As a group joins, some peers may decide to become rendezvous peers to help peers connect with other peers in the group.

The rendezvous peer is at the peer level. A rendezvous peer is not a "service". A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer which specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource, for example a service advertisement may include information for connecting to and using the service. Advertisements may be published to allow other entities to discover them. The rendezvous peer may provide the ability for services and applications to store and cache temporary, via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications.

Figure 30:
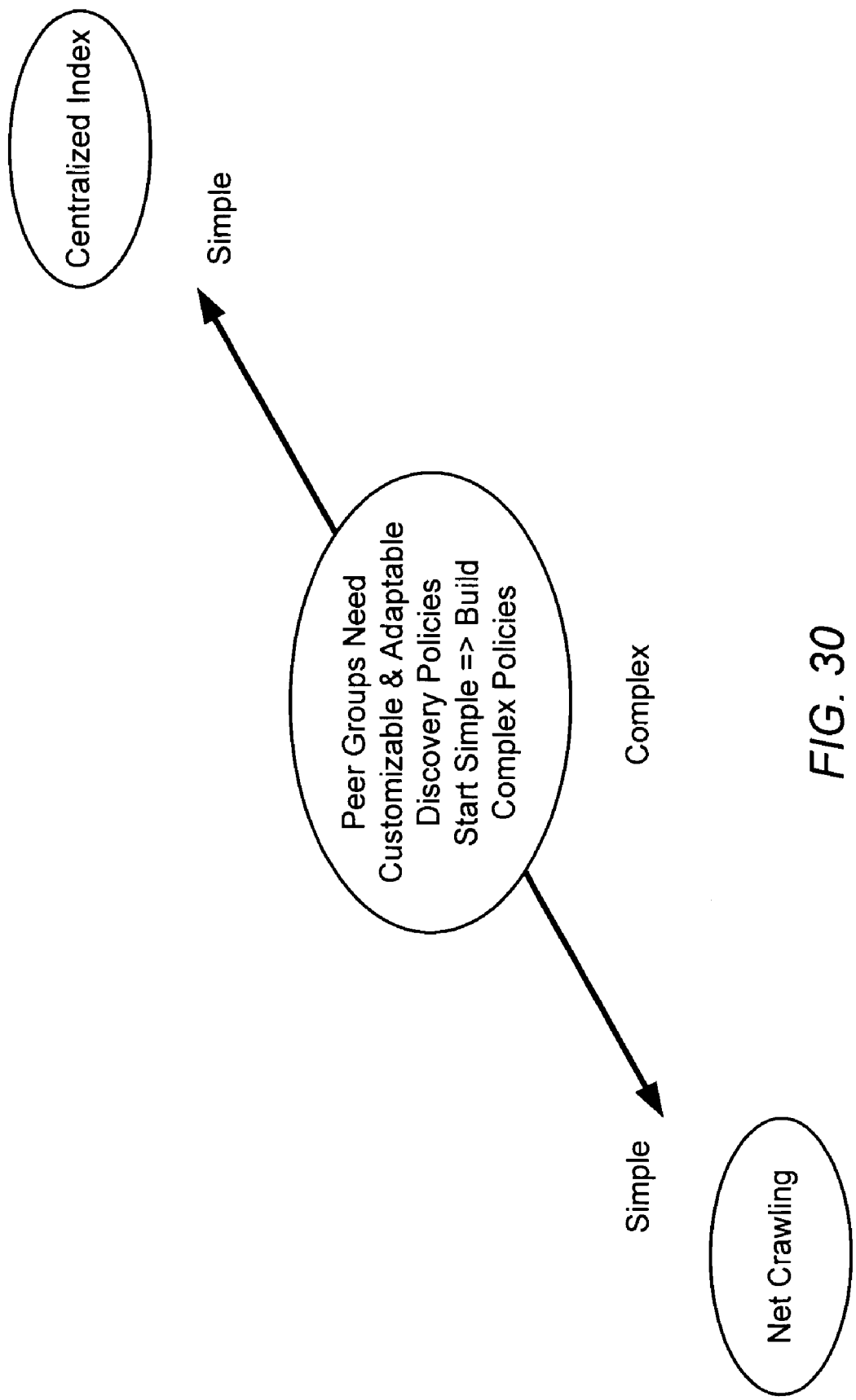
FIG. 30 illustrates an approach to implementing a discovery policy according to one embodiment.

Peer groups need customizable and adaptable discovery policies. As illustrated in FIG. 30, one approach to implementing a discovery policy is to start simple and build more complex policies. In one embodiment, one method of discovery may be based on centralized discovery. This method is used by such peer-to-peer applications as Napster and AIM. Discovery based on a centralized index may:
  Be best for static world
  Be efficient
  Be deterministic
  provide centralized control
  provide a central-point of failures
  be expensive to scale
  provide easy denial of services
  degrade with aging One embodiment may support a method of discovery that may be based on net crawling. This method is used by such peer-to-peer applications as Gnutella and FreeNet. Discovery based on net crawling may:
  Be simple
  Be best for dynamic world
  Be adaptive
  Be difficult to attack
  Provide slower discovery than centralized control
  improve with aging
  be non-deterministic
  be inexpensive to scale A discovery method is needed that may be used that may provide or support several aspects of a peer-to-peer platform including, but not limited to:
  A discovery method may be used in platform bootstrapping
  A discovery method may support a dynamic environment (peers may come and go)
  A discovery method may support an unreliable environment (peers may fail)
  A discovery method may help to adapt to a changing environment through viral behavior
  A discovery method may be used to improve performance as system ages (increase locality)
  A discovery method may be used to find new neighbors
  A discovery method may be used in support of security (change of physical location)
  A discovery method may be used that provides administration-less discovery (zero-admin).

In one embodiment, a discovery mechanism in the core peer-to-peer platform may be used to discover abstractions and/or entities in the peer-to-peer network including, but not limited to:
  peers
  peer groups
  peer group policies (group defined services)
  pipe endpoints In one embodiment, a core discovery mechanism in the core peer-to-peer platform preferably may not discover some entities in the peer-to-peer network including, but not limited to:
  content (large scale; in one embodiment, a content management service may be used for content discovery)
  metadata (maintain relation between data)
  users
  applications In one embodiment of a peer-to-peer platform, key concepts of a core discovery mechanism may include, but are not limited to:
  The discovery mechanism may rely on trusted peers (discovery proxies)
  The discovery mechanism may leverage local neighbors (local propagate)
  The discovery mechanism may use rendezvous peers (indexes)
  The discovery mechanism may leave traces in discovery proxies (cache)
  The discovery mechanism may use net-crawling as a last resort (propagate between trusted discovery proxies)

Figure 31:
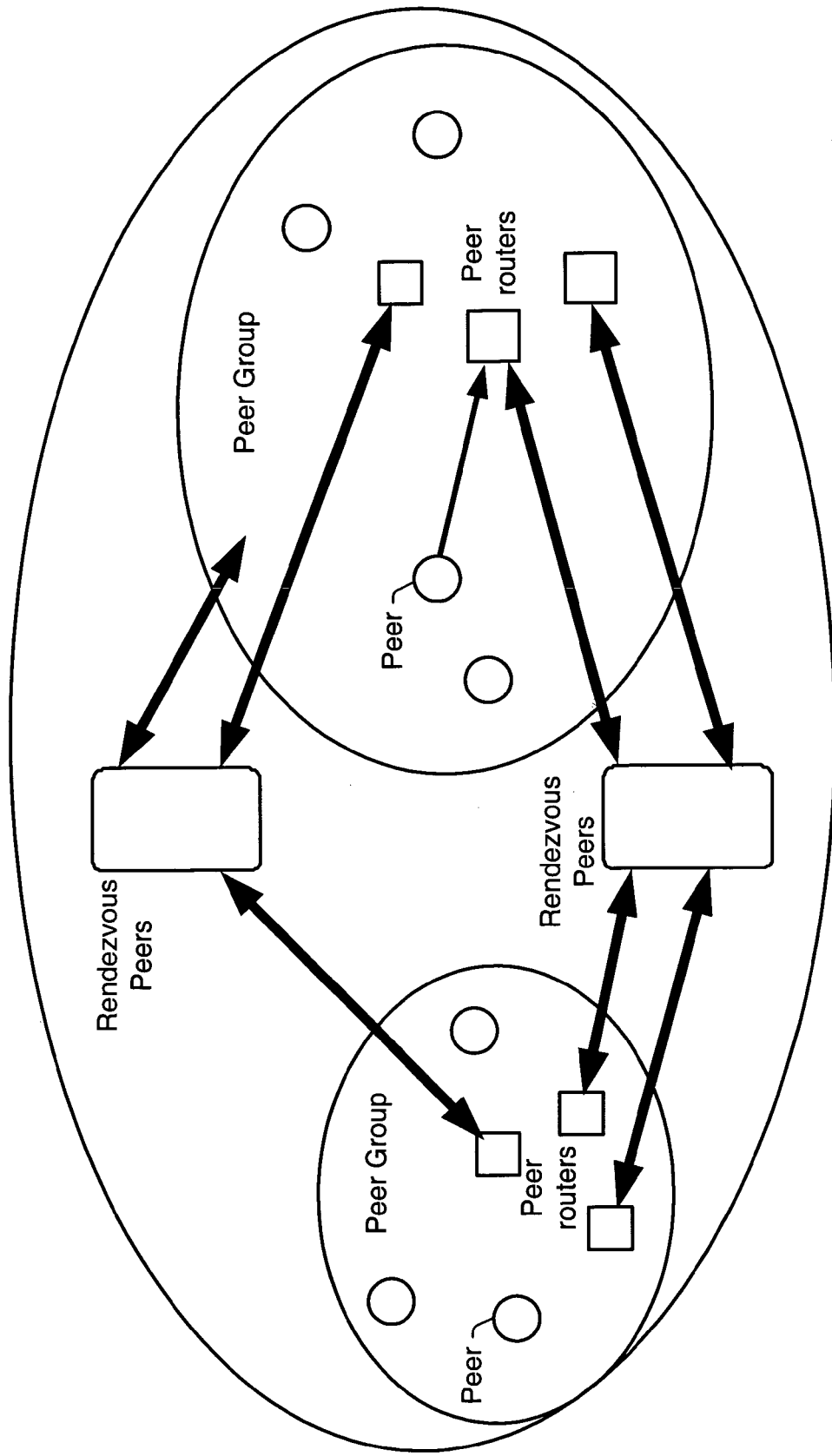
FIG. 31 illustrates discovery through a rendezvous proxy according to one embodiment.
Figure 32:
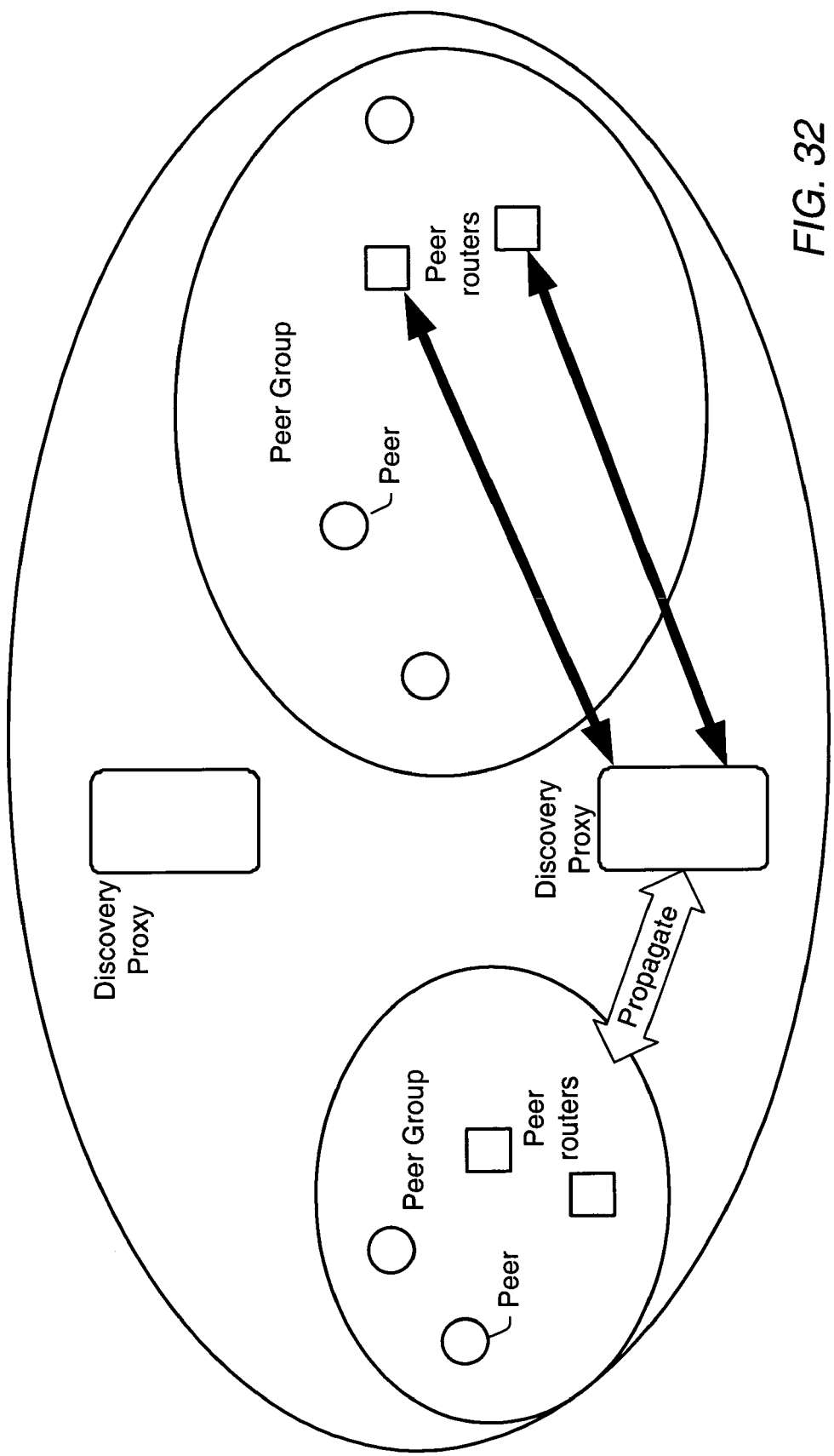
FIG. 32 illustrates discovery through propagate proxies according to one embodiment.

In one embodiment, a peer-to-peer platform web of trust may be used. In a web of trust:
  any peer, when trusted, can become a discovery proxy
  trusted members are easier to discover
  new peers may be untrusted peers, and may be typically difficult to find and have limited discovery range (may help protect against misbehaviors and denial of service attacks).
  Some peers may not need to discover beyond their initial net peer group range
  Peers may increase their discovery range as they become more trusted (discovery credential)
  A peer group creator may select initial discovery proxies, and may delegate to new peer members
  discovery proxies may propagate requests between each other for net-crawling discovery In one embodiment, the peer-to-peer platform may be policy-agnostic, and may only provide the basics for discovery. The basics may include one or more core discovery protocols including, but not limited to:

propagate protocol—broadcast within a scope range (subnet or peer group members)
rendezvous protocol—unicast to a trusted discovery peer
invite protocol—reverse discovering In one embodiment, the rendezvous policy may use an index cache (e rendezvous proxy). FIG. 31 illustrates discovery through a rendezvous proxy according to one embodiment. Rendezvous peers cache peer and peer group information. Rendezvous access is restricted to peers with access privileges. Non-trusted peers contact local trusted peers to gain access. In one embodiment, the rendezvous policy may be used across subnets (configurable at peer group level). In one embodiment, the rendezvous policy may be used across/through firewalls (e.g. gateways). In one embodiment, the peer-to-peer platform may include a propagate policy. FIG. 32 illustrates discovery through propagate proxies according to one embodiment. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls). Propagation is restricted to peers with access privileges. A discovery (propagate) proxy controls propagation through message counts and/or TTL (Time To Live) mechanisms. In one embodiment, the peer-to-peer platform may include an invite policy. In one embodiment, the invite policy may support the adding of new peers and peer groups (e.g. publish advertisements). In one embodiment, the peer-to-peer platform may allow the persistent local peer caching of discovery information.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing Reverse Discovery Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery". In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Peer-to-Peer Platform Firewalls and Security

Figure 16:
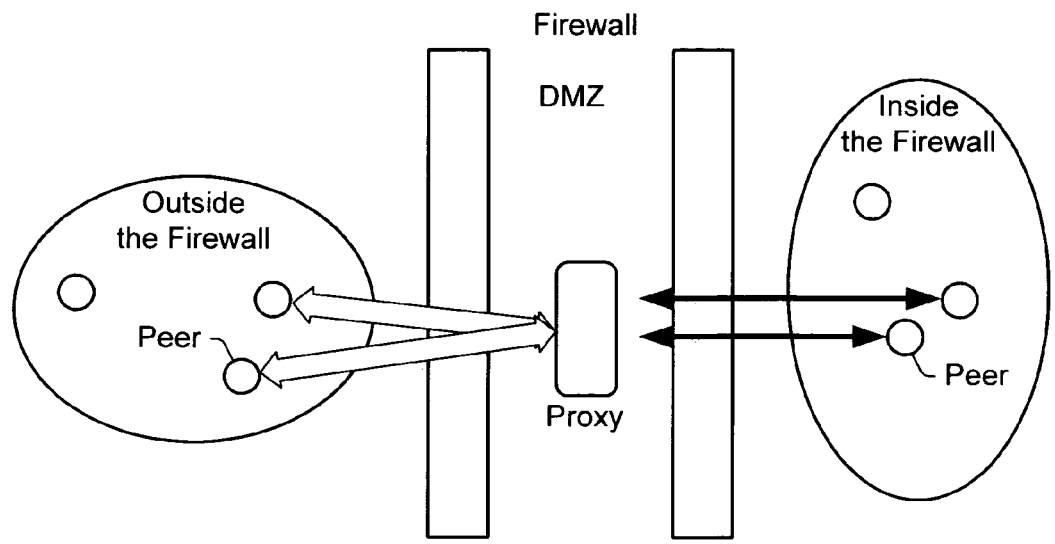
FIG. 16 illustrates traversing a firewall in a virtual private network when access is initiated from outside only according to one embodiment.

This section discusses:

Traversing a firewall with the peer-to-peer platform
Peer-to-peer platform proxy service
The peer-to-peer platform proxy service as a certificate authority
Peer group authentication in the peer-to-peer platform
Privacy in the peer-to-peer platform
Integrity in the peer-to-peer platform The peer-to-peer platform may provide one or more methods for traversing firewalls. FIG. 16 illustrates traversing a firewall in a virtual private network when access is initiated from outside only according to one embodiment. In one embodiment, entry may be restricted to peers with access privileges. In one embodiment, HTTP "tunnels" may be used, with proxies in the DMZ of the firewall.

Figure 17:
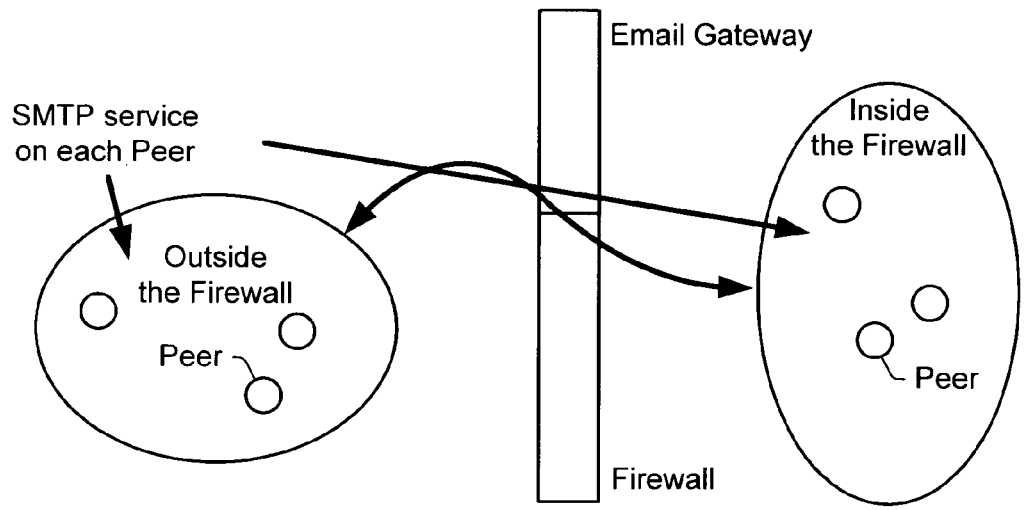
FIG. 17 illustrates email exchange through an email gateway according to one embodiment.

FIG. 17 illustrates email exchange through an email gateway according to one embodiment. In one embodiment, 100% peer-to-peer access may not be guaranteed. In one embodiment, inside the firewall, mail account administration may impose restrictions. In one embodiment, email addresses cannot be required for all peers outside of the firewall. In one embodiment, there may be an SMTP service on each peer.

Figure 18A:
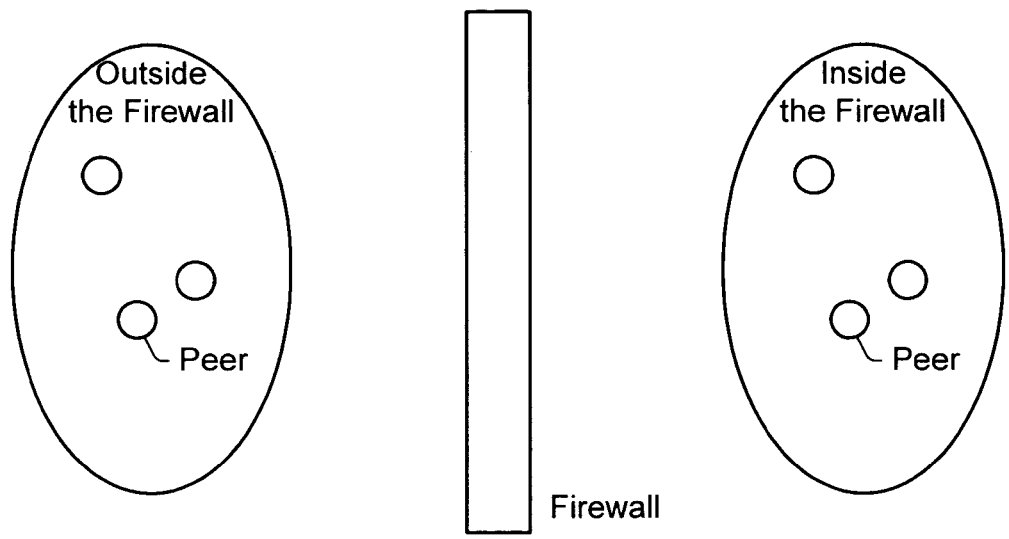
FIGS. 18A through 18D illustrate traversing a firewall when access is initiated from the inside according to one embodiment.
Figure 18B:
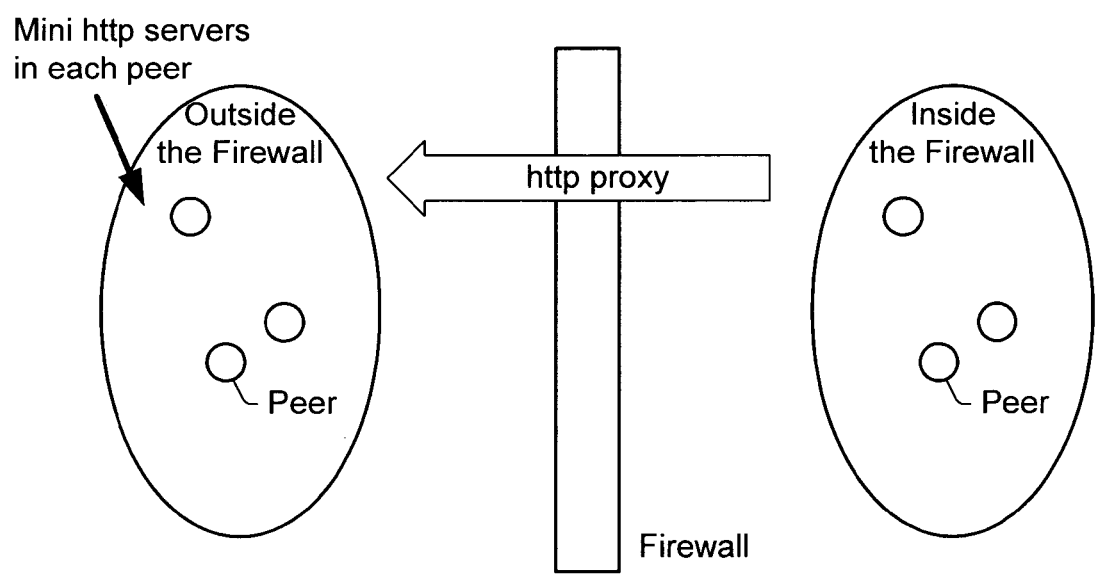
Figure 18C:
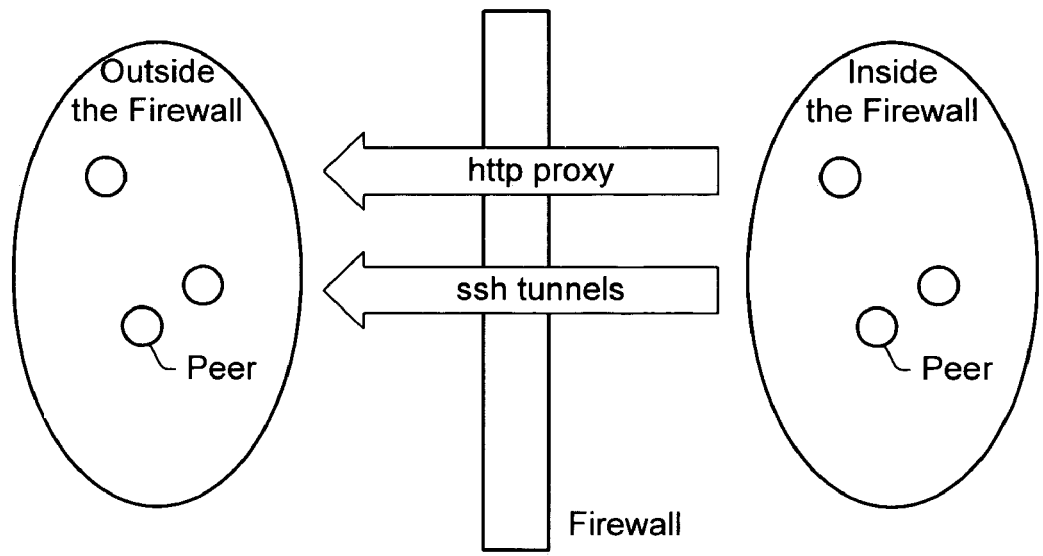
Figure 18D:
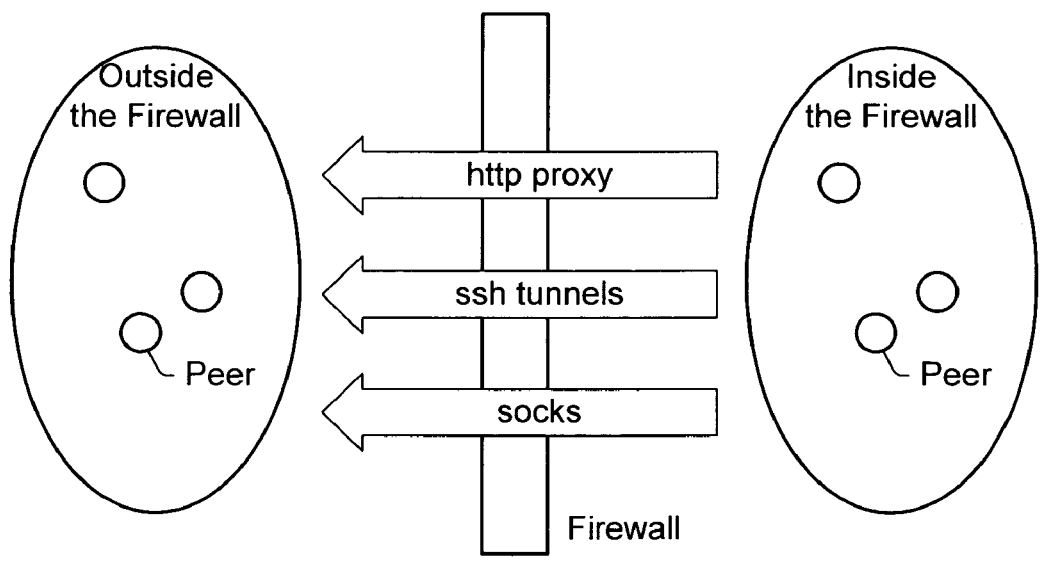

FIGS. 18A through 18D illustrate traversing a firewall when access is initiated from the inside according to one embodiment. FIG. 18A shows a firewall. A region with peers is shown inside the firewall, and another region with peers is shown outside the firewall. As illustrated in FIG. 18B, in one embodiment, peers may include a mini-HTTP server. In one embodiment, peer-to-peer HTTP tunnels may be used. In one embodiment, an HTTP proxy may be used. As illustrated in FIG. 18C, in one embodiment, Secure Shell (SSH) tunnels may be used. As illustrated in FIG. 18D, one embodiment may support SOCKS connections if SOCKS is supported in the firewall. SOCKS is typically used to telnet/ftp to the "outside".

In one embodiment, peer-to-peer platform core protocols may be used for firewall traversal. In one embodiment, the impact on the peer-to-peer protocol core may be minimized in the traversal method. In one embodiment, peers preferably use the "pure" core protocols for traversal whenever possible. In embodiments where the core protocols need to be extended for traversal, a "divide and conquer" technique is preferably used. In a divide and conquer technique, any new configurations (policies) are preferably isolated behind the firewall. A proxy or proxies may then be used to mediate with and bridge to the core protocols.

Preferably, peers on either side of the firewall may initiate peer group contact with full peer-to-peer protocol implementation including, but not limited to:

The ability to initiate peer group discovery

The ability to join/leave peer groups

The ability to create end-to-end pipes (cipher text data exchange when required)

Figure 19A:
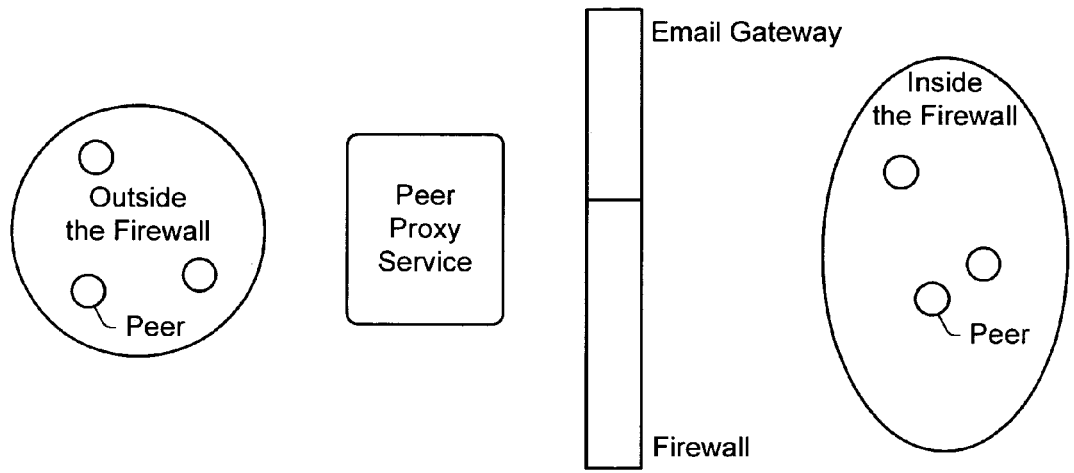
FIGS. 19A through 19E illustrate embodiments of a peer-to-peer platform proxy service, and show various aspects of the operation of the proxy service.
Figure 19B:
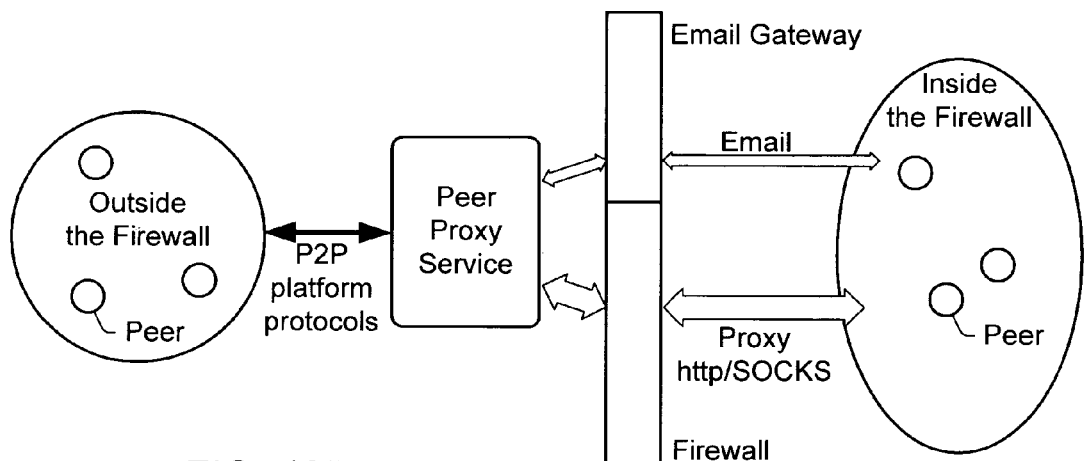
Figure 19C:
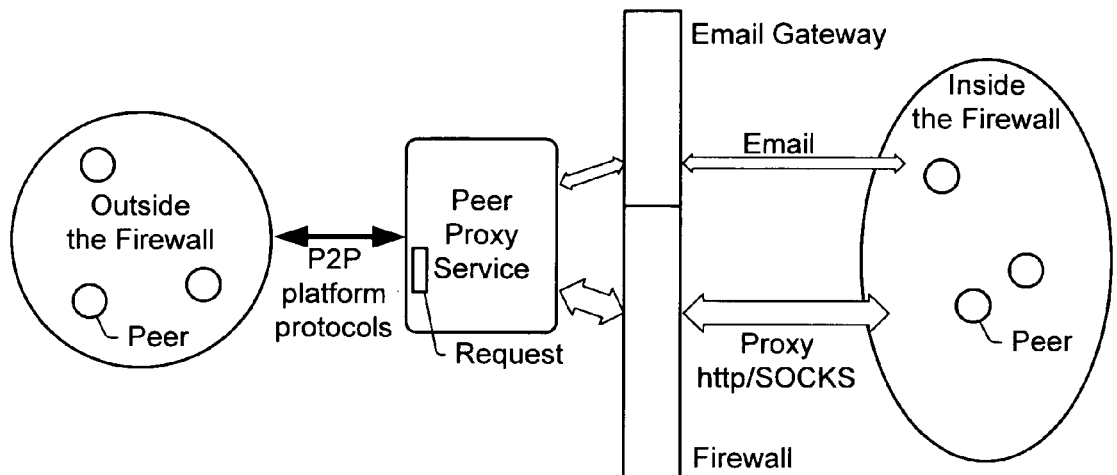
Figure 19D:
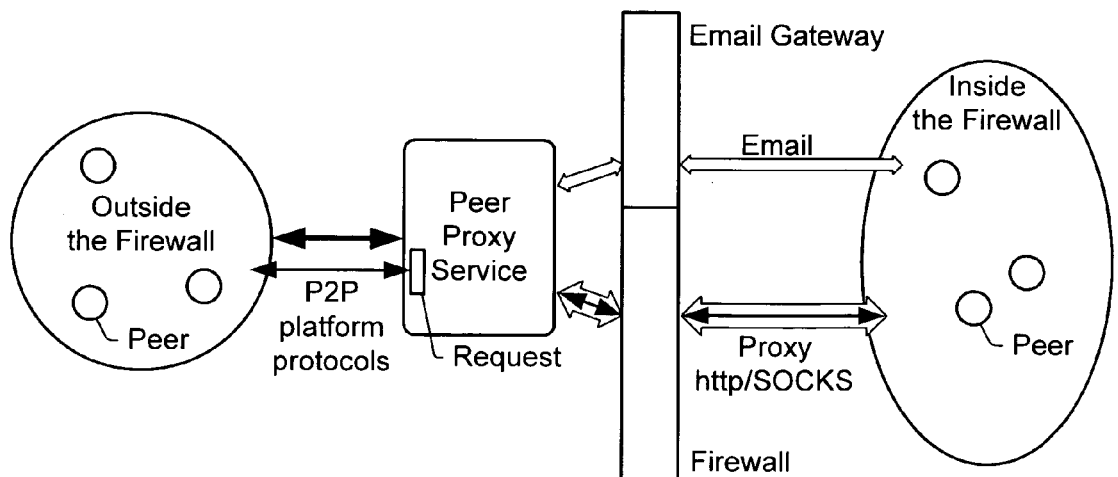
Figure 19E:
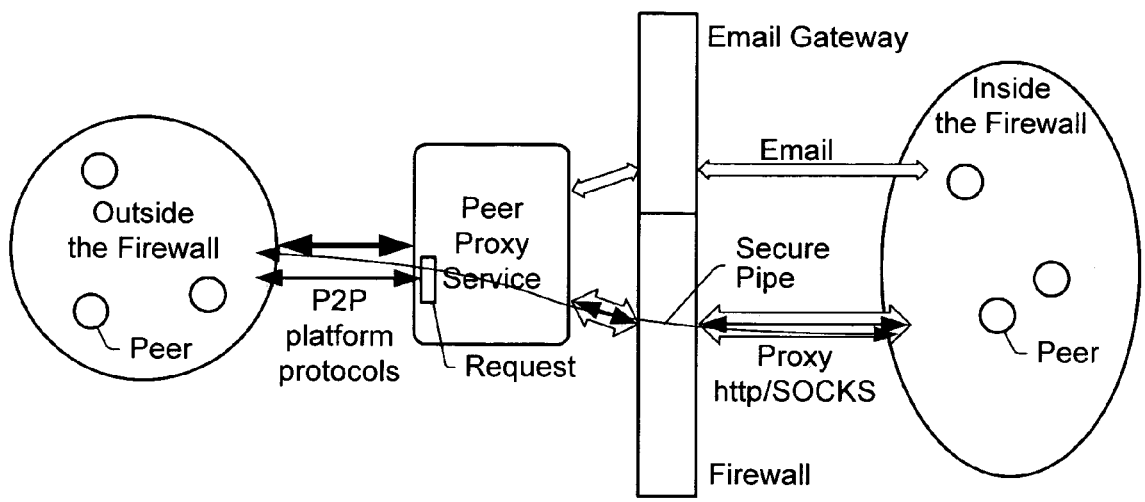

FIGS. 19A through 19E illustrate embodiments of a peer-to-peer platform proxy service, and show various aspects of the operation of the proxy service. FIG. 19A shows a firewall with an email gateway. A region with peers is shown inside the firewall, and another region with peers is shown outside the firewall. A proxy service is also shown outside the firewall. In one embodiment, the peer-to-peer platform proxy service may be used to bridge peer-to-peer platform protocols with HTTP, email and/or SOCKS as illustrated in FIG. 19B. A proxy service may be used to enable peer group contact across firewalls. As illustrated in FIGS. 19C and 19D, the proxy service may allow peers to send requests to communicate across a firewall. Through the proxy service, peer-to-peer platform messages may be posted for delivery across the firewall. As illustrated in FIG. 19E, in one embodiment, the proxy service may allow secure pipes to be established across firewalls as necessary.

Figure 20D:
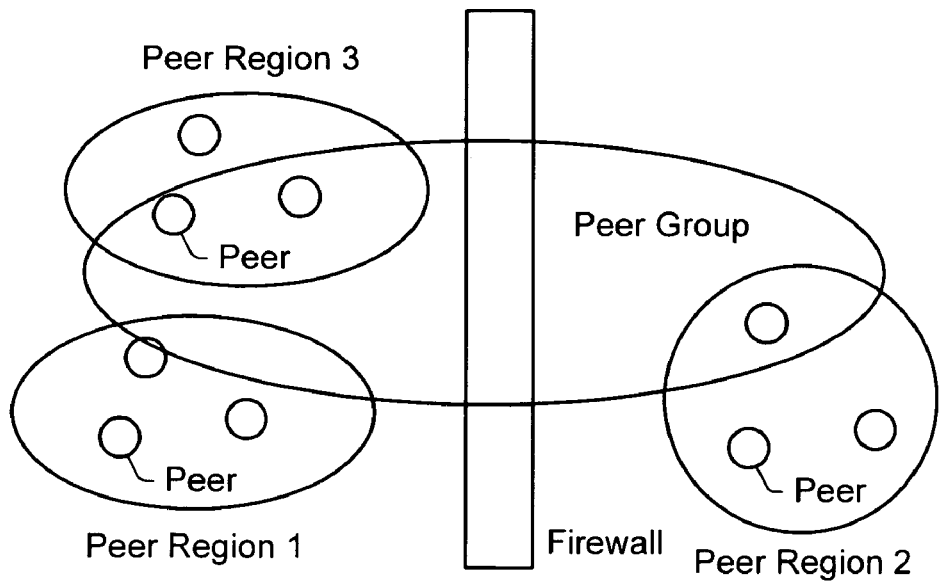

FIGS. 20A through 20D illustrate a method of using a proxy service for peer group registration according to one embodiment. The proxy service may permit firewall-independent peer group membership. FIG. 20A illustrates a firewall in a network. In FIG. 20B, three peer regions are shown, with two (regions 1 and 3) on one side of the firewall and one (region 2) on the other side. In FIG. 20C, a peer group is established that extends across the firewall into regions 1, 2 and 3. In FIG. 20D, several peers in each region are shown as members of the peer group region.

Figure 21A:
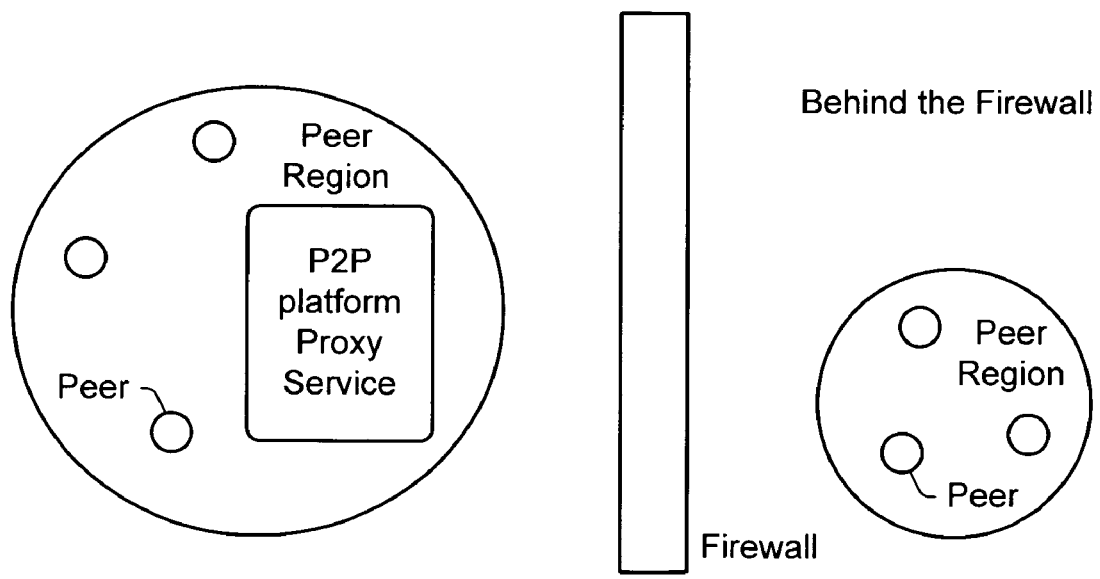
FIGS. 21A through 21D illustrate peer group registration according to one embodiment.
Figure 21B:
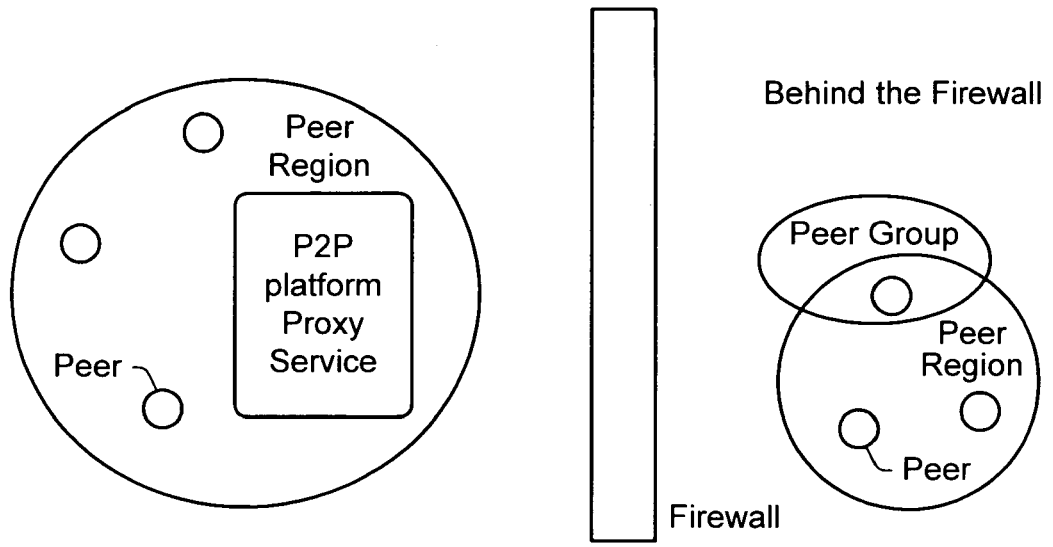
Figure 21C:
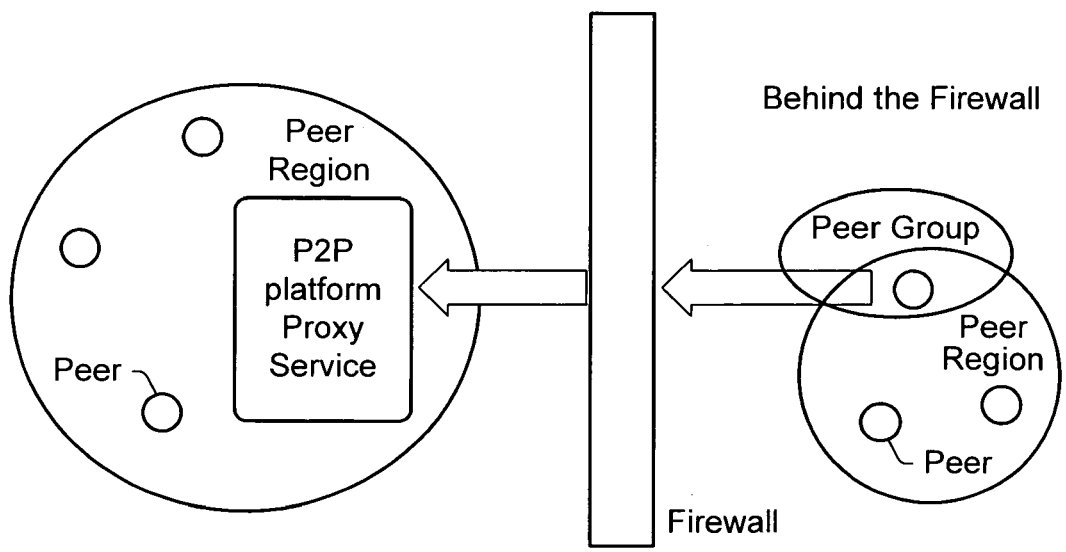
Figure 21D:
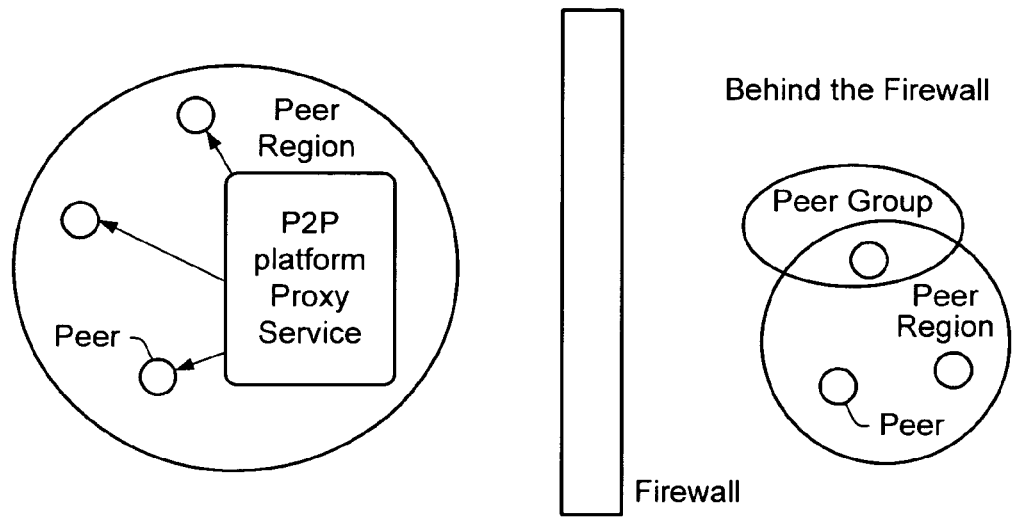

FIGS. 21A through 21D illustrate peer group registration according to one embodiment. FIG. 21A shows two peer regions, with one on the outside of a firewall and one behind the firewall. The peer group outside the firewall includes a peer-to-peer platform proxy service and several peers. In one embodiment, one of the peers may be serving as a proxy peer that supports the proxy service. In FIG. 21B, one of the peers in the region behind the firewall forms a peer group. In FIG. 21C, an advertisement for the peer group may be registered on the proxy service in the region outside the firewall. In FIG. 21D, one or more peers in the region that includes the proxy service may be notified of the newly registered peer group by the proxy service. In one embodiment, the proxy service may also notify other know peer-to-peer platform proxy services.

Figure 22A:
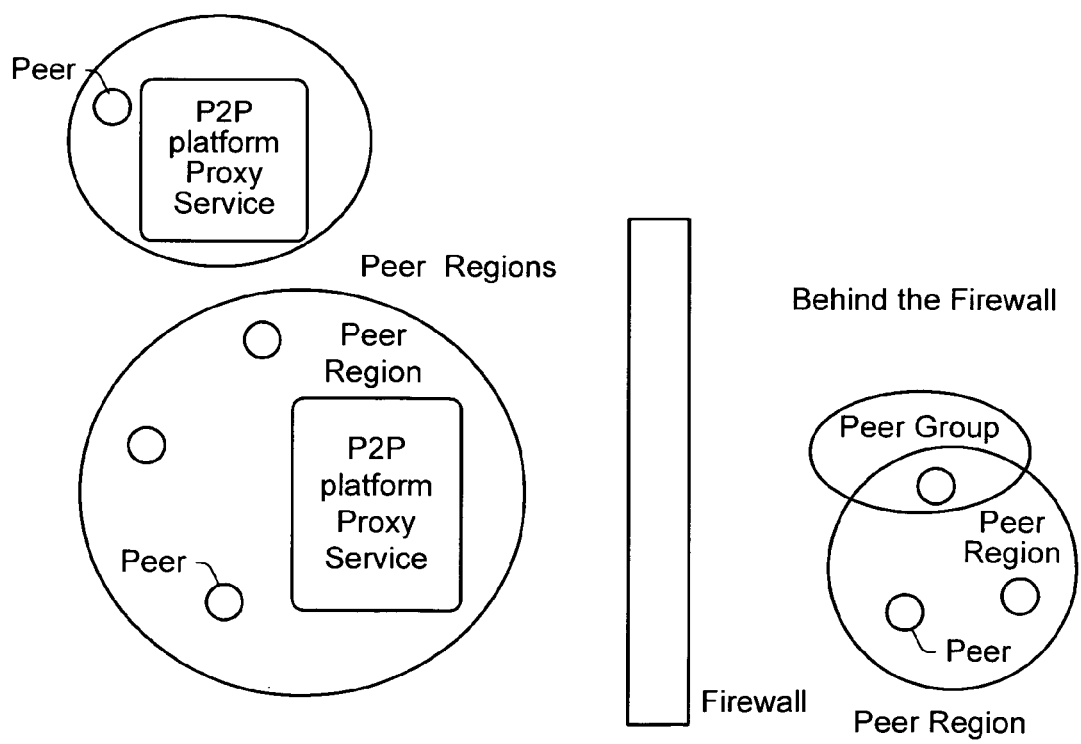
FIGS. 22A through 22C illustrate a method of proxy service peer group membership according to one embodiment.
Figure 22B:
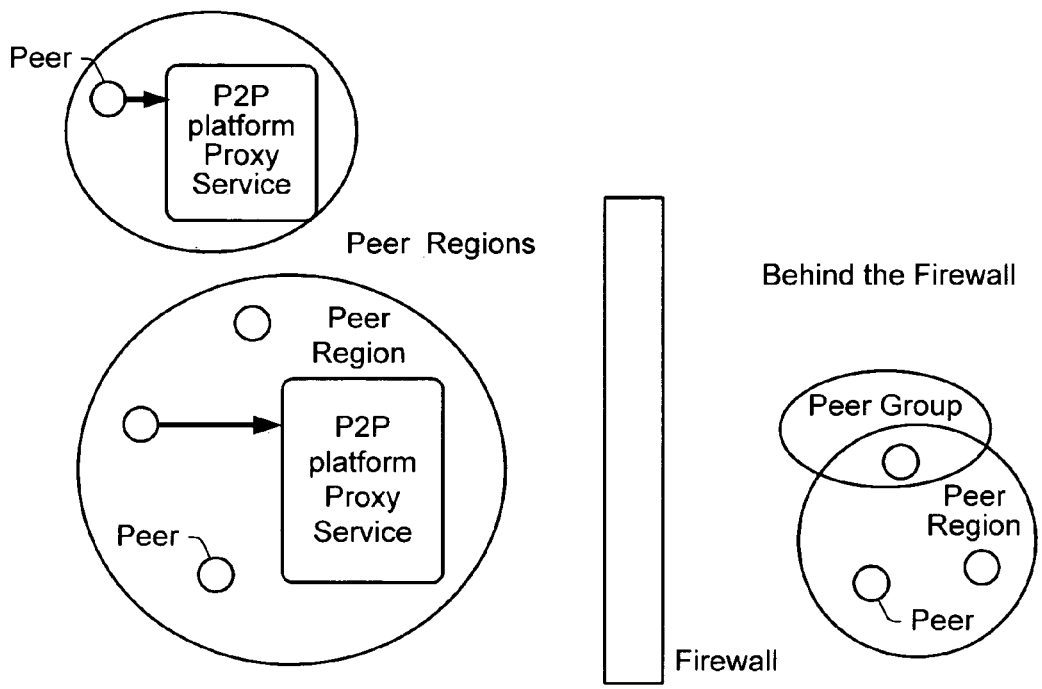
Figure 22C:
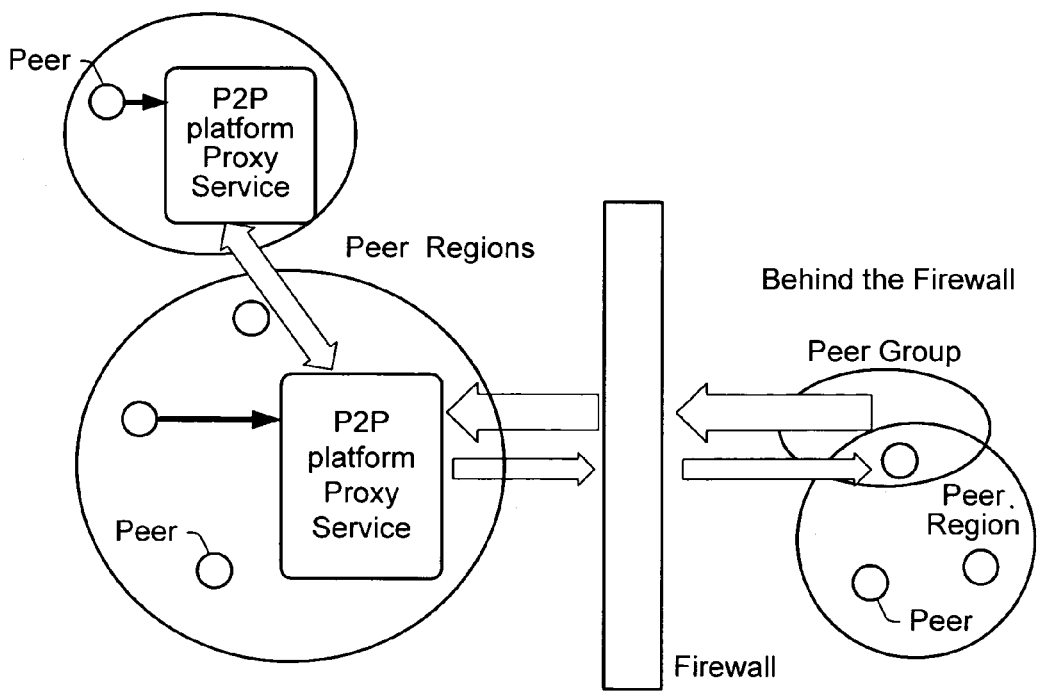

FIGS. 22A through 22C illustrate a method of proxy service peer group membership according to one embodiment. In FIG. 22A, two peer regions are shown outside of a firewall, and one peer region behind the firewall. The two peer group regions outside the firewall each include a proxy service. At least one of the peers in the region behind the firewall belongs to a peer group. The peer group may be registered with one or both of the proxy services in the regions outside the firewall. In FIG. 22B, a peer in one of the regions outside the firewall may join the peer group by proxy through the proxy service in its region. Peers in the regions outside the firewall may also leave the peer group through the proxy service. In FIG. 22C, membership information of the peer group may be synchronized on all known proxy services outside the firewall. In one embodiment, a proxy service may be a member peer of all locally registered peer groups.

Figure 23:
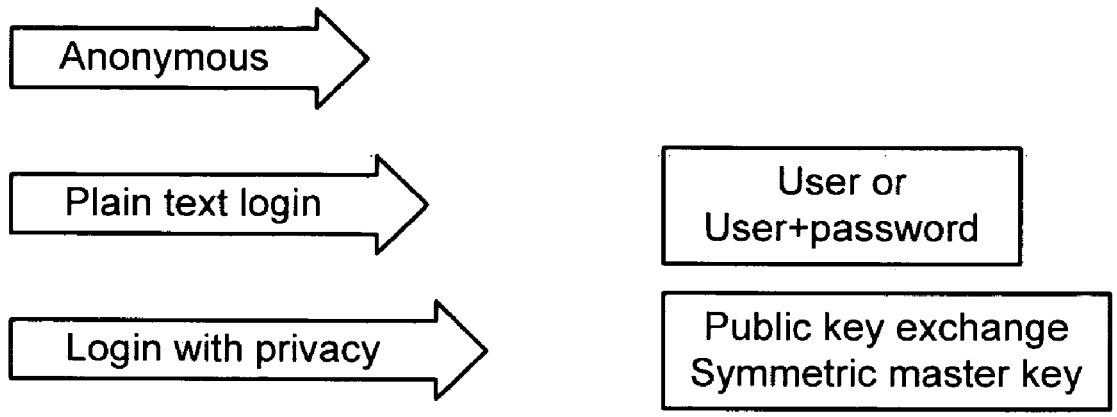
FIG. 23 illustrates several levels of authentication that may be used according to one embodiment.
Figure 24:
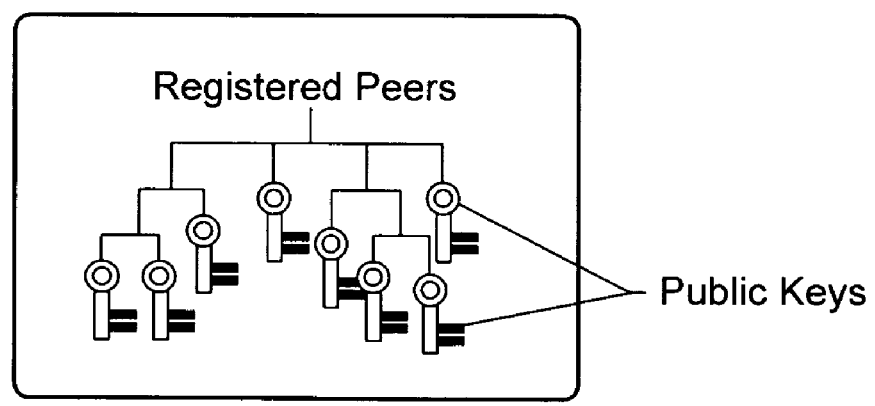
FIG. 24 illustrates a peer-to-peer platform public key chain according to one embodiment.

FIGS. 23 through 27 illustrate embodiments of peer group authentication in the peer-to-peer platform. FIG. 23 illustrates several levels of login authentication that may be used according to one embodiment. These levels include anonymous login, plain text login (user or user plus password), and login with privacy, which uses public key exchange and symmetric master keys. The login process should return a credential to the logging-in peer. The peer uses the credential to bypass the login process until the credential expires. FIG. 24 illustrates a peer-to-peer platform public key chain according to one embodiment. In this embodiment, a key chain for all registered peers is used to eliminate public key exchanges. This is unauthenticated access, and is open to "imposters in the middle" attacks. This is a first step towards a secure Public Key Infrastructure (PKI) with signed certificates.

Figure 25A:
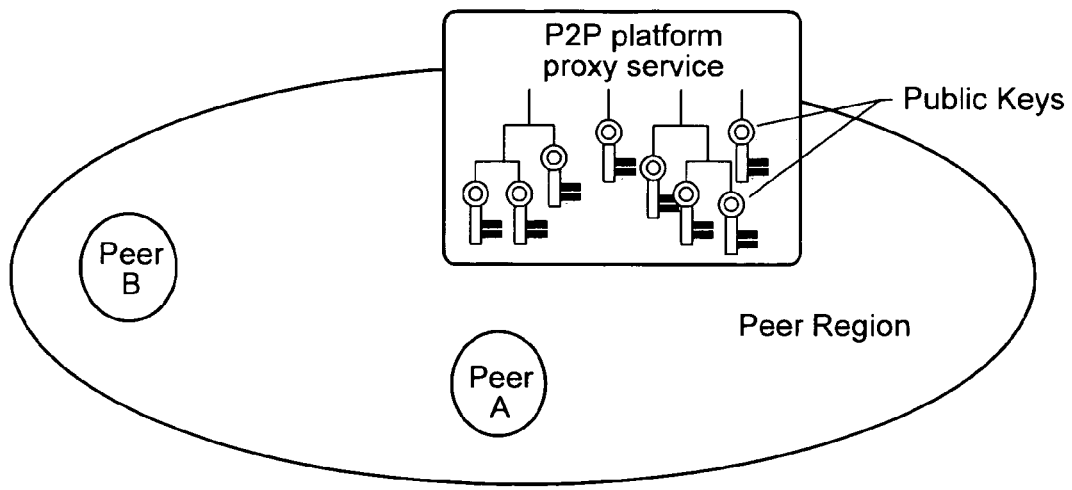
FIGS. 25A through 25D illustrate a method of providing privacy in the peer-to-peer platform according to one embodiment.
Figure 25B:
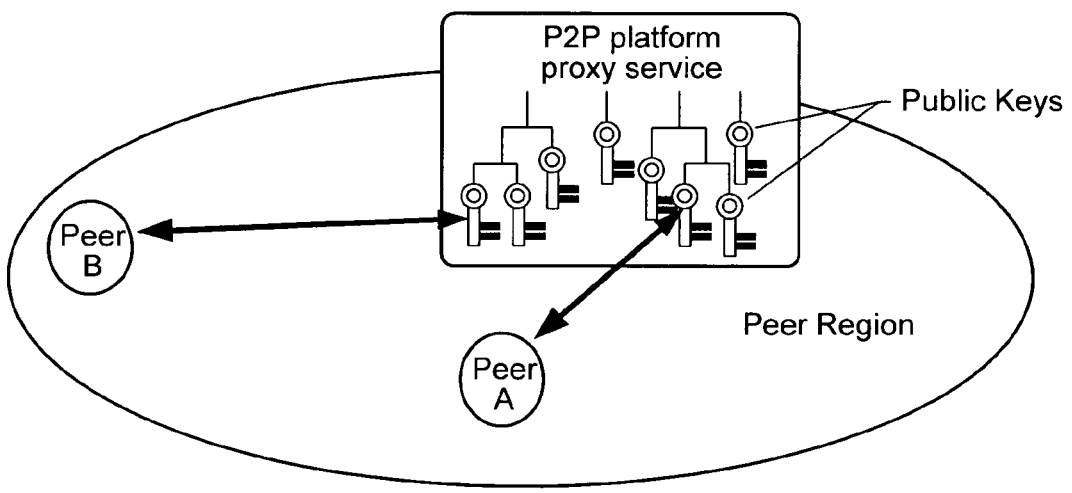
Figure 25C:
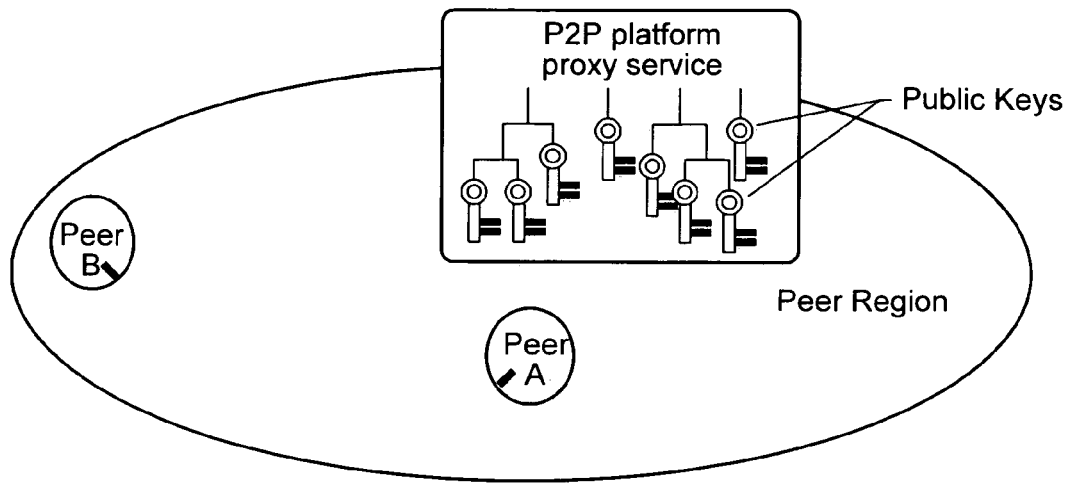
Figure 25D:
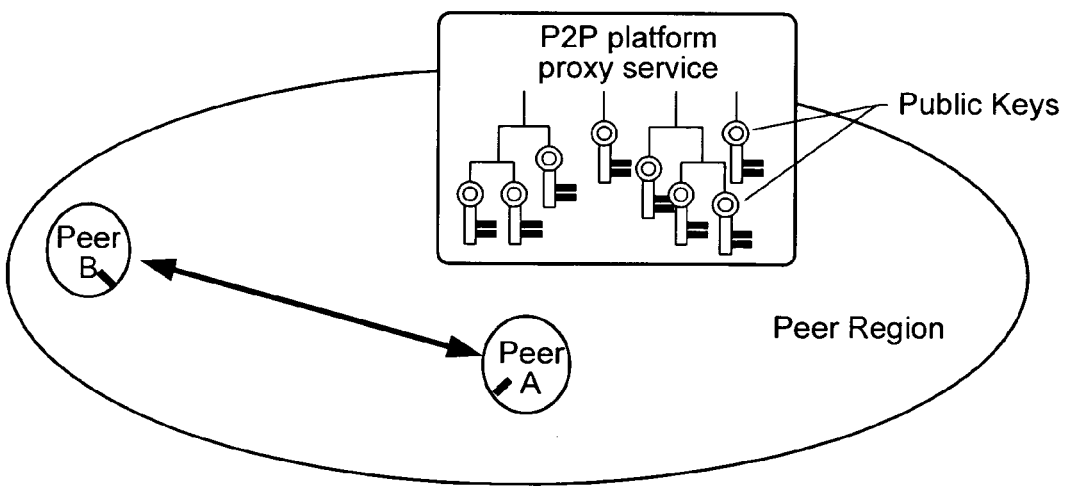

FIGS. 25A through 25D illustrate a method of providing privacy in the peer-to-peer platform according to one embodiment. FIG. 25A shows a peer region with several peers and a proxy service. In FIG. 25B, public keys of the peers may be fetched and cached by the proxy service. The cached public keys preferably have expiration dates. In FIG. 25C, a master secret may be computed for one or more of the public keys. Using the keys, cipher text may be sent between peers in privacy as illustrated in FIG. 25D.

Figure 26:
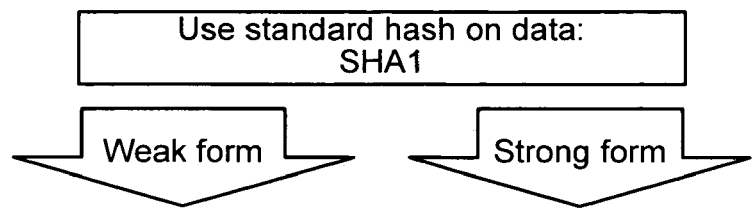
FIG. 26 illustrates integrity of data in a peer-to-peer platform according to one embodiment.

FIG. 26 illustrates integrity of data in a peer-to-peer platform according to one embodiment. A standard hash (SHA1) is used on data. Two forms of integrity, a weak form and a strong form, are illustrated. Other embodiments may utilize other integrity methods. The weak for uses a public key ring and symmetric master key to sign. The weak form uses a public key ring and symmetric master key to sign. The weak form works best between two peers each having the other's public key. The strong form uses asymmetric key algorithm such as RSA and Certificate Authorities. A peer-to-peer platform proxy Certificate Authority (CA) service creates, signs and distributes X509 certificates for all peers on a public key chain. A proxy service's public key must be resident on each proxied peer.

Figure 27A:
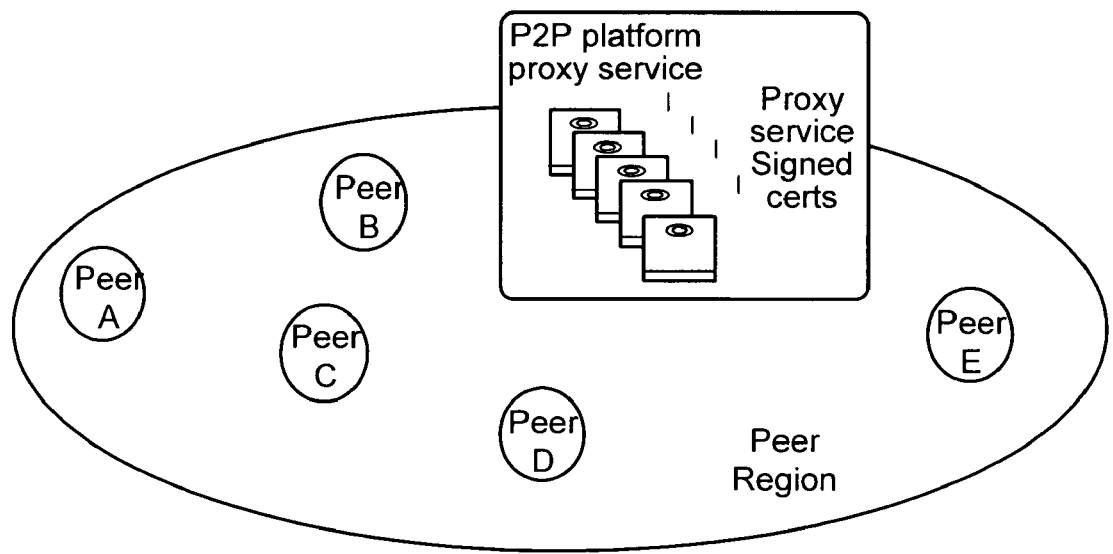
FIGS. 27A through 27D illustrate one embodiment of a method for using a peer-to-peer platform proxy service as a certificate authority.
Figure 27B:
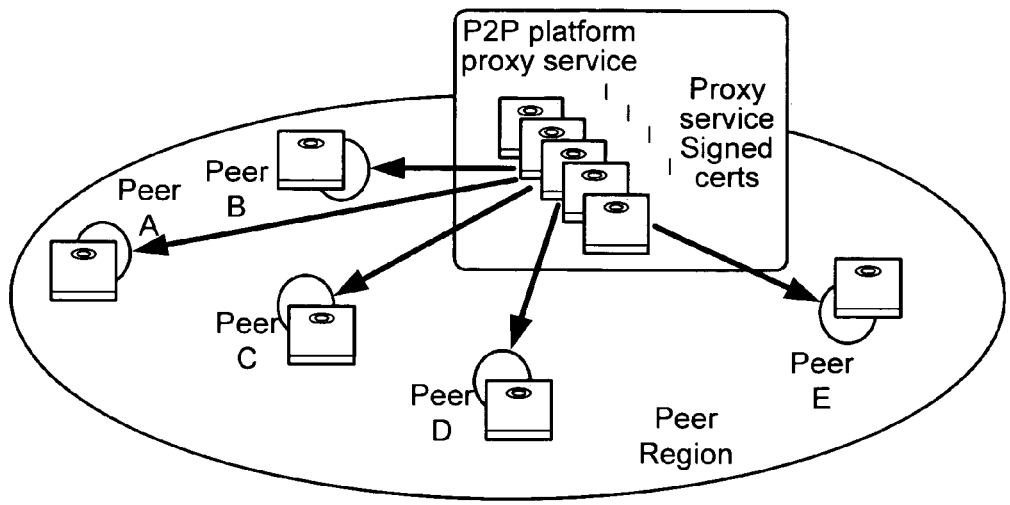
Figure 27C:
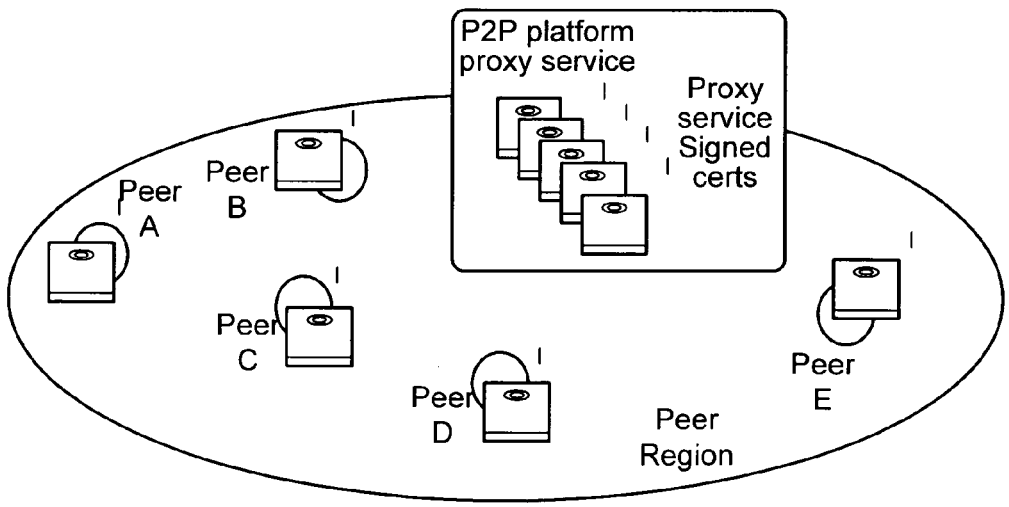
Figure 27D:
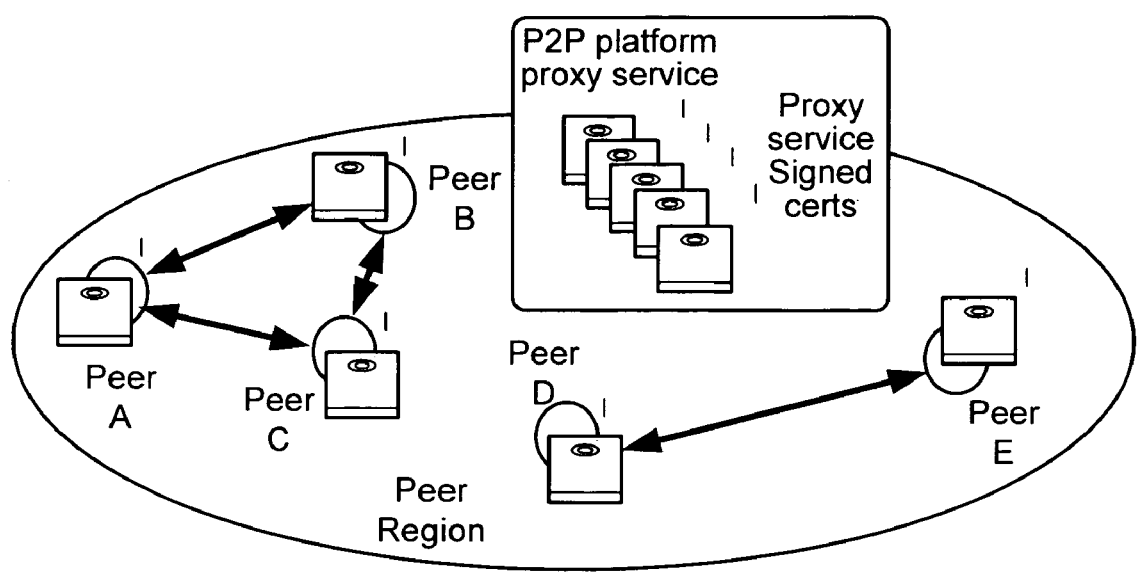

FIGS. 27A through 27D illustrate one embodiment of a method for using a peer-to-peer platform proxy service as a certificate authority. FIG. 27A illustrates a peer region with several peers and a proxy service. In FIG. 27B, the proxy service may distribute signed certificates in response to peer requests as required. In FIG. 27C, the peers may validate the proxy service signature using a proxy service public key. In FIG. 27D, when exchanging content with other peers, a peer may sign the content with the destination peer's public key and distribute cipher text.

Router Peers

The widespread use of NAT (Network Address Translation) and firewalls may affect the operation of many P2P systems. It also may affects the peer-to-peer platform. In particular, a peer outside a firewall or a NAT gateway cannot discover peers inside the firewall or the NAT gateway. In the absence of getting system administrators to let the peer-to-peer platform traffic through (say by opening a special incoming port at the firewall or gateway), possible methods to deal with this problem include, but are not limited to:

In one embodiment, peers inside firewalls may be asked to initiate connections to peers outside the firewall.

In one embodiment, peer nodes may be set up that operate like mailbox offices where traffic to a peer inside the firewall is queued up to be picked up at a designated relay peer outside the firewall. The peer inside the firewall can initially reach outside the firewall, select a relay peer, and widely advertise this fact. Later, it can periodically contact the relay peer to retrieve messages.

One embodiment of the peer-to-peer platform may provide router peers. The router peers may be at a lower level than rendezvous peers. The router peers may provide "pure" message routing. By looking at the destination and source addresses, the router peer may determine where a message needs to be sent. In one embodiment, a router peer may call or access a rendezvous peer to "discover" information about peers, etc. In other words, the router peer may access information from a rendezvous peer to use the information in routing messages.

In one embodiment, router peers may provide the lowest message routing layer in the peer-to-peer platform. Routing may involve complex topologies. For example, the routing peers may provide a method to route across a firewall, particularly from peers outside the firewall to peers inside the firewall. A peer cannot send a message directly to another peer behind a firewall, since by definition there may be no direct route from a peer outside the firewall to a peer inside the firewall. A router peer may route messages to a gateway peer (a mailbox server where messages for peers behind the firewall may be temporarily stored). In one embodiment, the gateway peer may be a router peer acting as a gateway. The peers behind the firewall may periodically poll the mailboxes provided by the gateway peer to determine if someone has tried to contact them (i.e. are there any messages in my mailbox?). Note that a "pipe" provides an abstraction at a higher level than the message routing provided by router peers, and thus, a pipe may be an abstraction across the network topology between peers, for example peers on opposite sides of a firewall, through which the peers may communicate. At the lowest level, one or more router peers may discover and establish the actual communications route between the peers. This level, however, may be transparent to the peers, who only "see" the pipes.

In one embodiment, a router peer may build a route table. The router peer may keep information about routes that it discovers and store them in the route table. This allows the router peer to build a knowledge base (the route table) about the network topology as more messages flow on the system. This information may be used by the router peer to discover and establish optimal routes between entities in the network, and may increase its ability to reach other peers.

A router peer may access another router peer it is aware of to get route information. The route information may be described as a stacked set of destinations (and the routes to the destinations). In one embodiment, the information the router peer stores on a particular route may be incomplete, because the router peer may only know about the route up to a certain point. For example, the router peer may know about a first portion of a route up to another router peer, which knows about the next portion of the route, and so on.

In one embodiment, each peer has a unique peer ID that is independent of, and is not assigned to, fixed addresses. Peers may move around. Therefore, the peer-to-peer network topology may be dynamic, and may change every time a peer goes away or moves. Thus, the routing method provided by the router peers is preferably dynamic to support the dynamic topology. When a peer moves and reconnects, the peer is recognized as the same peer that was previously connected elsewhere in the network. This process may use the unique ID of the peer to indicate that the peer is the same one that was previously connected elsewhere. In one example, when a peer moves, it may go through a discovery process to discover peers and rendezvous peers in its new local subnet or region. If the peer wishes to join a peer group that it used at its previous location, it may then attempt to discover other peers that have knowledge of the peer group or other peers in the peer group. The message may be passed through several router peers until it may reach a router peer which has knowledge about the peer group (e.g. a route to the peer group) to return to the requesting peer. For example, a user with a laptop may fly from a home office to another city. When the user connects to the network in the other city, a route may be established, through the services provided by router peers, to the home office network peer group. The user may then access email and other services provided by the peer group. From the user's standpoint, this process may seem automatic. For example, the user may not be required to "dial in" or connect remotely to an ISP to access the office as is required in typical networks using static addressing.

In one embodiment, when a peer becomes a router peer, it may access a stored route table as a starting point. In one embodiment, the peer may start from scratch with an empty route table. In one embodiment, the peer, when it becomes a router peer, may initiate a discovery of other router peers and/or rendezvous peers to get as much connectivity information to key peers in the network as possible.

In one embodiment, every peer may have knowledge of at least one router peer. In one embodiment, there may be a "universal router" that many or all peers may be aware of that may be accessed when a peer cannot find anyone. The universal router may be able to put the peer into contact with somebody (e.g. another peer) to help in the bootstrapping process.

Peer Discovery Protocol

The peer discovery protocol (PDP) may be used to enable a peer to find advertisements on other peers. The peer discovery protocol may be used to find advertisements including peer, peer group and core advertisements. The peer discovery protocol is preferably the default discovery protocol for all user-defined peer groups and the world peer group. In one embodiment, custom discovery services may choose to leverage the peer discovery protocol. If a peer group does not have its own discovery service, the peer discovery protocol is preferably used as the method for probing peers for advertisements.

Rendezvous peers may keep a list of known peers and peer groups. This list may or may not be exhaustive or timely. A custom discovery service (if it knew that the region's rendezvous did kept a timely exhaustive list) could discover all peers by sending a single message to the rendezvous peer.

In one embodiment, the peer discovery protocol may support finding peers by name or alternatively without using a name. If a probing peer already knows the name of the peer to be located, a simple translation may be requested that returns that peer's advertisement. Once a peer is discovered, ping, status, and capability messages may be sent to its "main" endpoint(s) using a peer information protocol. Peers may export more than one endpoint. Preferably, each peer designates at least one "main" endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). Preferably, peers claiming to belong to this group may respond, while other peers do not respond. The peer discovery protocol may be used to discover any type of core advertisement including, but not limited to: peer advertisements, peer group advertisements, pipe advertisements and service advertisements.

Messages to Discover Advertisements

Figure 12:
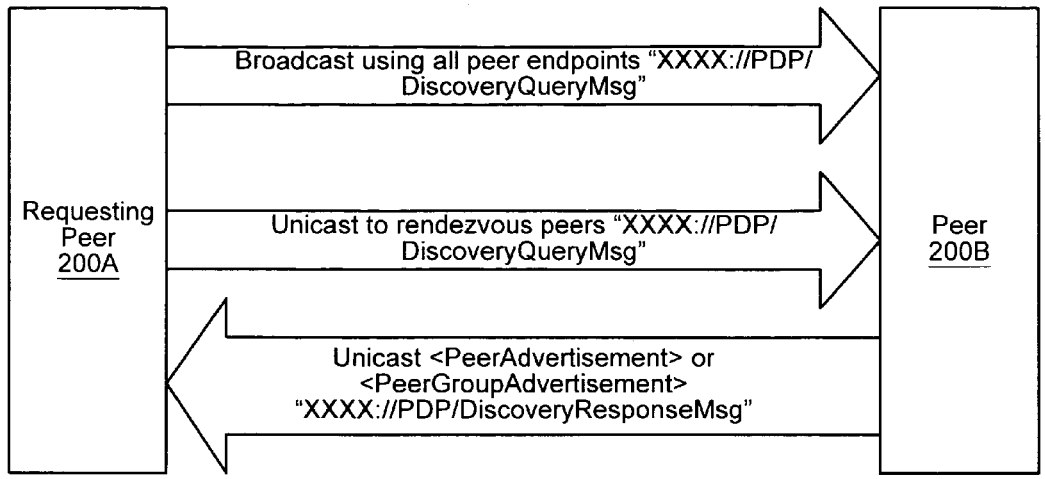
FIG. 12 illustrates using messages to discover advertisements according to one embodiment.

FIG. 12 illustrates using messages to discover advertisements according to one embodiment. A message or messages may be used to get all known, reachable advertisements within a region on the network. This list is preferably not guaranteed to be exhaustive, and may be empty. Named peers may also be located using the peer discovery protocol. A message may include a peer group credential of the probing (requesting) peer that may identify the probing peer to the message recipient. The destination address may be any peer within a region (a propagate message) or alternatively a rendezvous peer (a unicast message). The response message may return one or more peer advertisements and/or peer group advertisements that may include "main" endpoint addresses converted to a string in the standard peer endpoint URI format and also may include a network transport name.

Discovery Query Message

In one embodiment, a discovery query message may be used to send a discovery request to find peers or peer groups. The discovery query may be sent as a query string (tag, value) form. A null query string may be sent to match any results. A threshold value may be included to indicate the maximum number of matches requested by a peer. The following is an example of one embodiment of a discovery query message in XML, and is not intended to be limiting:

```
<?xml version="1.0" encoding="ISO-8859-1"?>
<DiscoveryQueryMsg>
    <Credential> Credential </Credential>
    <Type>type of request (PEER, GROUP, ADV) </Type>
    <Threshold> requested number of responses </Threshold>
    <PeerAdv> peer advertisement of requestor </PeerAdv>
    <Query> query string (tag, value)</Query>
</DiscoveryQueryMsg>
```

Discovery Response Message

In one embodiment, a discovery response message may be used to send a discovery response message to answer a discovery query message. The following is an example of one embodiment of a discovery response message in XML, and is not intended to be limiting:

```
<?xml version="1.0" encoding="ISO-8859-1"?>
<DiscoveryResponseMsg>
    <Credential> Credential </Credential>
    <Type> type of request (PEER, GROUP, ADV) </Type>
    <Count> number of responses </Count>
    <Adv> peer or peer group or pipe or service advertisement response
</Adv>
    ............
    <Adv> peer or peer group or pipe or service advertisement response
</Adv>
</DiscoveryResponseMsg>
```

Peer Resolver Protocol

Figure 13:
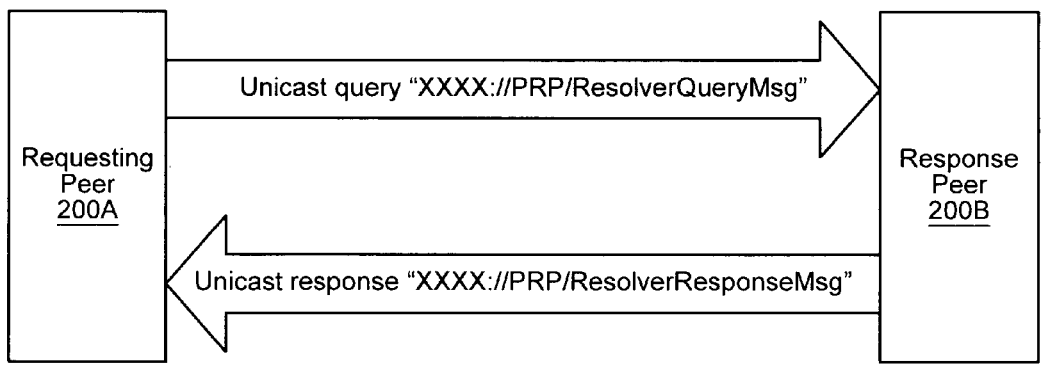
FIG. 13 illustrates one embodiment of using peer resolver protocol messages between a requesting peer and a responding peer.

In one embodiment, a peer resolver protocol (PRP) may enable a peer service to send a generic query to one or more other peer services. Each service of a peer group may register a handler in the core resolver service to process query requests. Resolver queries may be demultiplexed to each service. Each service may respond to the query via a resolver response message. The peer resolver protocol may enable each peer to send and receive generic queries to find or search for peer, peer group, pipe or service specific information such as the state of a service or the state of a pipe endpoint. Preferably, each resolver query has a unique service handler name to specify the receiving service, and a query string to be resolved. The peer resolver protocol preferably provides a generic mechanism for peer group services to send queries and receive responses. The peer resolver protocol preferably removes the burden for registered message handlers by each service and set message tags to ensure uniqueness of tags. The peer resolver protocol preferably ensures that messages are sent to correct addresses, and peer groups. The peer resolver protocol preferably performs authentication and verification of credentials and the dropping of rogue messages. FIG. 13 illustrates one embodiment of using peer resolver protocol messages between a requesting peer 200A and a responding peer 200B.

Resolver Query Message

In one embodiment, a resolver query message may be used to send a resolver query request to another member of a peer group. The resolver query may be sent as a query string to a specific service handler. Preferably, each query has a unique Id. The query string may be any string that may be interpreted by the targeted service handler. The following is an example of one embodiment of a resolver query message in XML, and is not intended to be limiting:

```
<?xml version="1.0" encoding="ISO-8859-1"?>
<ResolverQueryMsg>
    <Credential> Credential </Credential>
    <HandlerName> name of handler </HandlerName>
    <CredentialPolicyUri> uri to verify query credential
</CredentialPolicyUri>
    <QueryId> incremental query Id </QueryId>
    <Query> query string </Query>
</ResolverQueryMsg>
```

Resolver Response Message

A resolver response message may be returned in response to a resolver query message. The following is an example of one embodiment of a resolver response message in XML, and is not intended to be limiting:

```
<?xml version="1.0" encoding="ISO-8859-1"?>
<ResolverResponseMsg>
    <Credential> Credential </Credential>
    <HandlerName> name of handler </HandlerName>
    <CredentialPolicyUri> uri to verify response credential
</CredentialPolicyUri>
    <QueryId> query Id </QueryId>
    <Response> response </Response>
</ResolverResponseMsg>
```

Peer Information Protocol

Once a peer is located, its capabilities and status may be of interest. In one embodiment, a peer information protocol (PIP) may provide a set of messages to obtain this information.

Messages to Obtain Peer Status

Figure 14:
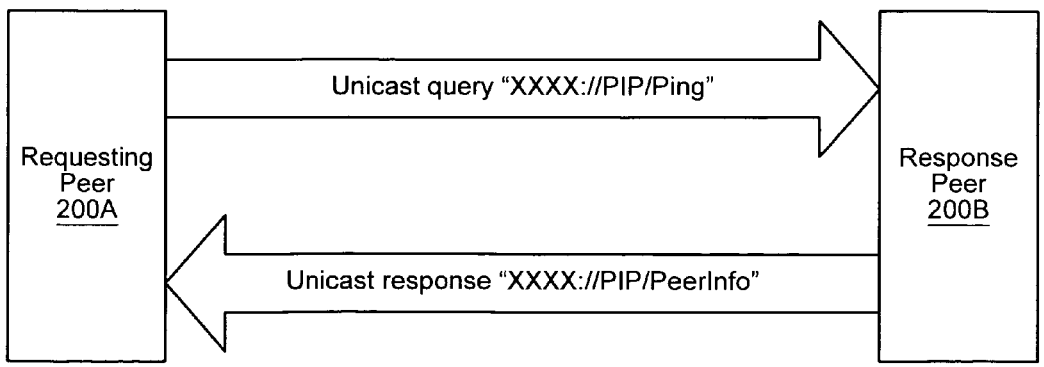
FIG. 14 illustrates one embodiment of using peer information protocol messages between a requesting peer and a responding peer.

In one embodiment, to see if a peer is alive (i.e. responding to messages), the peer may be sent a ping message. The ping message may include a destination address that is the peer's "main" endpoint returned during discovery. The message may also include a group membership credential of the requesting peer that may identify the probing peer to the message recipient. The message may also contain an identifier unique to the sender. This identifier is preferably returned in the response. FIG. 14 illustrates one embodiment of using peer information protocol messages between a requesting peer 200A and a responding peer 200B.

Messages to Get Peer Information

In one embodiment, messages may be used to get a list of named control "properties" exported by a peer's "main" endpoint. A property is a "knob" used to get information or configuration parameters from the peer. All properties are preferably named (by a string), and are preferably "read-only". In one embodiment, higher-level services may offer "read-write" capability to the same information, given proper security credentials. Each property preferably has a name and a value string. Read-write widgets may allow the string value to be changed, while read-only widgets do not. In one embodiment, the peer information protocol only gives read access. The destination address is a peer's main endpoint that may have been returned in a discovery response message.

Ping Message

In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. The following is an example of one embodiment of a ping message in XML, and is not intended to be limiting:

```
<?xml version="1.0" encoding="ISO-8859-1"?>
<Ping>
    <Credential> Credential </Credential>
    <SourcePid> Source Peer Id </SourcePid>
    <TargetPid> Target Peer Id </TargetPid>
    <Option> type of ping requested</Option>
</Ping>
```

Peer Information Response Message

In one embodiment, a peer information response message may be used to send a response message in response to a ping message. The following is an example of one embodiment of a peer information response message in XML, and is not intended to be limiting:

```
<?xml version="1.0" encoding="ISO-8859-1"?>
<PeerInfo>
    <Credential> Credential </Credential>
    <SourcePid> Source Peer Id </SourcePid>
    <TargetPid> Target Peer Id </TargetPid>
    <Uptime> uptime</Uptime>
    <TimeStamp> timestamp </TimeStamp>
    <PeerAdv> Peer Advertisement </PeerAdv>
</PeerInfo>
```

Peer Membership Protocol

In one embodiment, a peer membership protocol (PMP) may allow a peer to:
 Obtain group membership requirements and application credential.
 Apply for membership and receive a membership credential along with a full group advertisement.
 Update an existing membership or application credential.
 Cancel membership or application credential.

In one embodiment, a first step to joining a peer group is to obtain a "form" listing the set of requirements asked of all group members. In one embodiment, this form may be a structured document (e.g. a peer group advertisement) that lists the peer group membership service.

Membership Messages

In one embodiment, the peer membership protocol may define messages including, but not limited to, an apply message, a join message, an acknowledgement (ack) message, a renew message, and a cancel message.

A peer membership protocol apply message may be sent by a potential new group member to the group membership application authenticator. The authenticator's endpoint is preferably listed in the peer group advertisement of every member. In one embodiment, a successful response from the group's authenticator may include an application credential and a group advertisement that preferably lists, at a minimum, the group's membership service. In one embodiment, the apply message may include, but is not limited to, the following information:
 The current credential of the candidate group member.
 The peer endpoint for the peer group membership authenticator to respond to with an acknowledgement (ack) message The following is an example of one embodiment of a peer membership protocol apply message in XML, and is not intended to be limiting:

```
<?xml version="1.0" encoding="ISO-8859-1"?>
<MembershipApply>
    <Credential> Credential of requestor </Credential>
    <SourcePid> Source pipe id</SourcePid>
    <AuthenticatorPid> Authenticator pipe Id </AuthenticatorPid>
</MembershipApply>
```

A peer membership protocol join message may be sent by a peer to the peer group membership authenticator to join a group. The peer preferably passes an application credential (from an apply response ack msg) for authentication purposes. A successful response from the group's authenticator preferably includes a full membership credential and a full group advertisement that lists, at a minimum, the group's membership configurations requested of full members in good standing. The message may include, but is not limited to, the following information:
 Credential (application credential of the applying peer: See ack msg) This credential may be used as the application form when joining.
 The peer endpoint for the authenticator to respond to with an ack message The following is an example of one embodiment of a peer membership protocol join message in XML, and is not intended to be limiting:

```
<?xml version="1.0" encoding="ISO-8859-1"?>
<MembershipJoin>
    <Credential> Credential of requestor </Credential>
    <SourcePid> Source pipe Id </SourcePid>
    <MembersshipPid> membership pipe Id </Membership Pid>
    <Identity> identity</Identity>
</MembershipJoin>
```

A peer membership protocol ack message is an acknowledge message that may be used for both join and apply operations. A peer membership protocol ack message may be sent back by the membership authenticator to indicate whether or nor the peer was granted application rights to the peer group, if the peer is applying, or full membership to the peer group, if peer is attempting to join. An ack message may also be sent in response to peer membership protocol renew messages and cancel messages. The message may include, but is not limited to, the following information:

Credential—an application or membership credential allocated to the peer by the peer group authenticator.

A more complete peer group advertisement that may provide access to further configurations. In one embodiment, not all configuration protocols are visible until the peer has been granted membership or application rights. Some configurations may need to be protected. Also, depending on the peer credential, the peer may not have access to all the configurations.

The following is an example of one embodiment of a peer membership protocol ack message in XML, and is not intended to be limiting:

```
<?xml version="1.0" encoding="ISO-8859-1"?>
<MembershipAck>
    <Credential> Credential </Credential>
    <SourcePid> Source pipe Id </SourcePid>
    <MembersshipPid> membership pipe Id </Membership Pid>
    <PeerGroupAdv> peer group advertisement </PeerGroupAdv>
    <PeerGroupCredential> credential granted </PeerGroupCredential>
</MembershipAck>
```

A peer membership protocol renew message may be sent by a peer to renew its credential (membership or application) access to the peer group. An ack message may be returned with a new credential and lease if the new is accepted. The renew message may include, but is not limited to, the following information:

Credential—a membership or application credential of the peer.

The peer endpoint to send an ack response message.

The following is an example of one embodiment of a peer membership protocol renew message in XML, and is not intended to be limiting:

```
<?xml version="1.0" encoding="ISO-8859-1"?>
<MembershipRenew>
    <Credential> Credential </Credential>
    <SourcePid> Source pipe Id </SourcePid>
    <MembersshipPid> membership pipe Id </Membership Pid>
</MembershipRenew>
```

A peer membership protocol cancel message may be sent by a peer to cancel the peer's membership or application rights in a peer group. The message may include, but is not limited to, the following information:

Credential—a membership or application credential of the peer.

The peer endpoint to send an ack message. In one embodiment, an ack to a cancel may include a response status indicating the cancel was accepted.

The following is an example of one embodiment of a peer membership protocol cancel message in XML, and is not intended to be limiting:

```
<?xml version="1.0" encoding="ISO-8859-1"?>
<MembershipCancel>
    <Credential> Credential </Credential>
    <SourcePid> Source pipe Id </SourcePid>
    <MembersshipPid> membership pipe Id </Membership Pid>
</MembershipCancel>
```

Pipe Binding Protocol

In one embodiment, a pipe binding protocol (PBP) may be used by peer group members to bind pipe advertisements to pipe endpoints. A pipe is conceptually a virtual link between two or more peer software components (e.g. services or applications). The pipe virtual link (pathway) can be layered upon any number of physical network transport links such as TCP/IP. Each end of the pipe works to maintain the virtual link and to re-establish it, if necessary, by binding, or finding the pipe's currently bound, endpoints.

Pipe Implementations and Transport Configurations

A pipe may be viewed as an abstract named message queue that may support create, open/resolve (bind), close (unbind), delete, send, and receive operations. Actual pipe implementations may differ, but peer-to-peer platform-compliant implementations preferably use the pipe binding protocol to bind pipes to pipe endpoints. In one embodiment, during the abstract "open" operation, a local peer binds a pipe endpoint to a pipe transport. In one embodiment, each peer that "opens" a group pipe may make an endpoint available (binds) to the pipe's transport. Messages are preferably only sent to one or more endpoints bound to the pipe. Peer members that have not opened the pipe preferably do not receive or send, any messages in that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

Pipe Messages

In one embodiment, the pipe binding protocol may define messages including, but not limited to, a query message and an answer message.

In one embodiment, a pipe binding protocol query message may be sent by a peer pipe endpoint to find a pipe endpoint bound to the same pipe. The following is an example of one embodiment of a pipe binding protocol query message in XML, and is not intended to be limiting:

```
<?xml version="1.0" encoding="ISO-8859-1"?>
<PipeBindingQuery>
    <Credential> query credential </Credential>
    <Peer> optional tag. If present, it includes the URI of
        the only peer that is supposed to answer that request.
    </Peer>
    <Cached> true if the reply can come from a cache </Cached>
    <PipeId> pipe id to be resolved </PipeId>
</PipeBindingQuery>
```

In one embodiment, a pipe binding protocol response message may sent back to the requesting peer by each peer bound to the pipe in response to a query message. The following is an example of one embodiment of a pipe binding protocol response message in XML, and is not intended to be limiting:

```
<?xml version="1.0" encoding="ISO-8859-1"?>
<PipeBindingAnswer>
    <Credential> credential </Credential>
    <PipeId> pipe id resolved </PipeId>
    <Peer> peer URI where a corresponding InputPipe has been
    created
    </Peer>
    <Found> true: the InputPipe does exist on the specified peer
    (ACK)
        false: the InputPipe does not exist on the specified peer (NACK)
    </Found>
</PipeBindingAnswer>
```

Endpoint Routing Protocol

In one embodiment, an endpoint routing protocol (ERP) may be used by a peer to send messages to a peer router to find the available route to send a message to a destination peer. Two communicating peers may need to use router peers to route messages depending on the network topology. For example, the two peers may be on different transports, or the peer may be separated by a firewall or a NAT (Network Address Translation) router. The following is an example of one embodiment of route information in XML, and is not intended to be limiting:

```
<?xml version="1.0" encoding="ISO-8859-1"?>
<EndpointRouter>
    <Credential> credential </Credential>
    <Src> peer id of the source </Src>
    <Dest> peer id of the destination </Dest>
    <TTL> time to leave </TTL>
    <Gateway> ordered sequence of gateway </Gateway>
    ..................
    <Gateway> ordered sequence of gateway </Gateway>
</EndpointRouter>
```

The endpoint routing protocol may provide messages including, but not limited to, a route request message and a route answer message from the router peer. Peer routers may cache route information. In one embodiment, a peer may query a peer router for route information. In one embodiment, any peer in a peer group may become a peer router.

Route Query Request

In one embodiment, a route query request message may be sent by a peer to a router peer to request route information. Route information may be cached or not cached. In some cases, the route query request message may indicate to bypass the cache content and thus to search dynamically for a route. The following is an example of one embodiment of a route query request message in XML, and is not intended to be limiting:

```
<?xml version="1.0" encoding="ISO-8859-1"?>
<EndpointRouterQuery>
    <Credential> credential </Credential>
    <Dest> peer id of the destination </Dest>
    <Cached> true: if the reply can be a cached reply
             false: if the reply must not come from a cache
    </Cached>
</EndpointRouterQuery>
```

Route Answer Request

In one embodiment, a route answer request message may be sent by a router peer to a peer in response to a route information request. The following is an example of one embodiment of a route answer request message in XML, and is not intended to be limiting:

```
<?xml version="1.0" encoding="ISO-8859-1"?>
<EndpointRouterAnswer>
    <Credential> credential </Credential>
    <Dest> peer id of the destination </Dest>
    <RoutingPeer> URI of the router that knows a route to DestPeer
    </RoutingPeer>
    <RoutingPeerAdv> Advertisement of the routing peer </RoutingPeerAdv>
    <Gateway> ordered sequence of gateway </Gateway>
    ..................
    <Gateway> ordered sequence of gateway </Gateway>
</EndpointRouterAnswer>
```

Bootstrapping Mechanism

In the absence of an application, the peer-to-peer platform preferably provides a mechanism that may be used to discover basic core abstractions (e.g. peer, peer groups, advertisements, pipes). This basic mechanism is needed for bootstrapping a system, and so may be referred to as a bootstrapping mechanism. For example, if a user just downloaded a binary image that enables a device to become a peer in a peer-to-peer network that implements the peer-to-peer platform, the bootstrapping mechanism may be used to discover core abstractions since the "fresh" system may not have knowledge of or access to higher-level services.

The tasks of searching, discovering, and/or routing in a peer-to-peer network may be complicated. There are many different types of content, and there may not be a generic to best accomplish those tasks for all types of content. Therefore, letting an application or higher-level service perform these high-level search may be preferable, while providing simple, small, mechanisms for bootstrapping peer-to-peer platform-enabled applications.

The policies and/or protocols used by the core in order to achieve this bootstrapping are preferably as simple as possible and preferably may be implemented and used on a wide variety of platforms (e.g. PDAs, pagers, smart appliances, laptops, workstations, clusters of servers, etc.) and in a variety of network topologies. For example, some peers may not use TCP/IP, and some may not be connected to the Internet. The bootstrapping mechanism may be used as a fallback mechanism when nothing else is useable (e.g. in case of a failure of higher lever services). The bootstrapping mechanism is preferably highly configurable. In one embodiment, configuration "wizards" may be used for automatic configuration of the bootstrapping mechanism.

In one embodiment, other services (e.g. higher-level services and/or optional services) and applications may take over control of the bootstrapping mechanism. In one embodiment, the core protocols may provide an API or APIs to allow the service and/or application to dynamically teach and/or reconfigure the core policies. In one embodiment, a service or application may dynamically overload (i.e. replace) the core policies. For example, this may be done when the design of the application is so dependant on a specific algorithm that it cannot handle the default core policies.

Providing the bootstrapping mechanism in the peer-to-peer platform may help to allow the peer-to-peer platform to be used straight "out of the box", and/or to be easily configured and installed, for use with a peer-to-peer platform-enabled application.

Routing

A peer-to-peer platform preferably provides a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

An application that supports the peer-to-peer platform preferably is able to help in routing and discovering. Some of the information needed to accomplish routing and discovering may be only known by the application. For example, the application may support a special type of data as content, and so the application may best "know" how to discover items of this special content. Also, the application may have a better knowledge of the topology (related to the nature of the application and/or peer group) than the core peer-to-peer platform.

In one embodiment, in order to bootstrap the system, and also in order to have a fallback mechanism if an application cannot or does not support one or more of the tasks, the core peer-to-peer protocol may provide a discovery and router mechanism for discovering peers and other core abstractions such as advertisements, pipes, and peer groups. The discovery and routing mechanism of the peer-to-peer platform preferably uses as few protocols as possible, is simple, and makes use of underlying optimizations when available. Hooks into the core discovery and router mechanism may be provided so that applications and services may participate in the discovery and router mechanisms, for example, by passing information to the core discovery and router mechanism. In one embodiment, an application or service may be allowed to override the core discovery and router mechanism with its own custom mechanism.

In one embodiment, the core discovery and router mechanism may be based on web crawling. Web crawling may be well suited for use in self-organizing networks such as peer-to-peer networks. In one embodiment, peers may be configured to participate or not to participate in the discovery and router mechanism, and may be configured as to the level of involvement in the process In one embodiment, a peer may decide whether to participate in a discovery or routing task depending on the peer's configuration in the peer-to-peer network. In one embodiment, the configuration may be determined using an automated detection of the position of the peer on the network and a network configuration wizard tool.

Web crawling may not create bottlenecks such as may be created by the mechanism of a client knowing a server and always going to the same server to find and retrieve information (e.g. DNS, NFS etc.). Even if a server is replicated, like DNS, it is still a centralized server. If all the known instances of the server are not reachable, a client may lose access to the server, even if another (but unknown) server is, indeed, available. In a point-to-point network, the information a peer is looking for is generally "close by" or may eventually be "close by", so web crawling may not go too far.

Figure 15:
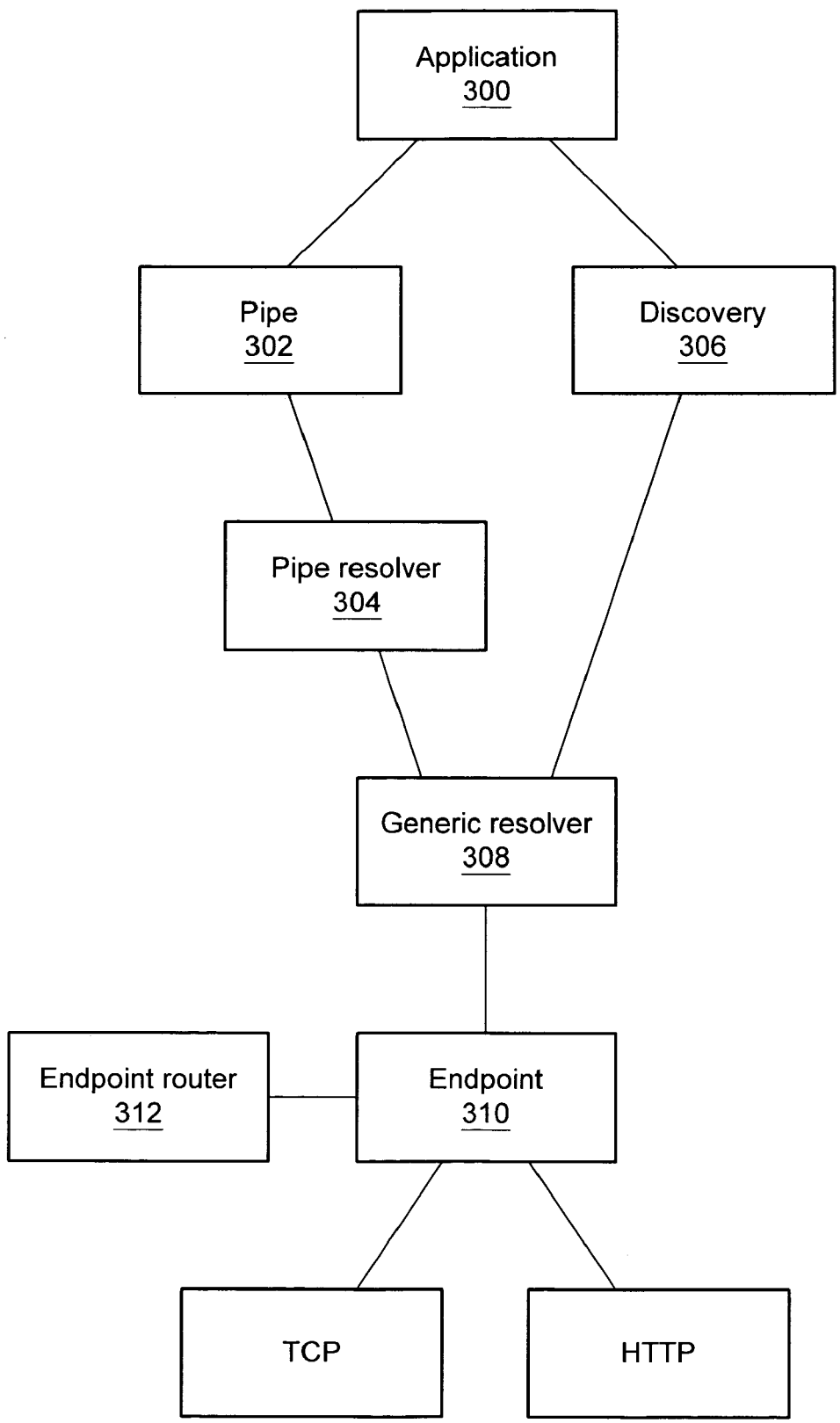
FIG. 15 illustrates several core components and how they interact for discovery and routing according to one embodiment.

FIG. 15 illustrates several core components and how they interact for discovery and routing according to one embodiment. Application 300 may use discovery 308 to find peers, peer groups, advertisements, and other entities on the peer-to-peer network, and may also publish pipe, peer, peer group, service, and other advertisements for access by other peers, applications and services on the peer-to-peer network. In one embodiment, the endpoint 310 may be responsible for exchanging messages between peers that are directly "connected" to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For instance, the endpoint router 312 may be configured to route search (propagate) requests or to not route the requests.

In one embodiment, the generic resolver 308 is a protocol that implements a sort of RPC (query/response) protocol on top of the endpoint 310. The generic resolver may be used by discovery 306 and pipe resolver 304. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provides uniqueness that may not be provided by an endpoint 310 since a pipe identifier is unique in time and space, and an endpoint 310, being a network address, may not be.

A discovery and router mechanism based on web crawling may be time-expensive, and higher level protocols (such as applications) may have information that the core is not aware of that may help in the web crawling process. In one embodiment, to enable applications to participate in the process, components of the core mechanism may provide hooks that enable the applications to assist in the process (e.g. by providing information). Some transport protocols such as HTTP may be configured for and/or dynamically learn about web rendezvous peers it can use. An application may be provided access to the list of rendezvous peers. In one embodiment, an application may be allowed to set/unset routes in an endpoint router 312. Each route may be qualified to route or not route propagate messages such as web crawling messages and/or unicast messages. The endpoint router 312 may be viewed as a route cache manager, which is may be controlled by an endpoint 310 and/or other entities that may need to control it. In one embodiment, an endpoint router 312 may be able to discover unknown routes from applications. In one embodiment, discovery 308 may be configured (statically and/or dynamically) to control the nature and the amount of data that it manages. In one embodiment, discovery 308 may be taught where to go search, or where not to go search. In one embodiment, discovery 308 may make an "upcall" to a search/retrieve mechanism. In one embodiment, a pipe resolver 304 may manage a cache of input pipes (receiving ends). In one embodiment, pipe resolver 304 may be accessed by applications to set/unset entries in the cache.

The core components of the peer-to-peer protocol may be used to implement mechanisms for searching, publishing and recovering of core abstractions (peer, peer group, pipes, advertisements). These mechanisms are preferably simple, administration free, and do not require special peers to act as "master" peers. These mechanisms may allow processes in the peer-to-peer network, in absence of help from other applications, to bootstrap and find out the information necessary to access applications and services that can help. Also, the core can "return" to this standalone behavior and still function if helper applications fail. In one embodiment, safety mechanisms may be put in place in order to avoid a major overflow of "web-crawling". In one embodiment, applications and/or services that support the peer-to-peer protocol may access, control, and/or override the core components, even to the extreme of implementing a centralized, client-server model based on the core components.

Peer Monitoring and Metering

Peer monitoring may include the capability to closely keep track of a (local or remote) peer's status, to control the behavior of a peer, and to respond to actions on the part of a peer. These capabilities may be useful, for example, when a peer network wants to offer premium services with a number of desirable properties such as reliability, scalability, and guaranteed response time. For example, a failure in the peer system is preferably detected as soon as possible so that corrective actions can be taken. It may be preferable to shut down an erratic peer and transfer its responsibilities to another peer.

Peer metering may include the capability to accurately account for a peer's activities, in particular its usage of valuable resources. Such a capability is essential if the network economy is to go beyond flat-rate services. Even for providers offering flat rate services, it is to their advantage to be able to collect data and analyze usage patterns in order to be convinced that a flat rate structure is sustainable and profitable.

In one embodiment, the peer-to-peer platform may provide monitoring and metering through the peer information protocol, where a peer can query another peer for data such as up time and amount of data handled. Security is important in peer monitoring and metering. In one embodiment, a peer may choose to authenticate any command it receives. In one embodiment, a peer may decide to not answer queries from suspect sources.

Peer-to-Peer Platform Shell Application

One embodiment of the peer-to-peer platform may include a shell application as a development environment built on top of the platform. In one embodiment, the shell application may provide interactive access to the peer-to-peer platform via a simple command line interface. With the shell, shell scripts may be written. The shell may be executed in a networked environment. A user command in the shell may generate a sequence of message exchanges between a set of peers, with some computation occurring on remote peer nodes, and with the answer being returned to the user of the shell. Using the shell, peer-to-peer core building blocks such as peers, peer groups, pipes, and codats may be manipulated. Codats are units of contents that can hold both code and data. For example, a user, through the shell, can publish, search, and execute codats, discover peers or peer groups, create pipes to connect two peers, and send and receive messages.

In one embodiment, an interpreter in the shell may operate in a loop: it accepts a command, interprets the command, executes the command, and then waits for another command. The shell may display a prompt to notify users that it is ready to accept a new command.

In one embodiment with a Java-based implementation of the peer-to-peer platform, one or more of the shell commands may not be built in per se. The commands may be Java language programs and are dynamically loaded and started by the shell framework when the corresponding commands are typed in. Therefore, adding a new shell command may be performed by writing a program in the Java language.

In one embodiment, the shell may provide a "pipe" capability to redirect a command output pipe into another command input pipe. In one embodiment, shell commands may be given a standard input, output and error pipes that a user can connect, disconnect and reconnect to other shell commands. Commands can support other pipes if needed. In one embodiment of the shell, a user may dynamically disconnect and reconnect pipes between commands, as in the following example:

xxxx>cat>p1 myfile
xxxx>grep<p1 abcd
xxxx>grep<p1 efgh

In the above example, the first command "cat>p1 myfile" cats myfile into the output pipe p1. The second command then connects pipe p1 to grep's input pipe and searches for the string abcd. The third command then disconnects p1, redirects it to the new grep command's input pipe and searches for the string efgh.

In one embodiment, the peer-to-peer platform shell supports piping in both directions. A special operator such as "<>" may used for creating crossing pipes between two commands. For example, with the following command "cmd1<>cmd2", the output pipe of the first command is connected to the standard input pipe of the second command, and at the same time the output pipe of the second command is connected to the standard input pipe of the first command. Of course, this operator has to be used carefully to avoid infinite data loops.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made as would be obvious to a person skilled in the art having the benefit of this disclosure. It is intended that the invention embraces all such modifications and changes and, accordingly, the above description to be regarded in an illustrative rather than a restrictive sense.

What is claimed is:

1. A peer computing system, comprising:
    a plurality of peer nodes;
    wherein at least a subset of the peer nodes are configured to participate in a peer discovery protocol to discover other peer nodes; and
    wherein at least a subset of the peer nodes are configured to participate in a peer membership protocol for joining or forming a peer group with other peer nodes; and
    wherein one or more peer nodes in said peer group are configured to participate in a peer resolver protocol configured for use in sending search queries from one peer group member to another peer group member.

2. The peer computing system as recited in claim 1, wherein the member peer nodes in said peer group are configured to find and exchange content in said peer group.

3. The peer computing system as recited in claim 1, wherein said peer group is a collection of cooperating peer nodes that provide a common set of services in the peer computing system.

4. The peer computing system as recited in claim 3, wherein the common set of services include one or more core services.

5. The peer computing system as recited in claim 1, wherein one or more peer nodes in said peer group are configured to participate in an endpoint routing protocol for enabling the peer nodes to request peer routing information to reach other peer nodes.

6. The peer computing system as recited in claim 1, wherein at least a subset of the peer nodes are configured to participate in a peer information protocol for enabling the peer nodes to learn about other peer nodes' capabilities and status.

7. The peer computing system as recited in claim 1, wherein each of the plurality of peer nodes is further configured to use an advertisement format for describing and publishing advertisements for resources in a peer-to-peer environment.

8. The peer computing system as recited in claim 7, wherein the resources include one or more of the peer nodes, peer groups, content, services, applications, pipes, and pipe endpoints, wherein the pipes are communications channels between one or more of the peer nodes, the services, and the applications in the peer-to-peer environment, and wherein the pipe endpoints are network interfaces on the peer nodes that are configured to be bound to the pipes to establish the communications channels.

9. A peer computing system, comprising:
a plurality of peer nodes;
wherein at least a subset of the peer nodes are configured to participate in a peer discovery protocol to discover other peer nodes; and
wherein at least a subset of the peer nodes are configured to participate in a peer membership protocol for joining or forming a peer group with other peer nodes, wherein said peer group is a collection of cooperating peer nodes that provide a common set of services in the peer computing system, wherein the common set of services include one or more core services, wherein the core services include:
a discovery service configured for use by member peer nodes in said peer group to discover advertised resources in the peer computing system, wherein the resources include peers and peer groups, and wherein the discovery service uses the discovery protocol; and
a membership service configured for use by member peer nodes in said peer group to reject or accept group membership applications, wherein the membership service uses the membership protocol.

10. The peer computing system as recited in claim 9, wherein one or more peer nodes in said peer group are configured to participate in a peer resolver protocol configured for use in sending search queries from one peer group member to another peer group member.

11. A peer computing system, comprising:
a plurality of peer nodes;
wherein at least a subset of the peer nodes are configured to participate in a peer discovery protocol to discover other peer nodes;
wherein at least a subset of the peer nodes are configured to participate in a peer membership protocol for joining or forming a peer group with other peer nodes; and
wherein one or more peer nodes in said peer group are configured to participate in a pipe binding protocol configured for use in finding a physical location of a pipe endpoint and binding to the pipe endpoint.

12. A peer computing system, comprising:
a plurality of peer nodes;
means for at least a subset of the peer nodes to discover resources in the peer computing system, wherein the resources include peer nodes and peer groups, and wherein the resources further include one or more of pipes, endpoints, services and content;
means for at least a subset of the peer nodes to join or form a peer group with other peer nodes;
wherein said peer group is a collection of cooperating peer nodes that provide a common set of services in the peer computing system; and
means for member peer nodes in said peer group to bind to a pipe endpoint.

13. The peer computing system as recited in claim 12, further comprising means for member peer nodes in said peer group to request peer routing information to reach other peer nodes.

14. The peer computing system as recited in claim 12, further comprising means for the plurality of peer nodes to request information about other peer nodes' capabilities and status.

15. A peer computing system, comprising:
a plurality of peer nodes;
means for at least a subset of the peer nodes to discover resources in the peer computing system, wherein the resources include peer nodes and peer groups, and wherein the resources further include one or more of pipes, endpoints, services and content;
means for at least a subset of the peer nodes to join or form a peer group with other peer nodes;
wherein said peer group is a collection of cooperating peer nodes that provide a common set of services in the peer computing system; and
means for member peer nodes in said peer group to reject or accept peer group membership applications.

16. A peer computing system, comprising:
a plurality of peer nodes;
means for at least a subset of the peer nodes to discover resources in the peer computing system, wherein the resources include peer nodes and peer groups, and wherein the resources further include one or more of pipes, endpoints, services and content;
means for at least a subset of the peer nodes to join or form a peer group with other peer nodes;
wherein said peer group is a collection of cooperating peer nodes that provide a common set of services in the peer computing system; and
means for member peer nodes in said peer group to send search queries from one peer group member to another peer group member.

17. The peer computing system as recited in claim 16, further comprising means for member peer nodes in said peer group to bind to a pipe endpoint.

18. A non-transitory, computer-readable medium, comprising program instructions computer-executable to implement a peer-to-peer platform comprising:
a peer discovery protocol for discovering peers and peer groups in a peer-to-peer network;
a peer membership protocol for use by the peers in applying for membership in one or more of the peer groups;
wherein the peer-to-peer platform is configured for use in the peer-to-peer network to enable the peers to discover each other, to communicate with each other, and to cooperate with each other to form the peer groups;
wherein the peer-to-peer platform further comprises a peer group advertisement format configured for use in advertising the peer groups in the peer-to-peer network, wherein said discovering peer groups returns one or more peer group advertisements formatted in accordance with the peer group advertisement format.

19. The non-transitory, computer-readable medium as recited in claim 18, wherein the peer-to-peer platform further comprises an endpoint routing protocol for enabling the peer nodes to request peer routing information to reach other peer nodes.

20. The non-transitory, computer-readable medium as recited in claim 18, wherein the peer-to-peer platform further comprises a peer information protocol for enabling the peer nodes to learn about other peer nodes' capabilities and status.

21. The non-transitory, computer-readable medium as recited in claim 18, wherein the peer-to-peer platform further comprises a peer advertisement format configured for use in advertising the peers in the peer-to-peer network, wherein said discovering peers returns one or more peer advertisements formatted in accordance with the peer advertisement format.

22. The non-transitory, computer-readable medium as recited in claim 18, wherein the peer discovery protocol is further configured for discovering one or more of pipes, endpoints, services and content in the peer-to-peer network.

23. The non-transitory, computer-readable medium as recited in claim 22, wherein the peer-to-peer platform further comprises one or more of:
   a pipe advertisement format configured for use in advertising pipes in the peer-to-peer network, wherein said discovering pipes returns one or more pipe advertisements formatted in accordance with the pipe advertisement format;
   an endpoint advertisement format configured for use in advertising endpoints in the peer-to-peer network, wherein said discovering endpoints returns one or more endpoint advertisements formatted in accordance with the endpoint advertisement format;
   a service advertisement format configured for use in advertising services provided by the peers in the peer-to-peer network, wherein said discovering services returns one or more service advertisements formatted in accordance with the service advertisement format; and
   a content advertisement format configured for use in advertising the content in the peer-to-peer network, wherein said discovering content returns one or more content advertisements formatted in accordance with the content advertisement format.

24. A non-transitory, computer-readable medium, comprising program instructions computer-executable to implement a peer-to-peer platform comprising:
   a peer discovery protocol for discovering peers and peer groups in a peer-to-peer network;
   a peer membership protocol for use by the peers in applying for membership in one or more of the peer groups;
   a peer resolver protocol configured for use in sending search queries from one peer group member to another peer group member;
   a peer information protocol for enabling the peers to learn about other peers' capabilities and status;
   a pipe binding protocol configured for use in finding a physical location of a pipe endpoint and binding the pipe endpoint to a peer; and
   an endpoint routing protocol for enabling the peers to request peer routing information to reach other peers;
   wherein the peer-to-peer platform is configured for use in the peer-to-peer network to enable the peers to discover each other, to communicate with each other, and to cooperate with each other to form the peer groups.

25. The non-transitory, computer-readable medium as recited in claim 24, wherein each of the protocols defines one or more message formats configured for use in exchanging messages between the peers in accordance with the particular protocol.

26. A non-transitory, computer-readable medium, comprising program instructions computer-executable to implement a peer-to-peer platform comprising:
   a peer discovery protocol for discovering peers and peer groups in a peer-to-peer network;
   a peer membership protocol for use by the peers in applying for membership in one or more of the peer groups; and
   a peer resolver protocol configured for use in sending search queries from one peer group member to another peer group member;
   wherein the peer-to-peer platform is configured for use in the peer-to-peer network to enable the peers to discover each other, to communicate with each other, and to cooperate with each other to form the peer groups.

27. The non-transitory, computer-readable medium as recited in claim 26, wherein the peer-to-peer platform further comprises a peer group advertisement format configured for use in advertising the peer groups in the peer-to-peer network, wherein said discovering peer groups returns one or more peer group advertisements formatted in accordance with the peer group advertisement format.

28. A non-transitory tangible, computer-readable medium, comprising program instructions computer-executable to implement a peer-to-peer platform comprising:
   a peer discovery protocol for discovering peers and peer groups in a peer-to-peer network;
   a peer membership protocol for use by the peers in applying for membership in one or more of the peer groups; and
   a pipe binding protocol configured for use in finding a physical location of a pipe endpoint and in binding to the pipe endpoint;
   wherein the peer-to-peer platform is configured for use in the peer-to-peer network to enable the peers to discover each other, to communicate with each other, and to cooperate with each other to form the peer groups.

29. A method for discovering peer nodes on a peer-to-peer network, comprising:
   a peer node broadcasting a peer discovery message on the peer-to-peer network; and
   the peer node receiving one or more response messages to the peer discovery message from one or more other peer nodes on the peer-to-peer network, wherein the response messages each include information about the particular peer node, wherein the information is configured for use by the peer node in establishing a connection to the particular peer node; and
   wherein the peer discovery message and the response messages are in a format defined by a peer discovery protocol comprised in a peer-to-peer platform, and wherein said broadcasting and said receiving are performed in accordance with the peer discovery protocol.

30. The method as recited in claim 29, further comprising:
   the peer node broadcasting a peer group discovery message on the peer-to-peer network; and
   the peer node receiving one or more peer group response messages to the peer group discovery message from one or more peer groups on the peer-to-peer network, wherein the peer group response messages each include information about the particular peer group, wherein the information is configured for use by the peer node in joining the particular peer group; and wherein the peer group discovery message and the peer group response messages are in a format defined by the peer discovery protocol, and wherein said broadcasting a peer group discovery message and said receiving one or more peer group response messages are performed in accordance with the peer discovery protocol.

31. The method as recited in claim 29, further comprising:

the peer node broadcasting a pipe discovery message on the peer-to-peer network; and the peer node receiving one or more pipe response messages to the pipe discovery message from one or more peers on the peer-to-peer network, wherein the pipe response messages each include information about the particular pipe, wherein the information is configured for use by the peer node in binding to the particular pipe; and wherein the pipe discovery message and the pipe response messages are in a format defined by the peer discovery protocol, and wherein said broadcasting a pipe discovery message and said receiving one or more pipe response messages are performed in accordance with the peer discovery protocol.

32. The method as recited in claim 29, further comprising:

the peer node broadcasting an endpoint discovery message on the peer-to-peer network; and the peer node receiving one or more endpoint response messages to the endpoint discovery message from one or more peers on the peer-to-peer network, wherein the endpoint response messages each include information about the particular endpoint, wherein the information is configured for use by the peer node in binding to the particular endpoint; and wherein the endpoint discovery message and the endpoint response messages are in a format defined by the peer discovery protocol, and wherein said broadcasting an endpoint discovery message and said receiving one or more endpoint response messages are performed in accordance with the peer discovery protocol.

33. The method as recited in claim 29, further comprising:

the peer node broadcasting a service discovery message on the peer-to-peer network; and the peer node receiving one or more service response messages to the service discovery message from one or more peers on the peer-to-peer network, wherein the service response messages each include information about the particular service, wherein the information is configured for use by the peer node in accessing the particular service; and wherein the service discovery message and the service response messages are in a format defined by the peer discovery protocol, and wherein said broadcasting a service discovery message and said receiving one or more service response messages are performed in accordance with the peer discovery protocol.

34. The method as recited in claim 29, further comprising:

the peer node broadcasting a content discovery message on the peer-to-peer network; and the peer node receiving one or more content response messages to the content discovery message from one or more peers on the peer-to-peer network, wherein the content response messages each include information about the particular content, wherein the information is configured for use by the peer node in accessing the particular content; and wherein the content discovery message and the content response messages are in a format defined by the peer discovery protocol, and wherein said broadcasting a content discovery message and said receiving one or more content response messages are performed in accordance with the peer discovery protocol.

35. A method for discovering peer groups on a peer-to-peer network, comprising:

a peer node broadcasting a peer group discovery message on the peer-to-peer network; and the peer node receiving a peer group response messages to the peer group discovery message from a peer group on the peer-to-peer network, wherein the peer group response message includes information about the peer group, wherein the information is configured for use by the peer node in joining the peer group; and wherein the peer group discovery message and the peer group response message are in a format defined by a peer discovery protocol comprised in a peer-to-peer platform, and wherein said broadcasting a peer group discovery message and said receiving the peer group response message are performed in accordance with the peer discovery protocol.

36. The method as recited in claim 35, further comprising the peer node joining the peer group in accordance with the information received in the peer group response message.

37. The method as recited in claim 36, wherein said joining the peer group comprises:

the peer node sending a peer group membership application message to the peer group, wherein the peer group membership application includes information on the peer node's qualifications for membership in the peer group;

the peer group sending a peer group membership acceptance message to the peer node if the peer node qualifies for peer group membership;

wherein the peer group membership application message and the peer group membership acceptance message are in a format defined by a peer membership protocol comprised in the peer-to-peer platform.

38. A non-transitory, computer-readable medium, comprising program instructions, wherein the program instructions are computer-executable to implement:

a peer node broadcasting a peer discovery message on the peer-to-peer network; and the peer node receiving one or more response messages to the peer discovery message from one or more other peer nodes on the peer-to-peer network, wherein the response messages each include information about the particular peer node, wherein the information is configured for use by the peer node in establishing a connection to the particular peer node; and wherein the peer discovery message and the response messages are in a format defined by a peer discovery protocol comprised in a peer-to-peer platform, and wherein said broadcasting and said receiving are performed in accordance with the peer discovery protocol.

39. The non-transitory, computer-readable medium as recited in claim 38, wherein the program instructions are further computer-executable to implement:

the peer node broadcasting a peer group discovery message on the peer-to-peer network; and the peer node receiving one or more peer group response messages to the peer group discovery message from one or more peer groups on the peer-to-peer network, wherein the peer group response messages each include information about the particular peer group, wherein the information is configured for use by the peer node in joining the particular peer group; and wherein the peer group discovery message and the peer group response messages are in a format defined by a peer discovery protocol comprised in a peer-to-peer platform, and wherein said broadcasting a peer group discovery message and said receiving one or more peer group response messages are performed in accordance with the peer discovery protocol.

40. A non-transitory, computer-readable medium, comprising program instructions, wherein the program instructions are computer-executable to implement:

a peer node broadcasting a peer group discovery message on the peer-to-peer network; and the peer node receiving a peer group response messages to the peer group discovery message from a peer group on the peer-to-peer network, wherein the peer group response message includes information about the peer group, wherein the information is configured for use by the peer node in joining the peer group; and wherein the peer group discovery message and the peer group response messages are in a format defined by a peer discovery protocol comprised in a peer-to-peer platform, and wherein said broadcasting a peer group discovery message and said receiving one or more peer group response messages are performed in accordance with the peer discovery protocol.

* * * * *